US010331720B2

(12) United States Patent
Neels et al.

(10) Patent No.: US 10,331,720 B2
(45) Date of Patent: *Jun. 25, 2019

(54) GRAPHICAL DISPLAY OF FIELD VALUES EXTRACTED FROM MACHINE DATA

(71) Applicant: Splunk Inc., San Francisco, CA (US)

(72) Inventors: Alice Emily Neels, Berkeley, CA (US); Sundar Vasan, San Francisco, CA (US); Simon Fishel, San Francisco, CA (US); Marc Vincent Robichaud, San Francisco, CA (US); Divanny Lamas, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,425

(22) Filed: Jan. 31, 2017

(65) Prior Publication Data

US 2017/0140039 A1 May 18, 2017

Related U.S. Application Data

(63) Continuation of application No. 15/143,582, filed on Apr. 30, 2016, which is a continuation of application
(Continued)

(51) Int. Cl.
*G06F 16/338* (2019.01)
*G06F 16/33* (2019.01)
(Continued)

(52) U.S. Cl.
CPC ........ *G06F 16/338* (2019.01); *G06F 3/04842* (2013.01); *G06F 3/04847* (2013.01);
(Continued)

(58) Field of Classification Search
CPC ............ G06F 3/0482; G06F 17/30675; G06F 17/30696; G06F 17/24; G06F 16/334;
(Continued)

(56) References Cited

U.S. PATENT DOCUMENTS 5,550,971 A   8/1996  Brunner et al.
5,999,933 A  12/1999  Mehta
(Continued)

OTHER PUBLICATIONS

United States Patent and Trademark Office, U.S. Appl. No. 14/067,203, Non-Final Office Action dated Jan. 2, 2014.
(Continued)

*Primary Examiner* — Phong H Nguyen
(74) *Attorney, Agent, or Firm* — Artegis Law Group, LLP

(57) ABSTRACT

The disclosure relates to certain system and method embodiments for generating reports from unstructured data. In one embodiment, a method can include identifying events matching criteria of an initial search query (each of the events including a portion of raw machine data that is associated with a time), identifying a set of fields, each field defined for one or more of the identified events, causing display of an interactive graphical user interface (GUI) that includes one or more interactive elements enabling a user to define a report for providing information relating to the matching events (each interactive element enabling processing or presentation of information in the matching events using one or more fields in the identified set of fields), receiving, via the GUI, a report definition indicating how to report information relating to the matching events, and generating, based on the report definition, a report including information relating to the matching events.

21 Claims, 48 Drawing Sheets

Related U.S. Application Data

No. 14/503,335, filed on Sep. 30, 2014, which is a continuation-in-part of application No. 14/448,937, filed on Jul. 31, 2014, now Pat. No. 9,582,585, which is a continuation-in-part of application No. 14/067,203, filed on Oct. 30, 2013, now Pat. No. 8,983,994, which is a continuation of application No. 13/607,117, filed on Sep. 7, 2012, now Pat. No. 8,788,525.

(51) Int. Cl.
| | | |
|---|---|---|
| *G06F 16/26* | (2019.01) | |
| *G06F 16/248* | (2019.01) | |
| *G06F 16/34* | (2019.01) | |
| *G06T 11/20* | (2006.01) | |
| *G06F 16/335* | (2019.01) | |
| *G06F 16/901* | (2019.01) | |
| *G06F 3/0482* | (2013.01) | |
| *G06F 3/0484* | (2013.01) | |
| *G06F 16/2457* | (2019.01) | |
| *G06F 16/2458* | (2019.01) | |
| *G06F 16/9535* | (2019.01) | |
| *G06F 17/24* | (2006.01) | |

(52) U.S. Cl.
CPC ........ *G06F 16/248* (2019.01); *G06F 16/2477* (2019.01); *G06F 16/24575* (2019.01); *G06F 16/26* (2019.01); *G06F 16/334* (2019.01); *G06F 16/335* (2019.01); *G06F 16/345* (2019.01); *G06F 16/9024* (2019.01); *G06F 16/9535* (2019.01); *G06F 17/24* (2013.01); *G06T 11/206* (2013.01); *G06T 2200/24* (2013.01)

(58) Field of Classification Search
CPC .... G06F 16/26; G06F 16/338; G06F 16/2477; G06F 16/24575; G06F 16/9535; G06F 16/248; G06F 16/9024
USPC .......................................... 707/722, 723, 805
See application file for complete search history.

(56) References Cited

U.S. PATENT DOCUMENTS

| | | | |
|---|---|---|---|
| 6,205,498 B1 | 3/2001 | Habusha et al. | |
| 6,208,638 B1 | 3/2001 | Rieley et al. | |
| 6,484,162 B1 | 11/2002 | Edlund et al. | |
| 6,650,346 B1* | 11/2003 | Jaeger | G06Q 10/00 |
| | | | 715/764 |
| 6,704,688 B2* | 3/2004 | Aslam | G05B 23/0229 |
| | | | 702/176 |
| 7,529,642 B2 | 5/2009 | Raymond | |
| 7,562,069 B1 | 7/2009 | Chowdhury et al. | |
| 8,031,634 B1 | 10/2011 | Artzi et al. | |
| 8,380,698 B2* | 2/2013 | Sundaranatha | G06F 16/313 |
| | | | 707/713 |
| 8,412,696 B2 | 4/2013 | Zhang et al. | |
| 8,442,982 B2 | 5/2013 | Jacobson et al. | |
| 8,516,008 B1 | 8/2013 | Marquardt et al. | |
| 8,548,973 B1 | 10/2013 | Kritt et al. | |
| 8,589,403 B2 | 11/2013 | Marquardt et al. | |
| 8,682,925 B1 | 3/2014 | Marquardt et al. | |
| 8,700,658 B2 | 4/2014 | Rambhia et al. | |
| 8,707,194 B1 | 4/2014 | Jenkins et al. | |
| 8,713,000 B1 | 4/2014 | Elman et al. | |
| 8,770,658 B2 | 4/2014 | Rambhia et al. | |
| 8,751,486 B1 | 6/2014 | Neeman et al. | |
| 8,788,526 B2 | 7/2014 | Neels et al. | |
| 8,868,591 B1 | 10/2014 | Finkelstein et al. | |
| 8,910,084 B2* | 12/2014 | Helfman | G06T 11/206 |
| | | | 715/854 |
| 8,983,994 B2 | 3/2015 | Neels et al. | |
| 9,569,511 B2* | 2/2017 | Morin | G06F 16/24544 |
| 2001/0018689 A1 | 8/2001 | Spence et al. | |
| 2001/0023414 A1 | 9/2001 | Kumar et al. | |
| 2001/0048374 A1 | 12/2001 | Blad | |
| 2002/0054101 A1 | 5/2002 | Beatty | |
| 2002/0181496 A1 | 12/2002 | Narasimhan et al. | |
| 2003/0131215 A1* | 7/2003 | Bellew | G06F 16/2423 |
| | | | 712/200 |
| 2003/0163463 A1* | 8/2003 | Cain | G06F 16/951 |
| | | | 707/E17.108 |
| 2003/0187821 A1 | 10/2003 | Cotton et al. | |
| 2004/0078359 A1 | 4/2004 | Bolognese et al. | |
| 2004/0111410 A1* | 6/2004 | Burgoon | G06F 16/2462 |
| | | | 707/999.004 |
| 2004/0186826 A1 | 9/2004 | Choi et al. | |
| 2004/0220965 A1 | 11/2004 | Harville et al. | |
| 2004/0221226 A1 | 11/2004 | Lin et al. | |
| 2004/0225641 A1 | 11/2004 | Dettinger et al. | |
| 2004/0254919 A1 | 12/2004 | Giuseppini | |
| 2004/0267770 A1 | 12/2004 | Lee | |
| 2005/0015363 A1 | 1/2005 | Dessloch et al. | |
| 2005/0050540 A1 | 3/2005 | Shaughnessy et al. | |
| 2005/0182703 A1 | 8/2005 | D'hers et al. | |
| 2005/0192921 A1* | 9/2005 | Chaudhuri | G06F 16/2358 |
| | | | 707/E17.005 |
| 2005/0203876 A1 | 9/2005 | Cragun et al. | |
| 2006/0004826 A1 | 1/2006 | Zartler et al. | |
| 2006/0026145 A1* | 2/2006 | Beringer | G06F 3/0482 |
| | | | 707/E17.005 |
| 2006/0041539 A1 | 2/2006 | Matchett et al. | |
| 2006/0048101 A1 | 3/2006 | Krassovsky et al. | |
| 2006/0053174 A1 | 3/2006 | Gardner et al. | |
| 2006/0074621 A1 | 4/2006 | Rachman | |
| 2006/0112123 A1 | 5/2006 | Clark et al. | |
| 2006/0123010 A1 | 6/2006 | Landry et al. | |
| 2006/0143159 A1 | 6/2006 | Chowdhury et al. | |
| 2006/0148550 A1* | 7/2006 | Nee, Jr. | G07F 17/32 |
| | | | 463/16 |
| 2006/0161816 A1 | 7/2006 | Gula et al. | |
| 2006/0206454 A1* | 9/2006 | Forstall | G06F 16/951 |
| | | | 707/E17.108 |
| 2006/0248087 A1* | 11/2006 | Agrawal | G06F 16/3344 |
| | | | 707/E17.078 |
| 2006/0253423 A1 | 11/2006 | McLane et al. | |
| 2006/0259474 A1 | 11/2006 | Granito | |
| 2006/0293979 A1* | 12/2006 | Cash | G06Q 20/4016 |
| | | | 705/34 |
| 2007/0073743 A1 | 3/2007 | Bammi et al. | |
| 2007/0078872 A1* | 4/2007 | Cohen | G06F 16/338 |
| | | | 707/E17.082 |
| 2007/0118491 A1 | 5/2007 | Baum et al. | |
| 2007/0198501 A1* | 8/2007 | Sundaranatha | G06F 16/313 |
| | | | 707/999.004 |
| 2007/0209080 A1 | 9/2007 | Ture et al. | |
| 2007/0214164 A1 | 9/2007 | MacLennan et al. | |
| 2007/0259709 A1* | 11/2007 | Kelly | G07F 17/3267 |
| | | | 463/20 |
| 2008/0059420 A1 | 3/2008 | Hsu et al. | |
| 2008/0104542 A1 | 5/2008 | Cohen et al. | |
| 2008/0184110 A1 | 7/2008 | Barsness et al. | |
| 2008/0215546 A1 | 9/2008 | Baum et al. | |
| 2008/0222125 A1 | 9/2008 | Chowdhury | |
| 2008/0228743 A1 | 9/2008 | Kusnitz et al. | |
| 2008/0270366 A1 | 10/2008 | Frank | |
| 2008/0301095 A1 | 12/2008 | Zhu et al. | |
| 2008/0319965 A1 | 12/2008 | Dettinger et al. | |
| 2009/0013281 A1* | 1/2009 | Helfman | G06Q 10/10 |
| | | | 715/788 |
| 2009/0019020 A1 | 1/2009 | Dhillon et al. | |
| 2009/0055370 A1 | 2/2009 | Dagum et al. | |
| 2009/0069739 A1* | 3/2009 | Mohamed | A61B 18/14 |
| | | | 604/20 |
| 2009/0085769 A1 | 4/2009 | Thubert et al. | |
| 2009/0125546 A1 | 5/2009 | Iborra et al. | |
| 2009/0182866 A1 | 7/2009 | Watanabe et al. | |
| 2009/0300065 A1 | 12/2009 | Birchall | |
| 2009/0319512 A1 | 12/2009 | Baker et al. | |

(56) References Cited

U.S. PATENT DOCUMENTS

| | | | |
|---|---|---|---|
| 2009/0326924 A1* | 12/2009 | Crider | G06F 17/2785 704/9 |
| 2009/0327319 A1 | 12/2009 | Bertram et al. | |
| 2010/0095018 A1 | 4/2010 | Khemani et al. | |
| 2010/0100562 A1* | 4/2010 | Millsap | G06F 16/2428 707/770 |
| 2010/0161677 A1* | 6/2010 | Zurek | G06Q 10/06 707/802 |
| 2010/0182321 A1* | 7/2010 | Cartan | G06Q 10/06398 345/440 |
| 2010/0251100 A1 | 9/2010 | Delacourt | |
| 2010/0275024 A1 | 10/2010 | Abdulhayoglu | |
| 2010/0290617 A1* | 11/2010 | Nath | H04L 9/008 380/29 |
| 2010/0299135 A1 | 11/2010 | Fritsch et al. | |
| 2010/0306281 A1 | 12/2010 | Williamson | |
| 2010/0332661 A1 | 12/2010 | Tameshige | |
| 2011/0066585 A1* | 3/2011 | Subrahmanyam | G06N 7/005 706/52 |
| 2011/0082884 A1 | 4/2011 | Hollingsworth | |
| 2011/0154296 A1* | 6/2011 | Marenco | G06F 11/3636 717/128 |
| 2011/0191373 A1 | 8/2011 | Botros et al. | |
| 2011/0218978 A1* | 9/2011 | Hong | G06F 16/2477 707/694 |
| 2011/0307905 A1 | 12/2011 | Essey et al. | |
| 2011/0320459 A1 | 12/2011 | Chisholm | |
| 2012/0079363 A1* | 3/2012 | Folting | G06F 17/246 715/227 |
| 2012/0117116 A1 | 5/2012 | Jacobson et al. | |
| 2012/0120078 A1 | 5/2012 | Hubbard | |
| 2012/0124503 A1 | 5/2012 | Coimbatore et al. | |
| 2012/0159370 A1 | 6/2012 | Rode et al. | |
| 2012/0185441 A1* | 7/2012 | Sankar | G06F 11/3495 707/687 |
| 2012/0278336 A1 | 11/2012 | Malik et al. | |
| 2012/0283948 A1 | 11/2012 | Demiryurek et al. | |
| 2012/0284713 A1 | 11/2012 | Ostermeyer et al. | |
| 2012/0296876 A1* | 11/2012 | Bacinschi | H04L 63/12 707/687 |
| 2012/0296878 A1 | 11/2012 | Nakae et al. | |
| 2012/0324448 A1 | 12/2012 | Huetter et al. | |
| 2013/0041824 A1 | 2/2013 | Gupta | |
| 2013/0047270 A1 | 2/2013 | Lowery et al. | |
| 2013/0054642 A1* | 2/2013 | Morin | G06F 16/24544 707/770 |
| 2013/0060912 A1 | 3/2013 | Rensin et al. | |
| 2013/0073957 A1 | 3/2013 | Digiantomasso et al. | |
| 2013/0080190 A1 | 3/2013 | Mansour et al. | |
| 2013/0247133 A1 | 9/2013 | Price et al. | |
| 2013/0262371 A1 | 10/2013 | Nolan | |
| 2013/0311438 A1 | 11/2013 | Marquardt et al. | |
| 2013/0318236 A1 | 11/2013 | Coates et al. | |
| 2013/0318603 A1 | 11/2013 | Merza | |
| 2013/0325893 A1 | 12/2013 | Asay et al. | |
| 2013/0326620 A1 | 12/2013 | Merza et al. | |
| 2014/0019448 A1 | 1/2014 | Leonard et al. | |
| 2014/0019909 A1* | 1/2014 | Leonard | G06F 17/18 715/804 |
| 2014/0046976 A1 | 2/2014 | Zhang et al. | |
| 2014/0074887 A1 | 3/2014 | Neels et al. | |
| 2014/0074889 A1 | 3/2014 | Neels et al. | |
| 2014/0160238 A1 | 6/2014 | Yim et al. | |
| 2014/0236889 A1 | 8/2014 | Vasan et al. | |
| 2014/0236890 A1 | 8/2014 | Vasan et al. | |
| 2014/0280894 A1 | 9/2014 | Reynolds et al. | |
| 2014/0324862 A1 | 10/2014 | Bingham et al. | |
| 2015/0019537 A1 | 1/2015 | Neels et al. | |
| 2015/0026167 A1 | 1/2015 | Neels et al. | |
| 2015/0169736 A1 | 6/2015 | Macpherson et al. | |
| 2015/0278153 A1 | 10/2015 | Leonard et al. | |
| 2015/0339344 A1 | 11/2015 | Neels et al. | |
| 2016/0140743 A1 | 5/2016 | Neels et al. | |
| 2016/0217599 A1 | 7/2016 | Neels et al. | |
| 2016/0246495 A1 | 8/2016 | Neels et al. | |
| 2016/0321369 A1 | 11/2016 | Neels et al. | |

OTHER PUBLICATIONS

United States Patent and Trademark Office, U.S. Appl. No. 13/607,117, Final Office Action dated Jan. 6, 2014.
United States Patent and Trademark Office, U.S. Appl. No. 13/662,369, Final Office Action dated Jan. 9, 2014.
United States Patent and Trademark Office, U.S. Appl. No. 13/607,117, Notice of Allowance dated May 13, 2014.
United States Patent and Trademark Office, U.S. Appl. No. 13/662,369, Notice of Allowance dated May 30, 2014.
United States Patent and Trademark Office, U.S. Appl. No. 14/067,203, Final Office Action dated Jun. 6, 2014.
United States Patent and Trademark Office, U.S. Appl. No. 14/448,937, Final Office Action dated Sep. 30, 2015.
United States Patent and Trademark Office, U.S. Appl. No. 14/815,884, Non-Final Office Action dated Nov. 6, 2015.
United States Patent and Trademark Office, U.S. Appl. No. 14/448,937, Non-Final Office Action dated Feb. 9, 2016.
United States Patent and Trademark Office, U.S. Appl. No. 14/815,884, Final Office Action dated Apr. 11, 2016.
United States Patent and Trademark Office, U.S. Appl. No. 15/007,182, Non-Final Office Action dated May 27, 2016.
United States Patent and Trademark Office, U.S. Appl. No. 14/448,937, Non-Final Office Action dated Jun. 10, 2016.
United States Patent and Trademark Office, U.S. Appl. No. 14/815,884, Non-Final Office Action dated Jun. 23, 2016.
United States Patent and Trademark Office, U.S. Appl. No. 15/143,582, Non-Final Office Action dated Aug. 24, 2016.
United States Patent and Trademark Office, U.S. Appl. No. 15/007,180, Non-Final Office Action dated Aug. 26, 2016.
United States Patent and Trademark Office, U.S. Appl. No. 14/448,937, Notice of Allowance dated Oct. 17, 2016.
United States Patent and Trademark Office, U.S. Appl. No. 15/143,579, Non-Final Office Action dated Oct. 21, 2016.
United States Patent and Trademark Office, U.S. Appl. No. 14/815,884, Notice of Allowance dated Oct. 24, 2016.
United States Patent and Trademark Office, U.S. Appl. No. 14/503,335, Non-Final Office Action dated Nov. 3, 2016.
United States Patent and Trademark Office, U.S. Appl. No. 15/007,182, Final Office Action dated Nov. 17, 2016.
United States Patent and Trademark Office, U.S. Appl. No. 15/143,582, Final Office Action dated Nov. 25, 2016.
Final Office Action for U.S. Appl. No. 15/007,182 dated Apr. 12, 2018, 23 pages.
Final Office Action received for U.S. Appl. No. 15/007,180 dated Mar. 13, 2017, 18 pages.
Non-Final Office Action received for U.S. Appl. No. 15/007,180 dated Aug. 24, 2017, 21 pages.
Non-Final Office Action received for U.S. Appl. No. 15/007,180 dated Jan. 10, 2018, 23 pages.
Non-final Office Action for U.S. Appl. No. 15/143,582 dated Mar. 8, 2018, 31 pages.
Non-final Office Action for U.S. Appl. No. 15/007,182 dated Oct. 20, 2017, 28 pages.
Non-final Office Action for U.S. Appl. No. 15/007,182 dated Oct. 26, 2018, 50 pages.
Final Office Action for U.S. Appl. No. 151143,579 dated May 18, 2017, 21 pages.
Non-Final Office Action for U.S. Appl. No. 15/143,579 dated Feb. 28, 2018, 25 pages.
Final Office Action for U.S. Appl. No. 15/143,579 dated Sep. 20, 2018, 32 pages.
Non-final Office Action for U.S. Appl. No. 15/143,582 dated Mar. 6, 2017, 34 pages.
Final Office Action for U.S. Appl. No. 15/143,582 dated Sep. 26, 2017, 28 pages.
Final Office Action for U.S. Appl. No. 15/143,582 dated Sep. 14, 2018, 33 pages.

(56) References Cited

OTHER PUBLICATIONS

Carasso, D., "Exploring Splunk: Search Processing Language (SPL) Primer and Cookbook," Splunk, dated Nov. 28, 2018, 156 pages.
Official Communication for U.S. Appl. No. 13/475,798 dated Feb. 22, 2013, 15 pages.
Official Communication for U.S. Appl. No. 13/662,369 dated Jan. 11, 2013, 20 pages.
Official Communication for U.S. Appl. No. 13/662,984 dated Jan. 8, 2013, 14 pages.
Non-Final Office Action of May 16, 2013 for U.S. Appl. No. 13/756,147, dated May 16, 2013, 28 pages.
Final Office Action of May 31, 2013 for U.S. Appl. No. 13/662,369, 20 pages.
Notice of Allowance of Apr. 25, 2013 for U.S. Appl. No. 13/475,798, 24 pages.
Non-Final Office Action of Sep. 12, 2013 for U.S. Appl. No. 13/662,369, 20 pages.
Non-Final Office Action of Jan. 14, 2013 for U.S. Appl. No. 13/607,117, 20 pages.
Final Office Action of Jul. 23, 2013 for U.S. Appl. No. 13/662,984, 14 pages.
Non-Final Office Action of Sep. 12, 2013 for U.S. Appl. No. 13/607,117, 24 pages.
http://docs.splunk.com/Documentation/PCI/2.1.1/ [000119] User/IncidentReviewdashboard, 2 Pages (Last accessed Aug. 5, 2014).
Christopher D. Manning, Introduction to Information Retrieval, May 27, 2008, Cambridge University Press, Cambridge, England,Chapter 1, 504 pages.
Cohen, Jeffrey, Brian Dolan, Mark Dunlap, Joseph M. Hellerstein, Caleb Welton; MAD Skills: New Analysis Practices for BigData; Aug. 28, 2009; Proceedings of the VLDB Endowment, vol. 2 Issue 2, Aug. 2009; pp. 1481-1492.
Final Office Action received for U.S. Appl. No. 14/503,335 dated May 17, 2017, 26 pages.
Non-Final Office Action received for U.S. Appl. No. 14/503,335 dated Feb. 28, 2018, 30 pages.
Final Office Action received for U.S. Appl. No. 14/503,335 dated Sep. 7, 2018, 35 pages.
Final Office Action received for U.S. Appl. No. 13/607,117 dated May 31, 2013, 20 pages.
U.S. Appl. No. 14/067,203, "Generation of a Data Model for Searching Machine Data" filed Oct. 30, 2013, 96 pages.
U.S. Appl. No. 13/607,117, "Data Model for Machine Data for Semantic Search" filed Sep. 7, 2012, 82 pages.
Non-Final Office Action received for U.S. Appl. No. 14/067,203 dated Sep. 10, 2014, 28 pages.
Notice of Allowance of Dec. 31, 2014 for U.S. Appl. No. 14/067,203, 74 pages.
Non-Final Office Action received for U.S. Appl. No. 14/611,232 dated Mar. 26, 2015, 21 pages.
Notice of Allowance received for U.S. Appl. No. 14/611,232 dated Jul. 27, 2015, 63 pages.
Non-Final Office Action received for U.S. Appl. No. 14/448,937 dated Dec. 2, 2014, 34 pages.
Non-Final Office Action received for U.S. Appl. No. 14/448,937 dated Mar. 13, 2015, 18 pages.
Non-Final Office Action received for U.S. Appl. No. 14/448,937 dated Jun. 10, 2016, 17 pages.
U.S. Appl. No. 14/167,316, filed Jan. 29, 2014, 118 pages.
U.S. Appl. No. 14/448,995, filed Jul. 31, 2014, 74 pages.
Non-Final Office Action received for U.S. Appl. No. 15/421,415 dated May 18, 2017, 43 pages.
Final Office Action received for U.S. Appl. No. 15/421,415 dated Oct. 23, 2017, 32 pages.
Non-Final Office Action received for U.S. Appl. No. 15/421,415 dated Jan. 31, 2018, 34 pages.
Notice of Allowance received for U.S. Appl. No. 15/421,415 dated Aug. 16, 2018, 47 pages.

\* cited by examiner

```
Original Search: 501
search "error" | stats count BY host

Sent to peers: 502
search "error" | prestats count BY host(map)
```

GRAPHICAL DISPLAY OF FIELD VALUES EXTRACTED FROM MACHINE DATA

RELATED APPLICATIONS

This patent application is a continuation of U.S. patent application Ser. No. 15/143,582, filed Apr. 30, 2016, which is Continuation U.S. patent application Ser. No. 14/503,335 filed on Sep. 30, 2014, which is a Continuation-In-Part of U.S. patent application Ser. No. 14/448,937 filed Jul. 31, 2014, which is a Continuation-In-Part of U.S. patent application Ser. No. 14/067,203 filed Oct. 30, 2013, now U.S. Pat. No. 8,983,994, issued Mar. 17, 2015, which is a Continuation of U.S. patent application Ser. No. 13/607,117 filed Sep. 7, 2012, now U.S. Pat. No. 8,788,525, issued Jul. 22, 2014, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure is generally related to data aggregation and analysis, and is more specifically related to generating reports from unstructured data.

BACKGROUND

Modern data centers often include thousands of host that operate collectively to service requests from even larger numbers of remote clients. During operation, components of these data centers can produce significant volumes of machine-generated data. In order to reduce the size of the data, it is typically pre-processed before it is stored. In some instances, the pre-processing includes extracting and storing some of the data, but discarding the remainder of the data. Although this may save storage space in the short term, it can be undesirable in the long term. For example, if the discarded data is later determined to be of use, it may no longer be available.

In some instances, techniques have been developed to apply minimal processing to the data in an attempt to preserve more of the data for later use. For example, the data may be maintained in a relatively unstructured form to reduce the loss of relevant data. Unfortunately, the unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority. Moreover, processing of the data may return a large amount of information that can be difficult for a user to interpret. For example, if a user submits a search of the data, the user may be provided with a large set of search results for the data but may not know how the search results relate to the data itself or how the search results relate to one another. As a result, a user may have a difficult time deciphering what portions of the data or the search results are relevant to her/his inquiry.

BRIEF DESCRIPTION OF THE DRAWINGS

The present disclosure will be understood more fully from the detailed description given below and from the accompanying drawings of various implementations of the disclosure.

FIG. 12 illustrates an example search query received from a client and executed by search peers in accordance with one or more embodiments.

FIG. 13B illustrates an example data summary dialog that enables a user to select various data sources in accordance with one or more embodiments.

DETAILED DESCRIPTION

General Introduction

Figure 1:
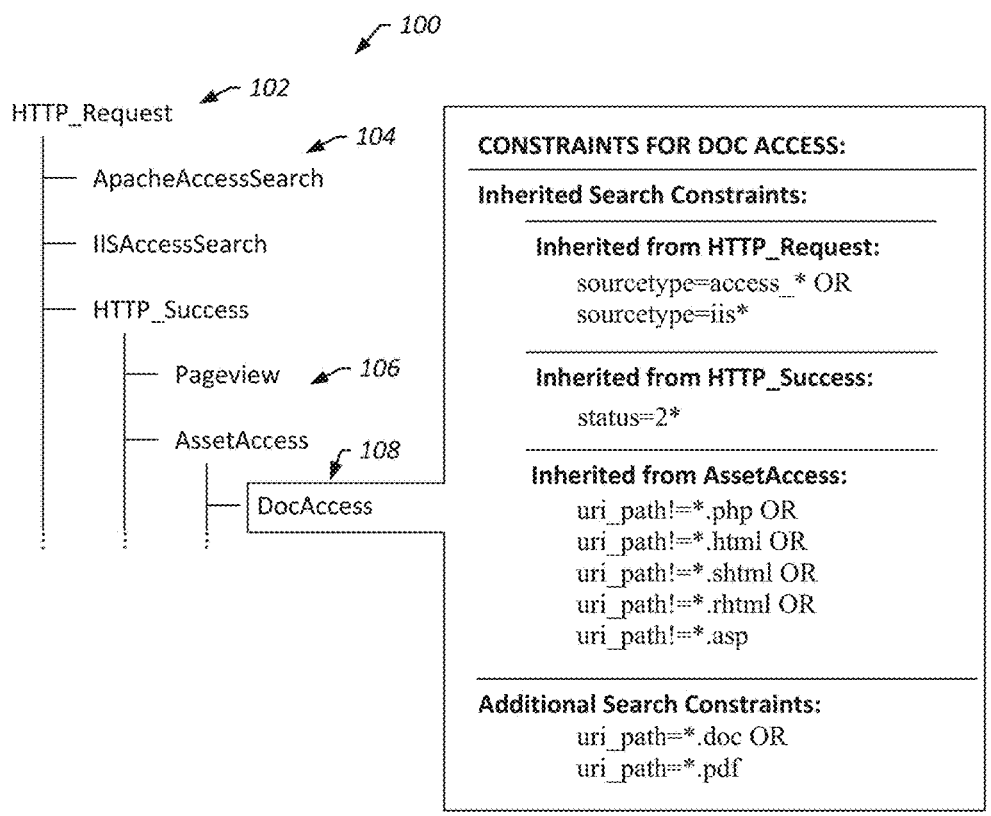
FIG. 1 is diagram that illustrates an example tree structure representing an example data model in accordance with one or more embodiments.

Embodiments of the present disclosure are directed to providing tools that enables users to generate reports on sets of data. For example, embodiments provided herein may enable a user to generate reports for sets of machine-generated data (or "source data") received from various sources, such as servers, databases, applications, networks, and/or the like. In some embodiments, a user can employ a search of unstructured data to identify set of data that she/he would like to report on and, then, use a report editing interface (e.g., a simple drag-and-drop style interface) to quickly design and generate reports for the set of data. Such reports may include, for example, visualizations of the set of data, such as tables, charts, and/or the like; aggregates for the set of data; and filtered subsets of the set of data.

In some embodiments, a reporting application can provide a user with a search interface a search query box) for entering an initial search query (e.g., a search string). The reporting application can use the initial search query to identify a subset of source data that is responsive to the search query, and can automatically identify (or "discover") types of data (referred to as "fields" or "attributes") contained in the identified subset of the source data. The reporting application can return an interactive listing of the identified fields, and may allow the user to select some or all of the identified fields for further use during the report generation process. The reporting application may include a report editing interface that enables a user to, using the selected fields, define and generate various reports on the data. For example, the report application may enable a user to, using the selected fields, define visualizations, such as tables, charts, graphs and the like; define aggregates to be calculated using the selected fields; and define additional filters for the selected fields that can be used to further filter the data e Accordingly, the disclosed tools can enable a user to generate reports, e.g., including filters, aggregates and data visualizations, for specific portions of source data without the user having to substantively interact with a search processing language, such as Splunk Enterprise Search Processing Language (SPL™) produced by Splunk Inc. of San Francisco, Calif.

Elements Overview

In some embodiments, the source data can be heterogeneous machine-generated data received from various sources, such as servers, databases, applications, networks, and/or the like. For example, the source data may include log data generated by a server during the normal course of operation (e.g., server log data). In some embodiments, the source data may include minimally processed data. For example, raw data may be received from an external source, such as a server. The raw data may, then, be subjected to a small amount of processing to break the data into events. As discussed below, an "event" may refer to a portion, or a segment, of the data that is associated with a time. And, the resulting events may be stored as the source data. Such source data may accessible by time-based searching. For example, if a search query requests data generated by a given server (e.g., Server A) over a given time period (e.g., 9 am-12 pm), events can be retrieved that are from the given server and are that associated with the given time period (e.g., events based on log data received from Server A from 9 am-12 pm).

In some embodiments, the source data can include multiple events received from any number of sources. An event may be represented by a data structure that is associated with a certain point in time and includes a portion of raw machine data (e.g., a portion of machine-generated data that has not been manipulated). As described herein, an event may include, for example, a line of data that includes a time reference (e.g., a timestamp), and one or more fields of data. A "field" (or "attribute") may refer to a location in the event that stores a respective field value. Thus, for example, a "time" field of an event may include a value of "28/Apr./2014:18:22:16" which is indicative of the time and date of 6:22 pm., Apr. 28, 2014. Each field may have a name (e.g., "Time") and the fields may be searchable by those names. Fields may be defined by "extraction rules" that are applied to data in the events to extract values for specific fields. More specifically, the extraction rules for a field can include one or more instructions that specify how to extract a value for the field from the event data. Extraction rules are discussed in more detail below with regard to at least FIG. 11 and the SPLUNK® ENTERPRISE system.

In the context of server log data, for example, an event may correspond to a log entry for a client request and include the following fields: (a) a time field (e.g., including a value for the date and time of the request, such as a timestamp), and (b) a series of other fields including, for example, a page field (e.g., including a value representing the page requested), an IP (Internet Protocol) field (e.g., including a value for representing the client IP address associated with the request), and an HTTP (Hypertext Transfer Protocol) code field (e.g., including a value representative of an HTTP status code), and/or the like. That is, each event may be associated with one or more fields and may include values for the one or more fields. Some events may include default fields, such as a host field, source field, sourcetype field and/or a time field. Default fields may be common to some of all events of a set of source data.

In some embodiments, an event can be associated with one or more characteristics that are not represented by the data initially contained in the raw data, such as characteristics of the host, source, and/or source type associated with the event. In the context of server log data, for example, if an event corresponds to a log entry received from Server A, the host and source of the event may be identified as Server A, and the source type may be determined to be "server." In some embodiments, fields representative of the characteristics may be added to (or otherwise associated with) the event. In the context of server log data, for example, if an event is received from a Server A, a host field (e.g., including a value representative of Server A), a source field (e.g., including a value representative of Server A), and a source type field (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

In some embodiments, the source data can include a compilation of any number of events based on data received from any number of sources. For example, the source data may include events corresponding to log entries (or other time referenced event data) received from any number of servers, databases, applications, networks, and/or the like.

Thus, a single set of source data may include a compilation of minimally processed machine data ingested from any number of different sources.

In some embodiments, the source data can be searched to identify one or more portions of the source data that satisfy specified search criteria. In the context of server log data, for example, if a user is interested in log data generated by Server A, the user may submit a search query to identify the events of the source data that were generated by Server A. For example, if the source data includes 10,000 events corresponding to log data from multiple servers, databases, applications, networks, and/or the like, and only 100 events of the 10,000 events correspond to log data generated by Server A, the results of the above search query may include a subset of the source data including only the 100 events that correspond to log data generated by Server A. As described herein, a search definition may be referred to generally as an "object" or a "data model object", and results corresponding to the search may be referred to generally as an "object dataset." Thus, if an object defines a search of events, an object dataset may refer to the events identified as being responsive to the search.

A search query that corresponds to a query of a full set of source data may be referred to as an initial search query. If, for example, the source data includes 10,000 events that correspond to log data from multiple servers, databases, applications, networks, and/or the like, an initial search query may include search criteria that are applied to the 10,000 events. Thus, for example, a search query to identify (from the 10,000 events of source data) the events that were generated by the Server A may be referred to as an initial search query. Of course, the initial search query can be modified until it meets the user's needs. If, for example, the first initial search query submitted by the user does not return the expected results, the user can iteratively modify the initial search query until it returns the desired results from the source data (e.g., the desired subset of the 10,000 events of source data). Despite the iterative approach, the ultimately selected search query may still be referred to as the "initial search query" as it is used as the initial search query for the reporting process (e.g., the initial searching or filtering of the source data).

In some embodiments, a field identification operation can be executed on the set of events responsive to the initial search query to identify some or all of the fields (attributes) that are included in the set of events. If, for example, an initial search query of source data results in the identification of the following two events: (1) a first event having a time field, a page field and an IP field (but not an HTTP code field), and (2) a second event having a time field, a page field and an HTTP code field (but not an IP field), then, performing a field identification operation on the two events may result in identification of the following fields: (a) time, (b) page, (c) IP, and (d) HTTP code. That is, a field identification operation performed on a set of events may identify all of the fields that exist in, or are present in, the set of events even if the fields are not present in all of the events of the set. In some embodiments, the identified fields (and the respective values for the fields) can be used in subsequent operations. For example, as described herein, reports including further filtered data, aggregates, and visualizations, such as tables, charts and the like, can be generated using the identified fields and/or the values contained therein.

In some embodiments, a field selection process can be executed to enable selection of some or all of the identified fields, and reports can be generated using the set of selected fields. For example, although 100 fields may be identified from the set of events responsive to an initial search query, a user may be interested in using, or otherwise making available, only 3 of the fields for use in generating reports. This may be of use, for example, where a large number of fields have been identified and selecting a small subset will help to simplify the reporting generation process and/or it is otherwise desirable to limit which fields are available to users during the report generation process. In some embodiments, the fields of interest can be selected manually and/or automatically. In some embodiments, the selection of fields can be facilitated by an interactive graphical user interface (GUI). If, for example, 100 fields are identified in a set of events identified as responsive to an initial search query, an interactive listing of the 100 fields may be displayed to a user, and the user may select some or all of the fields for use in the report generation process. In some embodiments, an interactive listing may allow a user to select an automatic field selection process and/or manually select a set of fields from the identified fields.

In some embodiments, a report generation process can be based on the set of events that are responsive to the initial search query, and the set of selected fields. For example, a report editor of the reporting application may provide an interactive GUI (e.g., including drop-down selections and/or other interactive elements) that enables a user to define reports on the events using the set of selected fields. For example, the interactive GUI of a report editor may enable a user to define additional filters for the selected fields that can be used to further filter the data, may enable a user to define aggregates to be calculated using the selected fields, and/or may enable a user to define visualizations, such as tables, charts, graphs and the like, using the selected fields. Further, the interactive GUI of the report editor may enable the user to make iterative changes to the report definition, thereby allowing a user to modify the report until it fits her/his needs.

In some embodiments, the report editor can enable a user to further filter the events using the selected fields. If, for example, an initial search query returns 100 events that correspond to log data generated by Server A, and a "time" field is one of the selected fields for the events, then, the interactive GUI can be used to specify additional filtering criteria for the time field, such as the time range of 9 am to 12 pm. If, for example, 10 of the 100 events have at time field with a value (e.g., a timestamp) corresponding to a time between 9 am and 12 pm, application of the additional filtering criteria may result in generating a report that includes the 10 events corresponding to 9 am to 12 pm. (e.g., filtering out the 90 events that do not satisfy the additional filtering criteria) and/or includes aggregates or visualizations that are based on the 10 events.

Accordingly, the reporting process may enable a user to build visualization of the data for a set of events responsive to an initial search query and/or conduct further filtering of the set of events responsive to the initial search query without needing to expand on the original (initial) search string. As a user works with the various features of the interactive GUI (e.g., selecting fields, defining visualization elements, and setting up filters), the reporting application may dynamically update and return updated information created behind the scenes so that the user can see how the edits affect the report (e.g., the filtered results, aggregates and/or visualization that are created).

In some embodiments, the report and/or information about the underlying search can be saved. If, for example, a user creates a table, chart, or other visualization that she/he likes, she/he can save it as a report or dashboard panel. A user may be able to load the report at a later time to reproduce the report on the same set of source data or a different set of source data (e.g., an updated set of source data). In conjunction with saving a report, the application may save a corresponding data model object (discussed in more detail below). The data model object may be the foundation of the saved report or dashboard panel—it can define the underlying search (e.g., the initial search query) and the fields involved in the report or dashboard panel (e.g., the identified fields and/or the selected fields). A user may be able to load the data model object at a later time to reproduce the initial search query and the identified or selected fields on the same set of source data or a different set of source data (e.g., an updated set of source data).

Data Model

A data model may include one or more "objects" (or "data model objects") that define or otherwise correspond to a specific set of data. For example, a first data model object may define a broad set of data pertaining to e-mail activity generally, and another data model object may define specific datasets within the broad dataset, such as a subset of the e-mail data pertaining specifically to e-mails sent. Examples of data models can include, hut are not limited to, electronic mail, authentication, databases, intrusion detection, malware, application state, alerts, compute inventory, network sessions, network traffic, performance, audits, updates, and vulnerabilities. Data models and their objects can be designed, for example, by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events.

A set of search constraints for a data model object can be employed to filter out event data that is not relevant to the object. For example, a set of search constraints for a data model object may include an initial search query that can be used to identify a subset of events of a set of source data. The resulting dataset corresponding to the search may be referred to generally as an "object dataset" (e.g., the set of events that corresponds to the results of the search of the source data based on the data model object). An object's set of fields may be a set of fields associated with the dataset that the object represents (e.g., fields identified from the set of events of the object dataset). Fields can serve several purposes, including, for example, defining what information users can work with to define and generate a report. For example, the set of fields that a user has access to for defining a report may include the fields defined by the data model object she/he chooses to load for use in a reporting editor.

The fields of a data model object can be identified via extraction of the fields from the set of events of the corresponding object dataset. If, for example, an object dataset includes only the following two events: (1) a first event having a time field, a page field and an IP field (but not an HTTP code field), and (2) a second event having a time field, a page field and an HTTP code field (but not an IP field), then, a field identification operation performed on the object dataset may identify the following fields: (a) time, (b) page, (c) IP, and (d) HTTP code. That is, a field identification operation performed on an object dataset may identify all of the fields that exist, or are present in, the object dataset—even if the fields are not present in all of the events of the object dataset. Additional fields of the data model can be generated. For example, fields that are not contained or represented in an event can be generated at search time based on, for example, reg-ex (regular-expression) based field extractions, lookups, and evaluation expressions.

Data model objects can be associated with one another in a hierarchical manner. That is, data model objects can have parent/child relationships. A child data model object (also referred to as a "data sub-model") may represent a subset of the dataset encompassed by its parent object. Child data model objects may inherit the constraints and fields from their parent objects, and may have new or additional constraints and fields of their own. A top-level, or root, data model object, for example, may have child data model objects that inherit the constraints and fields of the root data model object, but can also have additional constraints and fields of their own. The inherited constraints may ensure that the child data model object represents the object dataset represented by the parent data model object, and the additional constraint(s) of the child data model object may ensure that the child data model object represents an object dataset that is a subset of the object dataset represented by the parent data model object. That is, the child data model object may represent a dataset including some or all, but not more than, the events of the object dataset represented by its parent data model object.

A user can use child data model objects to design reports with object datasets that already have extraneous data pre-filtered out. Accordingly, a user may want to base a report on a child data model object because it represents a specific or focused chunk of data, e.g., exactly the chunk of data the user needs for a particular report. Although data model object fields are inherited, it may not be necessary that a child data model object include additional fields. For example, it may be possible to have a data model object in which all of the fields for a specific data model object tree are defined in its root object (e.g., the fields for a parent data model object and its child data model objects are defined by the parent data model object), and the child data model objects can be differentiated from the root data model object and from each other by, for example, only their respective search constraints.

FIG. 1 is a diagram that illustrates an example tree structure 100 representing a "web intelligence" data model in accordance with one or more embodiments. The web intelligence data model has a root event data model object 102 (e.g., HTTP_Request) having multiple child data model objects 104 (e.g., ApacheAccessSearch, IISAccessSearch, HTTP_Success and so forth). The child data model objects 104 may have child data model objects of their own 106 (e.g., the HTTP_Success object has children of Pageview, AssetAccess, and so forth). These may be referred to as grand-child data model objects of the root event data model object 102. The grand-child data model objects 106 may have child data model objects of their own 108 (e.g., the AssetAccess object has children of DocAccess, and so forth). These may be referred to as great-grandchild data model objects of the root event data model object 102.

The search constraints of the parent data model objects may be inherited by the respective child data model objects. For example, the web intelligence data model's HTTP_Success object is a child of the root event object HTTP_Request and, thus, it may inherit the search constraint of sourcetype=access_* OR sourcetype=iis* from HTTP_Request and add the additional search constraint of status=2*. This additional search constraint may narrow the set of events represented by the object down to HTTP request events that result in success. A user might use this object for reporting if he/she already knows that he/she only wants to report on successful HTTP request events. The illustrated embodiment shows the search constraints for the DocAccess data model object, which is two levels down the web intelligence data model hierarchy from the HTTP_Success data model object. It includes search constraints that were inherited from its parent, grandparent and great-grandparent objects (e.g., from AssetAccess, HTTP_Success, and HTTP_Request, respectively), and adds an additional set of search constraints. The end result is a base search that is continually narrowed down by each set of search constraints. For example, first, the HTTP_Request data model object may setup a search that only finds webserver access events (e.g., acids the search constraint "sourcetype=access_* OR sourcetype=iis*"). Second, the HTTP_Success data model object may further narrows the focus down to successful webserver access events (e.g., adds the search constraint "status=2*"). Next, the Asset Access data model object may include a search constraint that filters out all events that involve website pageviews, which leaves only asset access events (e.g., adds the search constraint "uri_path!=*.php OR uri_path!=*.html OR uri_path!=*.shtml OR uri_path!=*.rhtml OR uri_path!=*.asp "). Finally, the DocAccess object may add a search constraint that reduces the set of asset access events returned by the search down to events that only involve access of documents including ".doc" or ".pdf" files (e.g., add the search constraint "uri_path=*.doc OR uri_path=*.pdr). When all the search constraints are added together, the base search constraint (e.g., the initial search query string) for the data model object Doc Access may be represented as follows:

sourcetype=access_*OR
sourcetype=iis*status=2*uri_path!=*.php OR uri_path!=*.html OR uri_path!=*.shtml OR uri_path!=*.rhtml OR uri_path!=*.asp uri_path=*.doc OR search uri_path=*.pdf A data model may be applied to search any data and may define criteria of a search query. For example, with reference to the previous discussion, if a parent data model is selected to perform a search, then the events that satisfy the search criteria defined by the parent data model may be returned. However, if a data sub-model is selected to perform a search on the same data, then the events of the data that satisfy the search criteria defined by the data sub-model may be returned. A search that is performed based on the search criteria of the data sub-model may result in the same number or fewer returned events than if its parent data model is selected to perform a search on the same data.

In summary, a data model may be defined by search criteria (e.g., a set of search constraints) and an associated set of fields. A data sub-model (e.g., a child of the parent data model) may be defined by a search (typically a narrower search) that produces a subset of the events that would be produced by the parent data model's search, and the sub-model's set of fields can include a subset of the set of fields of the parent data model and/or additional fields. Thus, a "data model" can refer to a hierarchically structured search-time mapping of semantic knowledge about source data containing events. A data model may encode the domain knowledge necessary to build a variety of specialized searches of those events. Data models are described in further detail in U.S. Pat. No. 8,788,525 issued on Jul. 22, 2014, U.S. Pat. No. 8,788,526 issued on Jul. 22, 2014, and U.S. patent application Ser. No. 14/067,203 filed Oct. 30, 2013, which are each hereby incorporated herein by reference in their entireties for all possible purposes.

In the context of the present disclosure, a data model object may be created when fields are identified from an object dataset produced by an initial search query. The initial search query may become the data model object's search constraint, and the identified fields (or the selected subset of the fields) may be the data model object's set of fields associated with the data model. The data model object may be saved and used to perform searches of other data. For example, a data model object defined by an initial search query of source data may be saved and subsequently applied to perform a search of events of the same or different set of source data.

Example Search and Reporting Processes

Figure 2A:
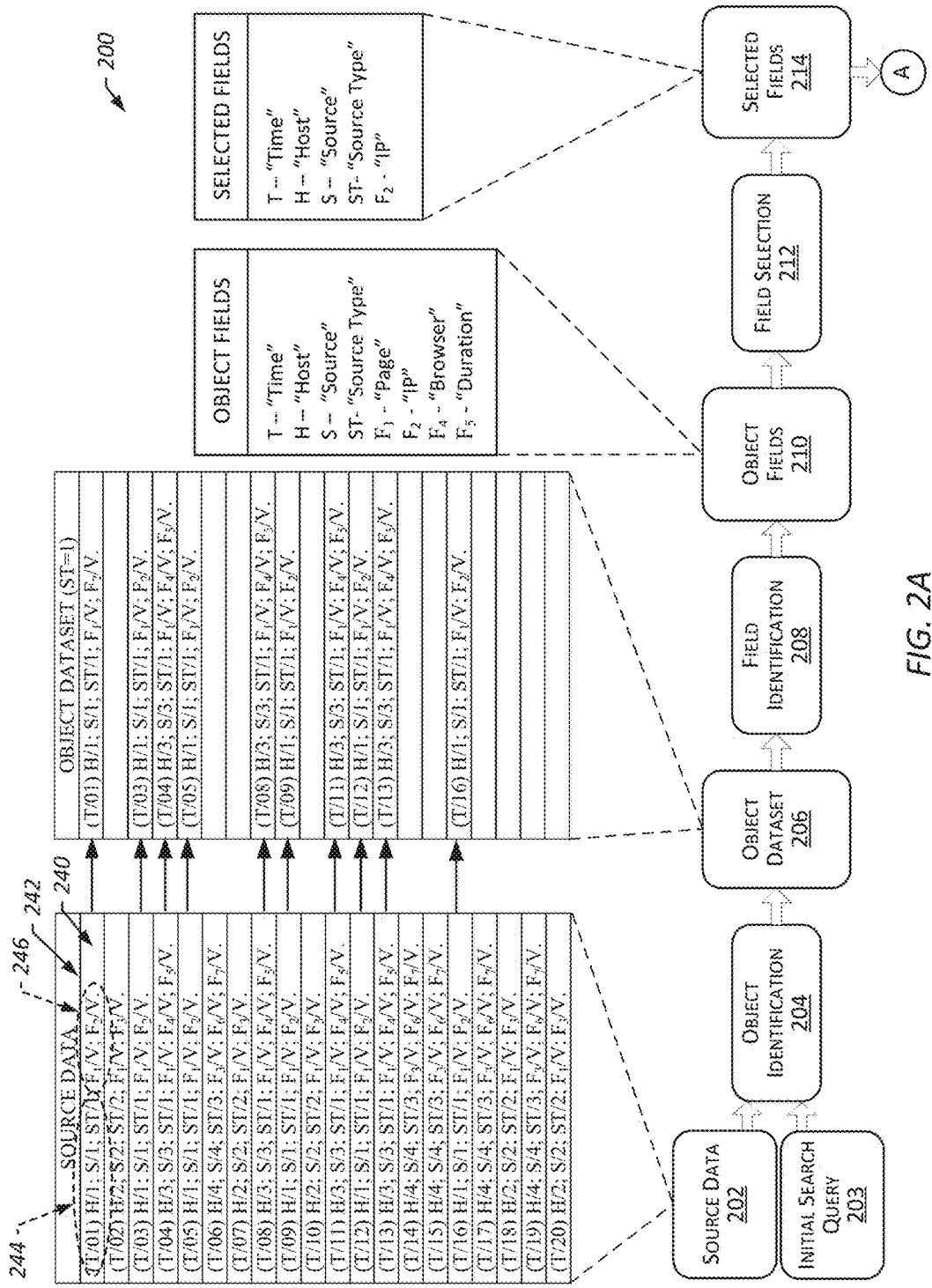
FIGS. 2A and 2B illustrate an example reporting process in accordance with one or more embodiments.
Figure 2B:
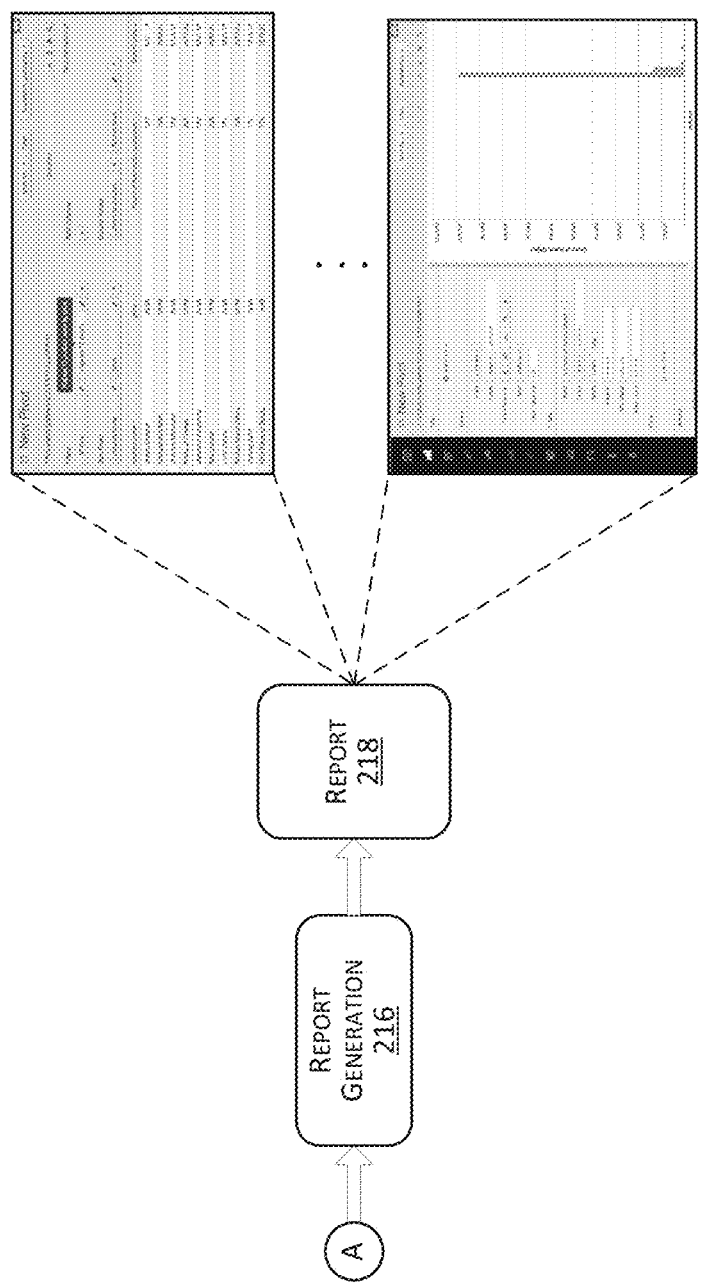

FIGS. 2A and 2B illustrate an example search and reporting process 200 in accordance with one or more embodiments. As illustrated, the process 200 may generally include performing an object identification process 204 (e.g., including searching a set of source data 202 to identify an object dataset 206 responsive to an initial search query 203) and performing a field (or attribute) identification operation 208 to identify a set of fields (or "object fields") 210 associated with the object dataset 206. The process 200 may also include performing a field (or attribute) selection process 212 to identify a set of fields (or a "set of selected fields") 214 including a selected subset of the object fields 210. The process 200 may also include performing a report generation process 216 using the object dataset 206 and the selected fields 214. The reporting process may result in generation of a report 218. In some embodiments, the reporting process 216 can enable a user to generate reports 218 including further filtering of the events 240 of the object dataset 206, aggregates for the events 240 of the object dataset 206, and/or tables, charts, and other visualizations of the data of the events 240 of the object dataset 206. The process 200 may be performed by processing logic that may include hardware (e.g., a processing device, circuitry, dedicated logic, programmable logic, microcode, etc.), software (e.g., instructions run on a processing device), or a combination thereof. In some embodiments, the example process 200 may be performed by one or more of the modules described herein, including those described with regard to at least the example field module 300 of FIG. 3.

In some embodiments, the source data 202 may include minimally processed data. For example, raw data may be received from an external source, such as a server. The raw data may, then, be subjected to a small amount of processing to break the data into events 240. And, the resulting set of events 240 may be stored as the source data 202. In some embodiments, the source data 202 can include a compilation of events 240 based on data received from any number of sources. The source data 202 may include, for example, a set of events 240 corresponding to log entries (or other time referenced event data) received from any number of servers, databases, applications, networks, and/or the like. In the illustrated embodiment of FIG. 2A, the source data 202 may include at least 20 events 240. Each of the events 240 may have respective sets of fields 242. Each of the fields 242 may have a respective value. For example, a time field may have a value of "23/Jul./2014:10:13:18.679-0700" corresponding to timestamp and/or an IP field may have a value of "35.0.1916.114" corresponding to an IP address. In the illustrated embodiment, for each field/value pair, a field type or name is represented by the characters before the "/" and the value is represented by the characters after the "/." For example, an IP field having a first value may be represented by "$F_3/1$" and an IP field having a second value may be represented by "$F_3/2$". Values are represented in the illustrated diagram simply as "1", "2", "3", "4" or "V" for the purpose of illustration. Although multiple fields are shown with "V" representing is value for the purpose of illustration, it will be appreciated that "V" may represent different values.

Each of the events 240 may include, or otherwise be associated with, a set of default fields. The default fields 244 may be included in each of the events 240 of the set of source data 202. Default fields 244 may include, for example, a host field (H), a source field (S), a sourcetype (ST) field and/or a time (T) field. Each of the events 240 may include a set of general fields, ($F_N$). The general fields 246 may vary in number and type, for example, based on the source of the data used to generate the respective dataset 240. For example, a first subset of the events 240 generated based on log data received from a first server may each include a time field (T), a page field ($F_1$) and an IP field ($F_2$) (but not an HTTP code field), whereas a second subset of the events 240 generated based on log data received from a second server may each include a time field (T), a page field ($F_1$), and an HTTP code field ($F_3$) (but not an IP field ($F_2$)).

Figures 2C, 3:
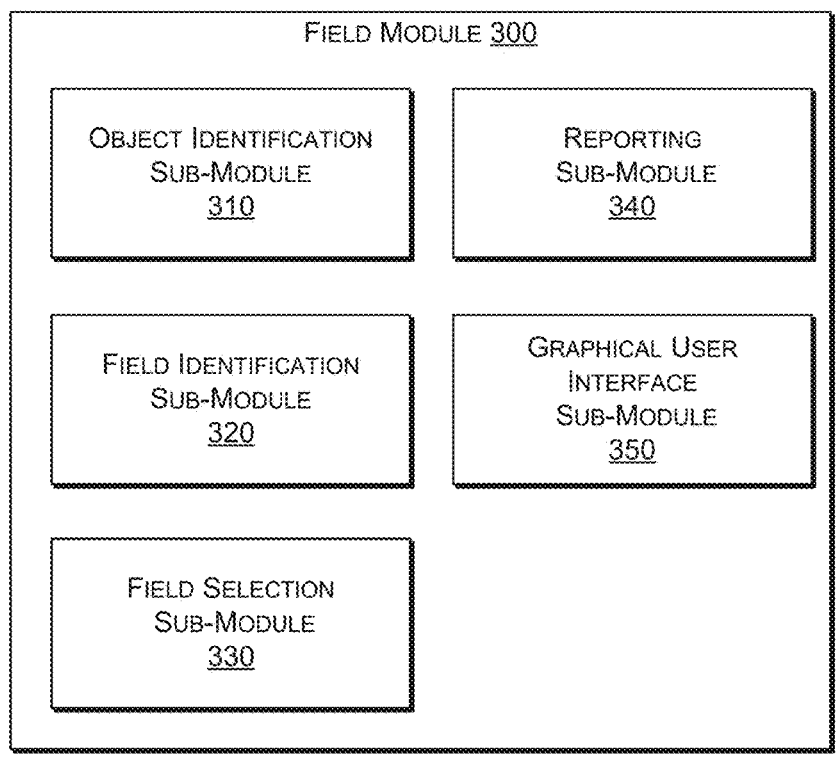
FIG. 2C illustrates an example event in accordance with one or more embodiments.
FIG. 3 is a block diagram that illustrates an example field module in accordance with one or more embodiments.

FIG. 2C illustrates an example event 240 in accordance with the disclosed embodiments. The event 240 can include fields 242 including default fields 244 and general fields 246. The default fields 244 may include a host field (H) having a value of "mrobichaud.sv.splunk.com", a source field (S) having a value of "/Users/mrobichaud/Builds/scrum-serach-ul/var/log/splunk/web_access.log", a sourcetype field (ST) having a value of "splunk_web_access", and a time field (T) having a value of "23/Jul./2014:10:13:18.679-0700". In the illustrated embodiment, some of the default fields (e.g., the host field (H), the source field (S), and/or the sourcetype field (ST)) may have been generated, for example, based on information known about the machine sending the data used to generate respective event 240a. The general fields 246 may include, for example, at least an IP field ($F_2$) having a value of "35.0.1916.114".

Referring back to FIGS. 2A and 2B, in some embodiments, the object identification process 204 can include receiving the initial search query 203 and identifying the corresponding object dataset 206 responsive to the initial search query 203. The object dataset 206 may include a set of events 240 of the source data 202 that are identified as responsive to the initial search query 203. The initial search query 203 may include one or more criteria for a particular field of source data and/or one or more requests for an analysis of data corresponding to the search results. The initial search query 206 may be received, for example, from a user via a search box of a GUI (e.g., a search interface of a reporting application). The object identification process 204 may include executing the initial search query 203 on the set of source data 202 (e.g., executing the initial search query 203 the initial set of events 240) to identify and return the object dataset 206. The object dataset 206 may include one or more events 240 of the source data 202 that are responsive to the initial search query 203 (e.g., one or more events 240 of the source data 202 that match or satisfy the criteria of the initial search query 203). In some embodiments, an event 240 may be identified as satisfying criteria of the initial search query 203 if, for example, the search query 203 specifies a field-value pair search constraint (e.g., a value for a particular field 242), and the event 240 contains a corresponding field-value pair that matches, or otherwise satisfies, the specified field-value pair. That is, for example, the event 240 contains the field 242 and the field 242 has a value that matches or otherwise corresponds to the value specified for the particular field 242 by the constraint. The object dataset 206 may include a subset (e.g., some or all, but not more than all) of the events 240 of the set of source data 102. If, for example, the object identification process 204 includes a search query 203 for events that are from a server, the object identification process 204 may include identifying and returning an object dataset 206 that includes events 240 in which the source type field 242 has a value corresponding to a "server" source type. In the illustrated example, if the object identification process 204 includes a search query 203 for events 240 having a "server" source type, and the "server" source type is represented by source type field-value pair of "ST/1", the object identification process 204 may include identifying and returning an object dataset 206 that includes the 10 events 240 with source type fields 242 having values of "ST/1"). Illustrative embodiments of the object identification process 204 (e.g., including providing an interactive GUI for receiving an initial search query and/or displaying search results responsive to the initial search query) are discussed herein with regard to at least FIG. 6A.

In some embodiments, the field (or attribute) identification process 208 can include identifying a set of fields (or "object fields") 210 that includes some or all of the fields that exists in (or are otherwise associated with) the events 240 of the object dataset 206. The field identification process 208 may include executing a field extraction process to identify some or all of the different types or names of fields 242 that are contained in the object dataset 206 and/or the respective values for the identified fields 242. Such a field extraction process may include, for example, identifying each of the fields 242 that exists in (or are otherwise associated with) the events 240 of the object dataset 206, a type or name associated with each of the respective fields 242 identified, and/or a value for each of the respective fields 242. In some embodiments, the extraction process is based on extraction rules. An extraction rule for a field 242 may include an instruction that specifies how to extract a name or type and/or a value for the field 242 from an event 240. Example extraction rules are further described below with regard to at least FIG. 11. Continuing with the above example with the object dataset 206 including the 10 events 240 with source type fields 242 having values of "ST/1", the field identification process 204 may identify and return the set of fields 242 included in the 10 events 240 this set of fields may be referred to as the object fields 210. The object fields 210 may include, for example, the types or names "host", "source", "sourcetype", "time", "page", "IP", "browser" and "duration", corresponding to H, S, ST, T, $F_1$, $F_2$, $F_4$ and $F_5$ respectively. Accordingly, the field identification process 208 may identify fields 242 that are included in events 240 that were returned in response to the initial search query 203, and the object fields 210 may include only fields 242 that are included in at least one of the events 240 that satisfy the criteria of the initial search query 203. Illustrative embodiments of the field identification process 208 (e.g., including providing an interactive GUI for displaying the identified fields) are discussed herein with regard to at least FIGS. 6A, 6B, and 6D.

In some embodiments, the field (or attribute) selection process 212 can include identifying fields 242 selected from the object fields 210. The set of fields 242 selected may be referred to as the set of selected fields 214. One or more fields 242 of the object fields 210 may be selected, or otherwise specified, automatically (e.g., based on one or more selection algorithms) and/or manually (e.g., at the request of a user). In some embodiments, a subset (e.g., some or all, but not more than all) of the object fields 210 can be selected automatically based on characteristics of the fields 242 of the object fields 210. For example, a field 242 of the object fields 210 may be selected based on a number of events 240 of the object dataset 206 that include the particular field 242 and/or based on a number of unique or different values of the particular field 242 in the object dataset 206. In some embodiments, a user can manually select fields 242 of the set of fields 210. For example, a listing of the fields 242 of the object fields 210 may be provided in an interactive GUI (e.g., a field selection interface of a reporting application), and the user may be able to select a group of fields 242 or select fields 242 one-by-one from the listing. Continuing with the above example, the host, source, and sourcetype fields 242 automatically selected automatically by default, and the user may manually select or add the time and IP fields 242 from the object fields 210. Thus, as illustrated in FIG. 2A, the set of selected fields 214 may include host, source, sourcetype, time, and IP fields. Illustrative embodiments of the field selection process 212 (e.g., including providing an interactive GUI for presenting fields that can be selected (e.g., displaying object fields 210), and/or for receiving user selection of fields) are discussed herein with regard to at least FIGS. 6A-6D.

In some embodiments, fields 242 are selected based on scores for the fields. For example, the field selection process 212 can include calculating a relevance score for some or all of the fields 242 of the identified set of fields (object fields 210) and selecting fields 242 based on the relevance scores. In some embodiments, a relevance score may indicate whether a field 242 may be of particular interest for use in further refining the object dataset 206 generated as a result of the initial search query 203. In some embodiments, the relevance score for a particular field 242 may be based on a number of unique or different values of the particular field 242 in the events 240 of the object dataset 206 and/or a number of events 240 of the object dataset 206 that include the field 242. In some embodiments, one or more fields 242 with a relatively high relevance score may be selected for inclusion in the set of selected fields 214, and one more fields 242 with a relatively low relevance score may not be selected and, thus, may be excluded from the set of selected fields 214. Thus, for example, the fields 242 with the top 10 highest relevance scores and/or relevance scores above a threshold score may be automatically selected for inclusion in the set of selected fields 214. Further embodiments of automatic selection of fields 242 that can be used are discussed herein with regard to at least method 500 of FIG. 5 and the disclosure of FIG. 6D.

In some embodiments, the report generation process 216 can include receiving user input defining a report and manipulating the data of the object dataset 206 to generate a report 218 that corresponds to the report definition. In some embodiments, the report generation process 216 may include, for example, receiving user input defining a report (a "report definition") including additional filtering criteria for one or more of the fields 242 of the set of selected fields 214, further filtering the object dataset 206 and/or related data to identify a subset of the events 240 of the object dataset 206 that satisfy the additional filtering criteria provided in the report definition, and generating a report 218 that includes the subset of the events 240. In some embodiments, the report generation process 216 can include, for example, receiving user input defining a report (a report definition) including a request for aggregates to be calculated using the data of the object dataset 206 and/or related data, generating, or otherwise determining, the requested aggregates using the data of the object dataset 206 and/or related data, and/or displaying the aggregates. In the context of string type attributes, for example, an aggregate may include a list of distinct values, a first value, a last value, a count, and a distinct count. In the context of numeric type attributes, for example, an aggregate may include a sum, a count, an average, a max, a min, a standard deviation, and a list of distinct values. In the context of timestamp type attributes, for example, an aggregate may include a duration, an earliest time, and a latest time. In some embodiments, the report generation process 216 may include, for example, receiving a user input defining a report (a report definition) including a request for one or more visualizations of the data of the object dataset 206 and/or related data, generating the requested visualizations of the data of the object dataset 206 and/or related data, and/or displaying the visualizations. A visualization may include, for example, a table, a column chart, a bar chart, a scatter chart, and/or the like.

In some embodiments, the report generation process 216 can include any combination of the above. For example, the report generation process 216 may include, receiving additional user specified filtering criteria for one or more of the fields 242 of the set of selected fields 214, and receiving user request for aggregates and visualizations. Such a reporting generation process 216 may include further filtering the object dataset 206 using the additional filtering criteria to generate a further filtered set of data, generating, or otherwise determining, the corresponding aggregates calculated using the further filtered set of data, generating the visualizations of the further filtered set of data, and/or displaying a report including the further filtered set of data, the aggregates and/or the visualizations.

In some embodiments, the report generation process 216 can include enabling the user to make iterative changes to the report definition (e.g., via a report editor interface of a reporting application), thereby modifying the report 218 until it fits her/his needs. The report generation process 216 may also include enabling the user to save the resulting reports (e.g., including the generated reports and/or the report definitions) and/or save a data model object defining the underlying dataset and selected fields used to generate the reports. Thus, both the reports and the underlying data set can be easily recreated or accessed for later use. In some embodiments, the resulting report and options to save the report (and the underlying data model) is provided via a GUI (e.g., a report editor interface of a reporting application). Such a GUI may be used to view the resulting report and/or further modify the report definition. Illustrative embodiments of the report generation process 216 (e.g., including providing an interactive GUI for defining and displaying reports, receiving user request to save reports and/or the underlying data model objects for the reports) are discussed herein with regard to at least FIGS. 6E-6T and 7A-7J.

In some embodiments, the report generation process may be driven by a predefined data model object, such as a data model object defined and/or saved via a reporting application (such as those described herein), or a data model object obtained from another source. That is, for example, the initial search query and fields use to drive a report editor (such as those described herein with regard to at least FIGS. 6E-6T and 7A-7J) may be obtained from a data model object, regardless of whether or not the data model object was generated using the report editor or a reporting application associated therewith. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates and the like) and the search may be used to identify events (e.g., to identify events responsive to the search) used to generate the report. That is, for example, if a data model object is selected to drive a report editor, the GUI of the report editor may enable a user to define reporting criteria for the report using the fields associated with the selected data model object, and the events used to generate the report may be constrained to the events that match, or otherwise satisfy, the search constraints of the selected data model object.

In some embodiments, selection of a data model object for use in driving a report generation may be facilitated by a data model object selection interface. For example, an interactive data model selection of a report editor may display a listing of available data models, enable a user to select one of the data model, display the data model objects associated with the data model selected, and enable a user to select one of the displayed data model objects for use in driving the report generation process. For example, the selected data model object may be used to drive a report editor interface as described herein. With regard to FIG. 1, for example, a report editor interface may display an interactive data model object selection GUI that includes the "web intelligence" data model, in response to selection of the "web intelligence" data model from the interactive data model object selection GUI, the GUI may display an interactive hierarchical listing of data model objects for the selected data model, such as an object selection tree similar to that of tree 100 of FIG. 1, including elements for each of the ApacheAccessSearch object, the USAccessSearch object, the HTTP_Success object and so forth. The user may select one of the data model objects in the tree 100, and the selected data model object may be used to drive a report editor. For example, if a user selects the "DocAccess" object, the report editor may be driven by the "DocAccess" object. This may include the report editor employing the fields associated with the "DocAccess" object (e.g., providing interactive elements that enable defining filters and splitting rows and columns, and/or defining attributes using the fields associated with the "DocAccess" object and so forth, as described herein with regard to at least FIGS. 6E-6T and 7A-7J), and employing the search associated with the "DocAccess" object to constrain the events used to generate the report to the events that match, or otherwise satisfy, the search constraints associated with the "DocAccess" object.

Example Program Modules

FIG. 3 is a block diagram that illustrates an example field module 300 in accordance with one or more embodiments. The field module 300 may be implemented, for example, in the event-processing system 800 depicted as described with regard to at least FIG. 8. The field module 300 may include an object identification sub-module 310, a field identification sub-module 320, a field selection sub-module 330, a reporting sub-module 340, and a graphical user interface (GUI) sub-module 350. The object identification sub-module 310 may perform some or all of the various functions and/or features of object identification (e.g., the object identification process 204). The field identification sub-module 320 may perform some or all of the various functions and/or features of field identification (e.g., the field identification process 208). The field selection sub-module 330 may perform some or all of the various functions and/or features of field selection (e.g., the field selection process 212). The reporting sub-module 340 may perform some or all of the various functions and/or features of reporting (e.g., the report generation process 216). The graphical user interface (GUI) sub-module 350 may provide for presenting displays (e.g., rendering the described interactive GUIs for display to a user) and/or receiving user input (e.g., an initial search query, selection of fields, report definitions and/or the like). Although certain embodiments are discussed with regard to operations performed by a given module for the purpose of illustration, the functionality and/or features of one or more of the sub-modules may be combined (e.g., shared) or divided (e.g., distributed).

Example Search and Reporting Method

Figure 4:
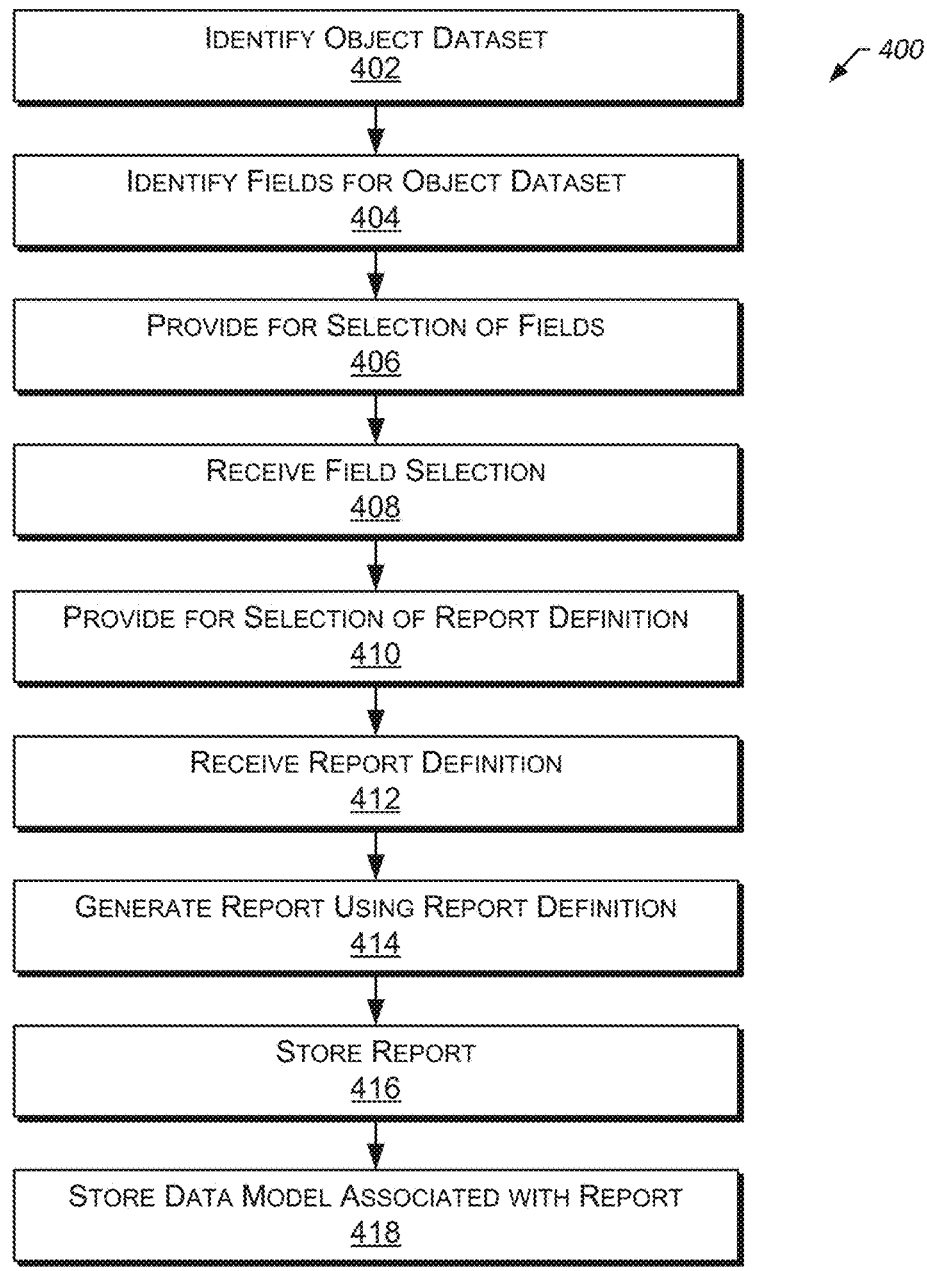
FIG. 4 is a flowchart that illustrates an example method for generating reports in accordance with one or more embodiments.

FIG. 4 is a flowchart that illustrates an example method 400 for generating reports in accordance with one or more embodiments. Method 400 can generally include identifying an object dataset (block 402), identifying fields for the object dataset (block 404), providing for and receiving selection of fields (blocks 406 and 408), providing for selection of a report definition (block 410), receiving a report definition (block 412), generating a report using the report definition (block 414), and storing the report and/or the data model object associated with the report (blocks 416 and 418). The method 400 may be performed by processing logic that may comprise hardware (e.g., a processing device, circuitry, dedicated logic, programmable logic, microcode, etc.), software (e.g., instructions run on a processing device), or a combination thereof. In some embodiments, the method 400 may be performed by one or more modules of the field module 300 of FIG. 3.

In some embodiments, identifying an object dataset (block 402) can include the object identification sub-module 310 performing some or all of the various functions and/or features of the object identification process 204 discussed above, including, for example, receiving the initial search query 203 and identifying the corresponding object dataset 206 responsive to the initial search query 203. Identifying an object dataset may include, for example, providing an interactive GUI for receiving an initial search query from a user as discussed herein with regard to at least FIG. 6A.

In some embodiments, identifying fields for the object dataset (block 404) can include the field identification sub-module 320 performing some or all of the various functions and/or features of the field identification process 208 discussed above, including, for example, identifying a set of fields 210 that include some or all of the fields 242 that exists in, or are otherwise associated with, the set of events 240 of the object dataset 206.

In some embodiments, providing for selection of fields and receiving selection of fields (blocks 406 and 408) can include the field selection sub-module 330 performing some or all of the various functions and/or features of the field selection process 212 described above, including, for example, identifying a set of selected fields 214 selected from the identified set of fields (e.g., object fields 210). The selected fields 242 may be referred to as the set of selected fields 214. Providing for selection of fields and receiving selection of fields may include, for example, displaying, or otherwise causing the display of, an interactive GUI for field selection as discussed herein with regard to at least FIGS. 6A-6D. In some embodiments, providing for the selection of fields may include displaying, or otherwise causing the display of, an interactive GUI displaying fields that can be selected (e.g., displaying the identified set of fields, object fields 210). In some embodiments, receiving the selection of fields may include receiving user selection of a subset of the fields via the interactive GUI (e.g., receiving selection of a subset of the fields 242 from the set of fields (e.g., object fields 210) displayed in the interactive GUI).

In some embodiments, providing for selection of a report definition (block 410) can include the reporting sub-module 340 performing some or all of the various functions and/or features of the report generation process 216 including, for example, displaying, or otherwise causing the display of, an interactive report editor GUI including interactive elements (e.g., including drop-down selections and/or other interactive elements) that can be employed by a user to submit a report definition. The report definition may define additional filtering criteria, aggregates, visualizations and/or the like that for use in generating the report 218. The interactive elements may enable a user to select or otherwise define additional filtering criteria for one or more of the fields 242 of the set of selected fields 214, to select or otherwise define a request for aggregates to be calculate using the data of the object dataset 206 and/or related data, and/or to select or otherwise define a request for visualization of the data of the object dataset 206 and/or related data. Such an interactive report editor GUI is discussed in more detail herein with regard to at least FIGS. 6E-6T and 7A-7J.

In some embodiments, receiving a report definition (block 412) can include the reporting sub-module 340 performing some or all of the various functions and/or features of the report generation process 216 including, for example, receiving, via the interactive report editor GUI, the elements of a user submitted report definition. The input may include receiving user input defining additional filtering criteria for one or more of the fields 242 of the set of selected fields 214, receiving user input defining a request for aggregates to be calculate using the data of the object dataset 206 and/or related data, and/or receiving user input defining a request for visualization of the data of the object dataset 206 and/or related data. In some embodiments, the selection of a report definition may be facilitated by the use of the interactive elements (e.g., including drop-down selections and/or other interactive elements). In some embodiments, generating a report using the report definition (block 414) includes the reporting sub-module 340 performing some or all of the various functions and/or features of the report generation process 216 including, for example, generating a report 218 that corresponds to the report definition.

Generating a report that corresponds to the report definition may include, for example, further filtering the object dataset 206 and/or related data to identify a subset of the events 240 of the object dataset 206 that satisfy the additional filtering criteria provided in the report definition, and generating a report 218 that includes the subset of the events 240. Generating a report that corresponds to the report definition may include, for example, generating the aggregates requested in the report definition, e.g., using the data of the object dataset 206 and/or related data. Generating a report that corresponds to the report definition may include, for example, generating the visualizations requested in the report definition, e.g., using the data of the object dataset 206 and/or related data. Generating a report that corresponds to the report definition may include a combination of the above, including, for example, further filtering the object dataset 206 and/or related data to identify a subset of the events 240 of the object dataset 206 that satisfy the additional filtering criteria provided in the report definition, and generating aggregates or visualization using the further filtered data (e.g., a subset of the events 240). In some embodiments, generating one or more reports using the criteria includes displaying, or otherwise causing the display of, an interactive GUI for defining and displaying reports, receiving user request to save reports and/or the underlying data model objects for the reports as discussed herein with regard to at least FIGS. 6E-6T and 7A-7J I.

In some embodiments, storing the reports and the data model object associated with the report (blocks 416 and 418) includes saving the report 218 (e.g., including saving the generated reports and/or the report definitions) and/or the underlying data model object associated with the report 218 (e.g., the data model object defining the search constraints used to identify the object dataset 206 and the selected fields 214) in memory.

The saved data model may include a data structure representing one or more constraints (e.g., the underlying initial search query 203) and associated fields (e.g., the set of fields 210 and/or the selected fields 214). Accordingly, in some embodiments, a data model may be created and saved that defines or otherwise corresponds to the following: (i) a set of events responsive to an initial search query (e.g., the events 240 of object dataset 206), and (ii) a set of fields that are defined for at least some set of events responsive to an initial search query (e.g., fields 210 and/or selected fields 214). Thus, for example, if a user loads the saved data model object using a report editor of a reporting application, such as the report editor described herein with regard to at least FIGS. 6E-6T and 7A-7J, a search of source data (e.g., source data 202) using the initial search query of the data model object can be executed to identify the events of the source data that are responsive to the initial search query (e.g., object dataset 206), and the user may be presented with the events and the fields associated with the data model object (e.g., fields 210 and/or selected fields 214) without the user having to repeat the process of defining a data model object (e.g., without having to enter an initial search query and/or select fields to be associated with the data model object).

The saved report may include a data structure representing the data model object (e.g., the data representing the underlying initial search query 203 and the selected fields 214) and report definition. Thus, for example, if a user loads the saved report the user may be presented with a similar report generated using the source data 202 (or an updated or current set of source data 202) without having to repeat the process of defining a data model object of defining the report. Of course, in some embodiments, the user may be afforded to the option to modify the saved data model object and/or the saved report. Thus, the saved data model object and the saved report may provide a starting point for creating a new-modified data model and/or report.

In some embodiments, the user can be provided with the option to save various aspects of the search and reporting process at different stages of the reporting process. With regard to the initial search query and field identification, for example, upon completing the initial search query and field identification processes, but before field selection process, the user may save a data model object that corresponds to the initial search query and the identified fields, even before defining and/or saving a report generated using the initial search query and the identified or selected fields. With regard to the initial search query and field selection, for example, upon completing an initial search query (including field identification) and field selection, the user may save a data model object that corresponds to the initial search query and the identified or selected fields. A user may be able to load the data model at a later time to reproduce the initial search query and the selected fields (e.g., identified or selected) on the same set of source data or a different (e.g., updated) set of source data. With regard to the filtering and reporting, for example, upon defining at least a portion of the report (e.g., defining further filtering, aggregates, and visualization) the user may save a report that corresponds to the initial search query, the selected fields, and the defined report. A user may be able to load the report at a later time to reproduce the report on the same set of source data or a different (e.g., updated) set of source data.

Accordingly, in one example, the source data 102 may include a given number of fields 242 (e.g., an initial group of fields). For example, an initial group of fields (e.g., object fields 210) may include all of the different fields 242 that exist or are otherwise associated with the events 240 of the source data 102. The set of fields (or object fields 210) may represent a subset of (e.g., some or all, but not more than) the fields 242 of the source data 102. For example, the set of fields 210 may represent fields 242 from events 240 that satisfy criteria of the initial search query 203. Accordingly, the set of fields 210 may include the same number or fewer fields 242 than the initial group of fields. Furthermore, the selected fields 214 may represent a subset of (e.g., some or all, but not more than) the fields 242 from the set of fields 210. For example, the selected fields 214 may represent specific fields 242 that have been selected to be displayed in a graphical user interface so that one or more report definitions (or criteria) may be provided for one or more of the specific fields 242.

As another illustrative example, the initial group of fields may be fields from 1,000 events 240 that are included in source data 102. The 1000 events 240 may include 100 different fields 242. A search may be performed on the 1,000 events 240 based on an initial search query 203, and 200 of the events 240 may be determined to satisfy the criteria of the initial search query 203. The fields 242 of the 200 events 240 may be identified. For example, 10 fields 242 may be identified as existing in (or otherwise being associated with) any of the 200 events 240. Only 2 of the 10 fields 242 may be selected (e.g., automatically and/or manually) for use in defining reports. The 2 fields may be provided via interactive elements of a report editor GUI that can be used to define a report, and a user may generate a report definition (e.g., defining further filtering, aggregates, and visualization) using some or all of the interactive elements associated with the selected fields.

Figure 5:
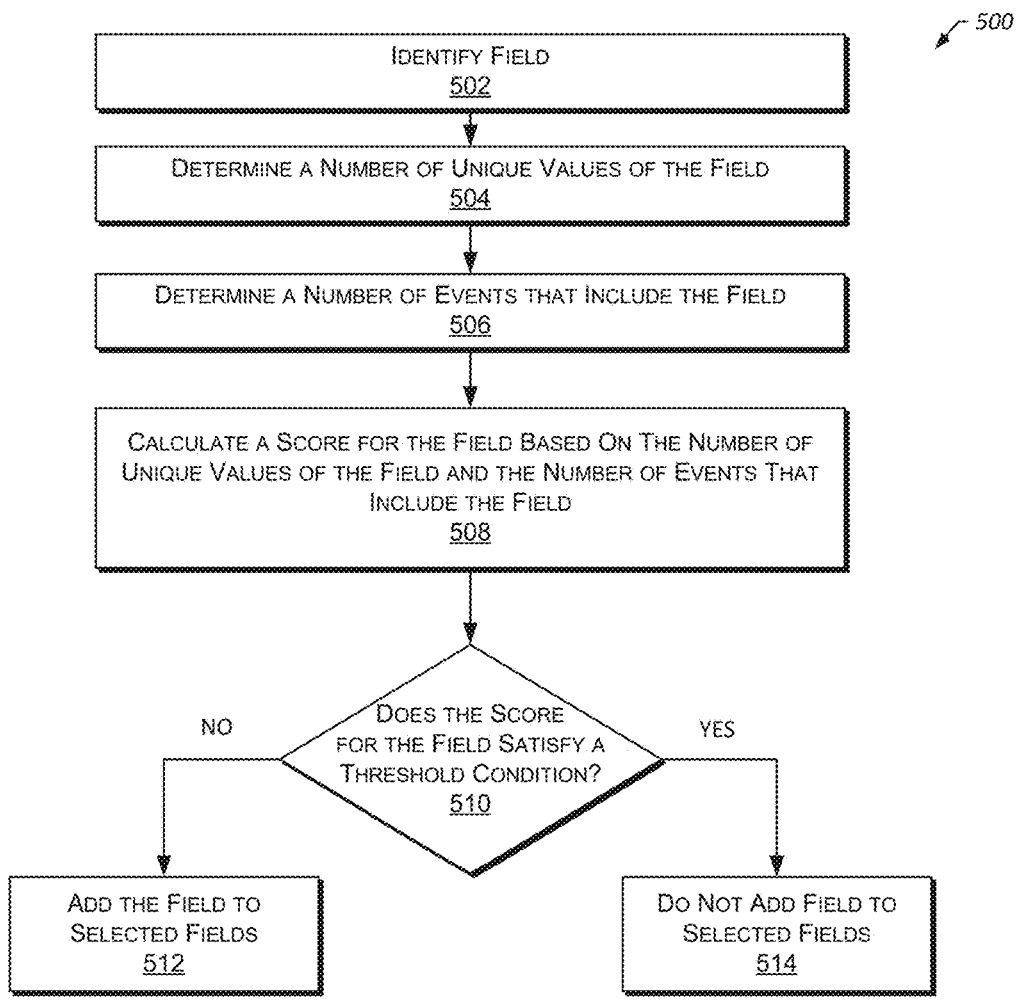
FIG. 5 is a flowchart that illustrates an example method for selecting a field in accordance with one or more embodiments.

FIG. 5 is a flowchart that illustrates an example method 500 for selecting a field in accordance with one or more embodiments. The method 500 may be performed by processing logic that may include hardware (e.g., a processing device, circuitry, dedicated logic, programmable logic, microcode, etc.), software (e.g., instructions run on a processing device), or a combination thereof. In some embodiments, the method 500 may be performed by one or more modules of field module 300 of FIG. 3. In some embodiments, the method 500 may be performed as part of a field selection process 212 and/or by the field selection sub-module 330.

As shown in FIG. 5, the method 500 may include identifying a field (block 502). Identifying a field may include, for example, the field selection sub-module 330 identifying a field 242 of the set of fields 210.

The method 500 may include determining a number of unique values for the field (block 504). Determining a number of unique values for the field may include, for example, the field selection sub-module 330 identifying each event 420 of the object dataset 206 that includes the field 242 and, for all such returned events 420, determining the total number of unique or different values that are included in the field 242.

The method 500 may include determining the number of returned events that include the field (block 506). Determining the number of returned events that include the field may include, for example, the field selection sub-module 330 identifying the total number of events 420 of the object dataset 206 that include the field 242.

The method 500 may include calculating a relevance score for the field based on the number of different or unique values of the field and the number of events that include the field (block 508). Calculating the relevance score for the field based on the number of different or unique values of the field and the number of events that include the field may include, for example, the field selection sub-module 330 calculating the relevance score for the field 242 using the following equation (equation 1):

$$\text{Relevance Score} = V(f)^e * P(f)^i \qquad (1)$$

In some embodiments, V(f) may refer to the variance of a particular field, where the variance represents the number of unique or different values for the field from various events, and P(f) may refer to a percentage of the events that include the particular field. The variables 'e' and 'i' may be tunable parameters that can be preselected (e.g., automatically by processing logic) based on a percentage of fields that should be selected to be displayed in a report editor GUI. Accordingly, a relevance score for a particular field 242 may be calculated based on (i) the number of unique or different values that exists for the field 242 in the various events 240, (ii) the number of the events 240 that include the field 242, and/or (iii) a percentage or ratio of fields 242 that should be selected to be displayed in the report editor GUI. In some embodiments, a field 242 that has more unique or different values and/or is included in more events 240 may have a relatively higher relevance score than a field 242 that has less unique or different values and/or is included in less events 240. Furthermore, fields with a relatively higher relevance score may be selected for use and/or display in the reporting editor GUI over a field 242 with a relatively lower relevance score. Additionally, a relatively higher percentage of fields 242 that should be selected to be displayed in the report editor GUI may result in the display of more fields 242 than a relatively lower percentage of fields 242 that should be selected to be displayed in the report editor GUI.

The method 500 may include determining if the score for the field satisfies a threshold condition (block 510). The method 500 may include, if the relevance score that is calculated for the field satisfies the threshold condition, adding the field to a set of selected fields (block 512). The method 500 may include, if the relevance score that is calculated for the field does not satisfy the threshold condition, not adding the field to (or otherwise excluding the field from) a set of selected fields (block 514). For example, if the relevance score that is calculated for the field satisfies the threshold condition, then the field 214 may be added to the selected fields 214 that are to be displayed to a user via the report editor GUI (e.g., for possible use in defining a report on the events 240 of the object dataset 206). If the relevance score that is calculated for the field does not satisfy the threshold condition, however, then the field 214 may not be added to the selected fields 214. Thus, the field 242 may not be displayed to a user via the reporting GUI and/or may not be available for defining a report on the events 240 of the object dataset 206. In some embodiments, the threshold condition may be based on a percentage of fields 242 that are to be displayed in the graphical user interface. For example, a defined percentage of fields 242 are to be displayed and a number of the fields 242 that are required to satisfy the defined percentage may be displayed. The fields 242 that are displayed to satisfy the defined percentage may be fields 242 associated with higher calculated relevance scores. In some embodiments, the threshold condition may be based on a total number of fields 242 that are to be displayed in the graphical user interface. For example, the fields 242 with the highest calculated relevance score may be displayed in the graphical user interface and the total number of such displayed fields 242 may be defined by the threshold condition. Furthermore, the threshold condition may be based on a threshold relevance score. For example, fields 242 with a calculated relevance score that meets or exceeds the threshold relevance score may be displayed in the graphical user interface while fields 242 with a calculated relevance score that does not meet or exceed the threshold relevance score may not be displayed in the graphical user interface.

Graphical User Interface Operations and Processes

Figure 6A:
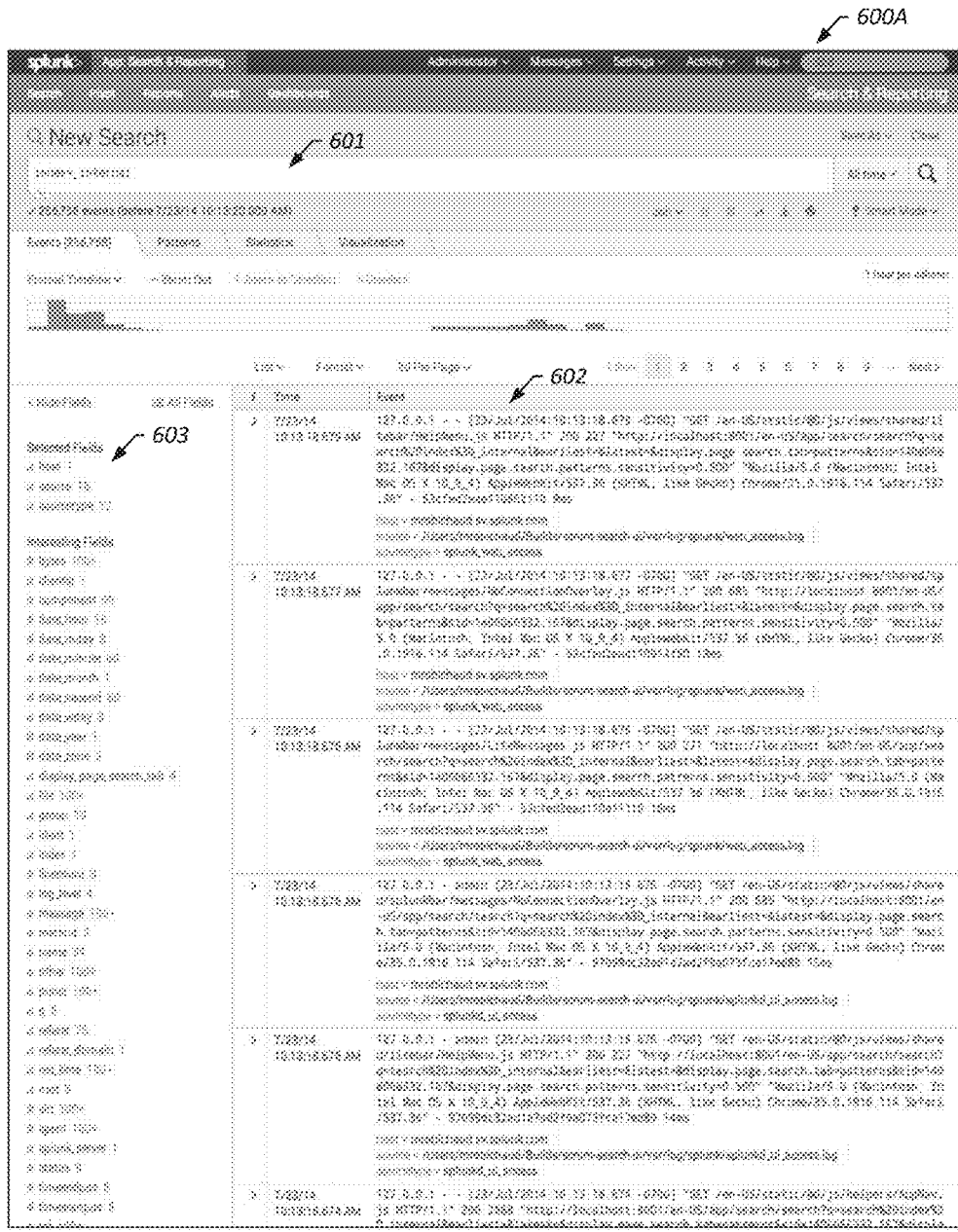
FIGS. 6A-6T illustrates example graphical user interfaces of a reporting application in accordance with one or more embodiments.
Figure 6B:
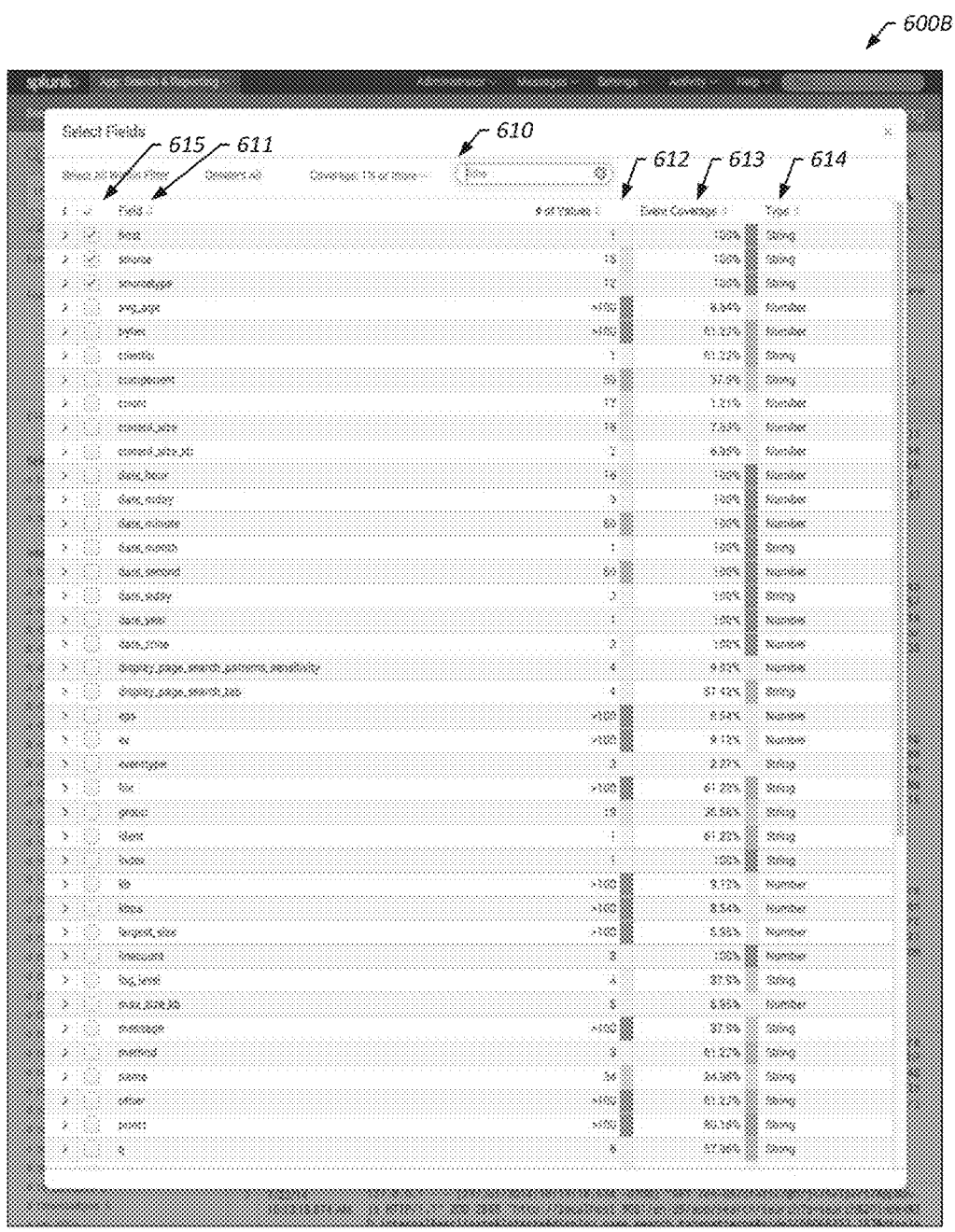
Figure 6C:
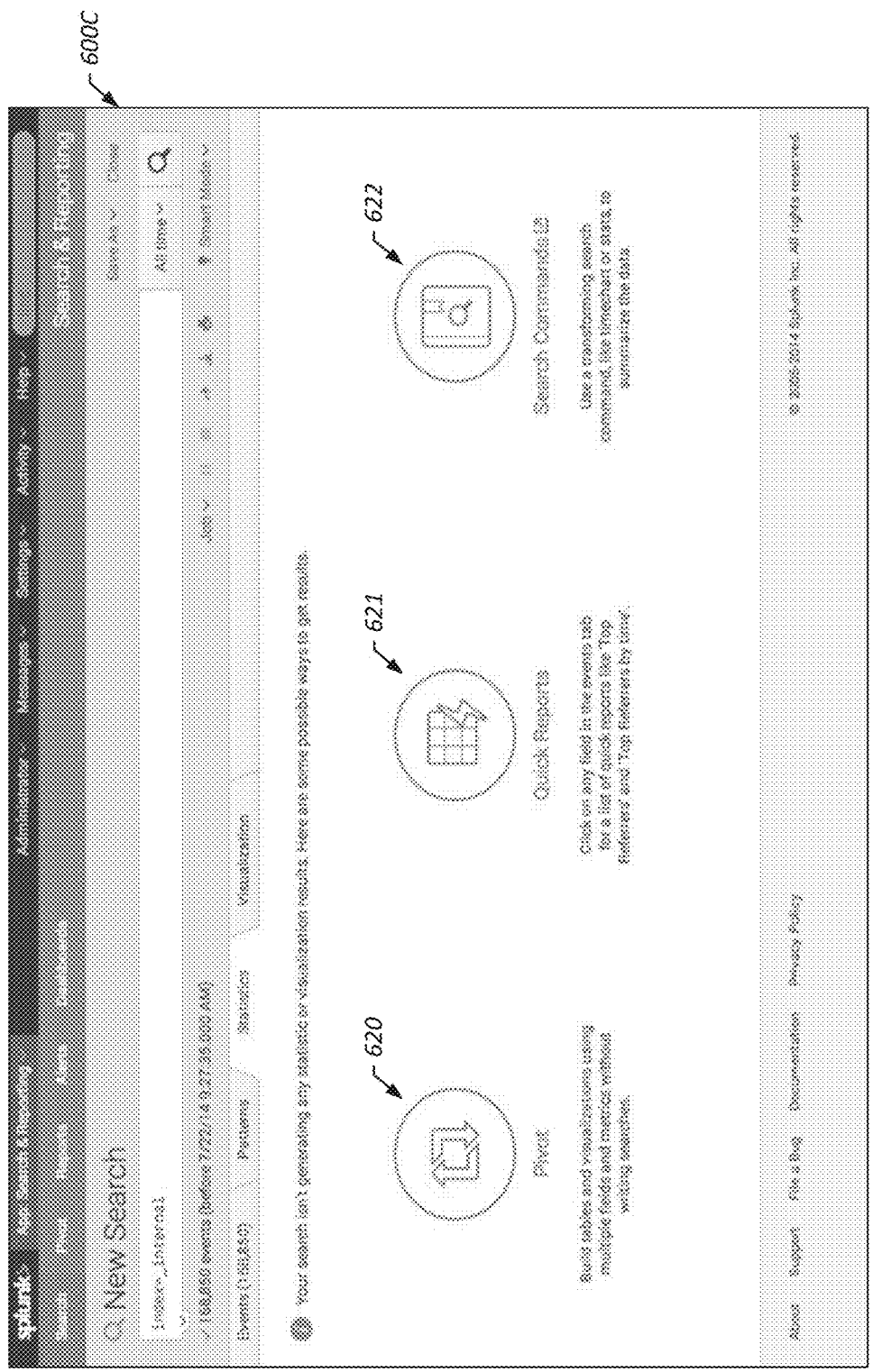
Figure 6D:
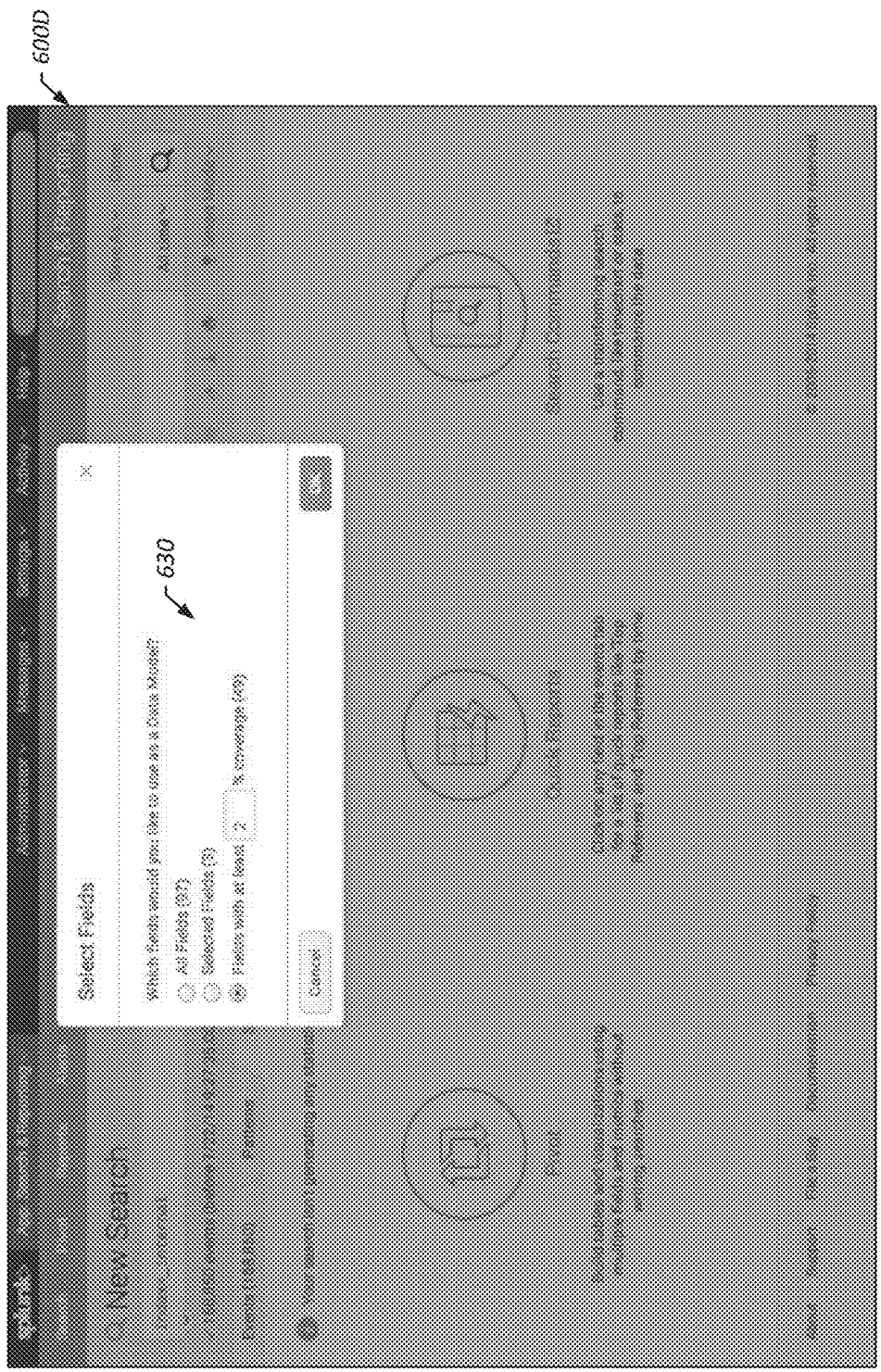
Figure 6E:
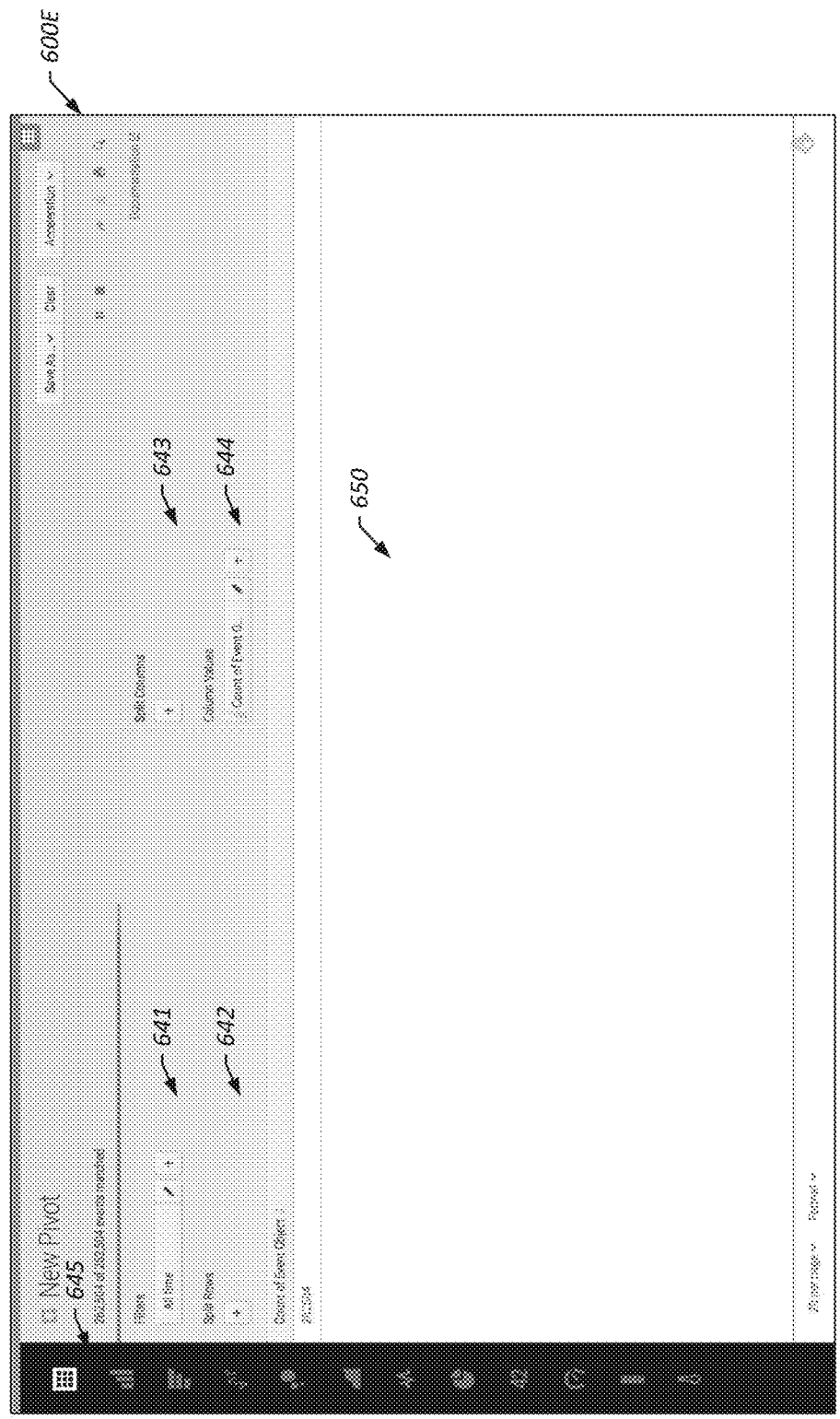
Figure 6F:
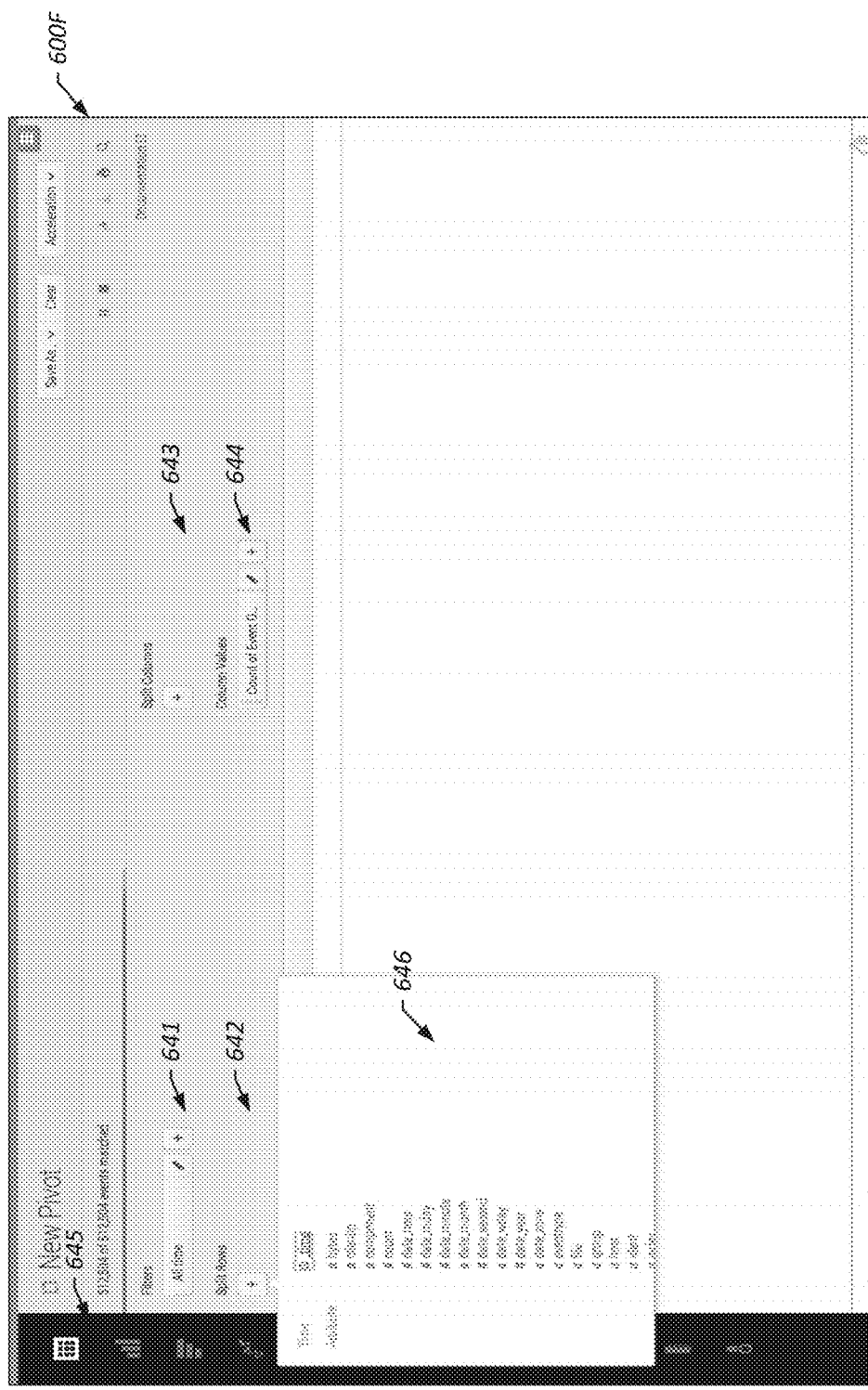
Figure 6G:
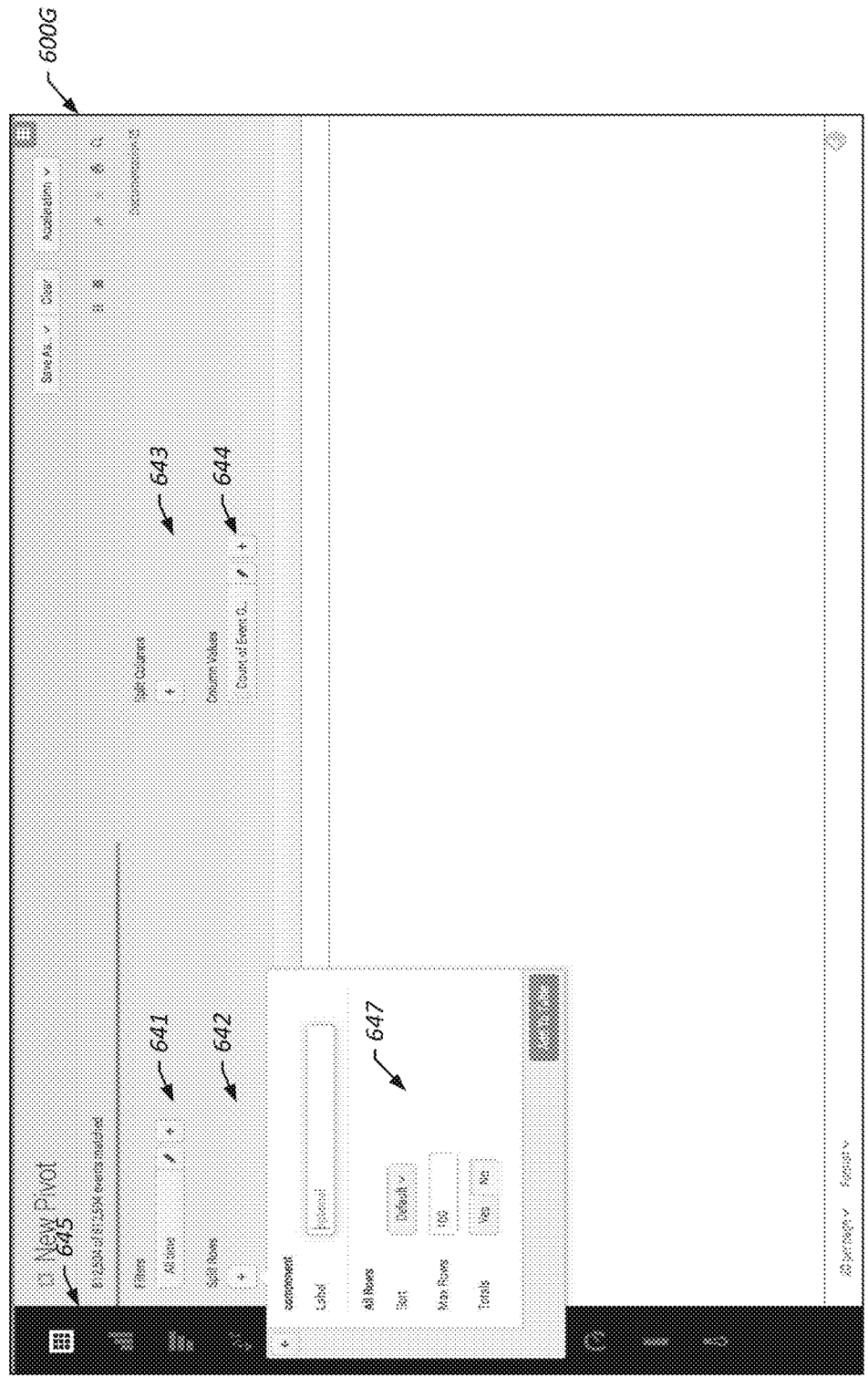
Figure 6H:
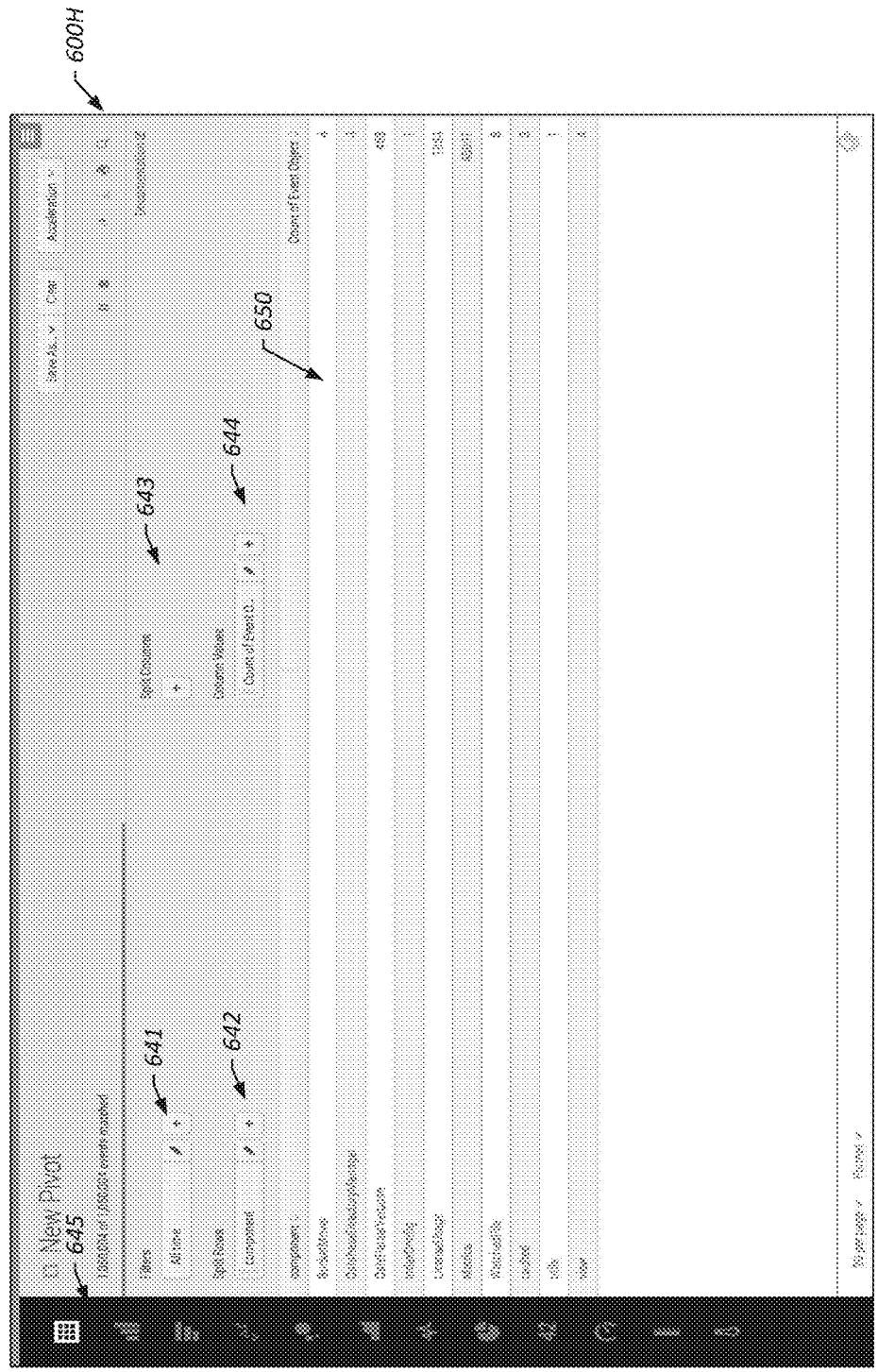
Figure 61:
Figure 6J:
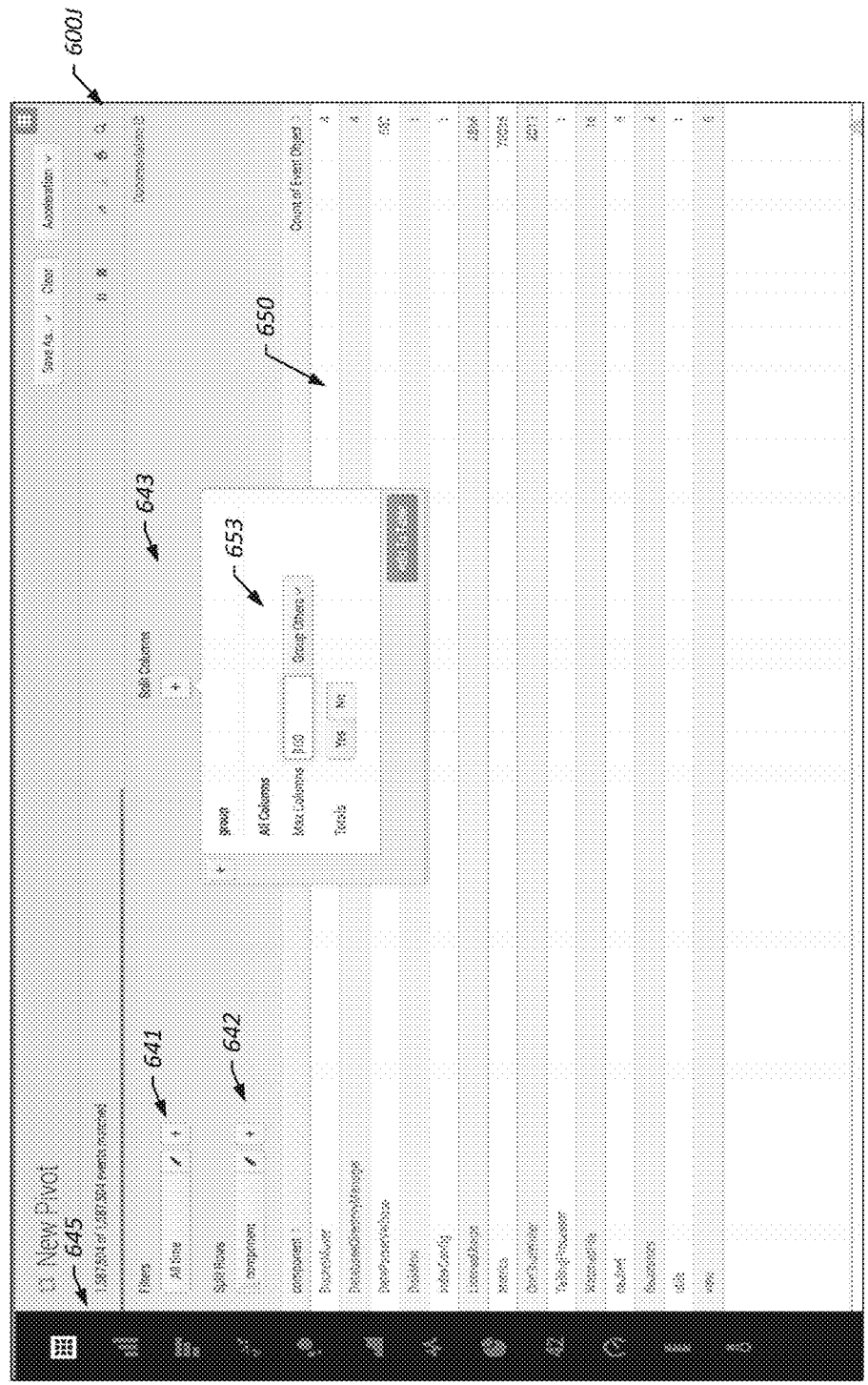
Figure 6K:
Figure 6L:
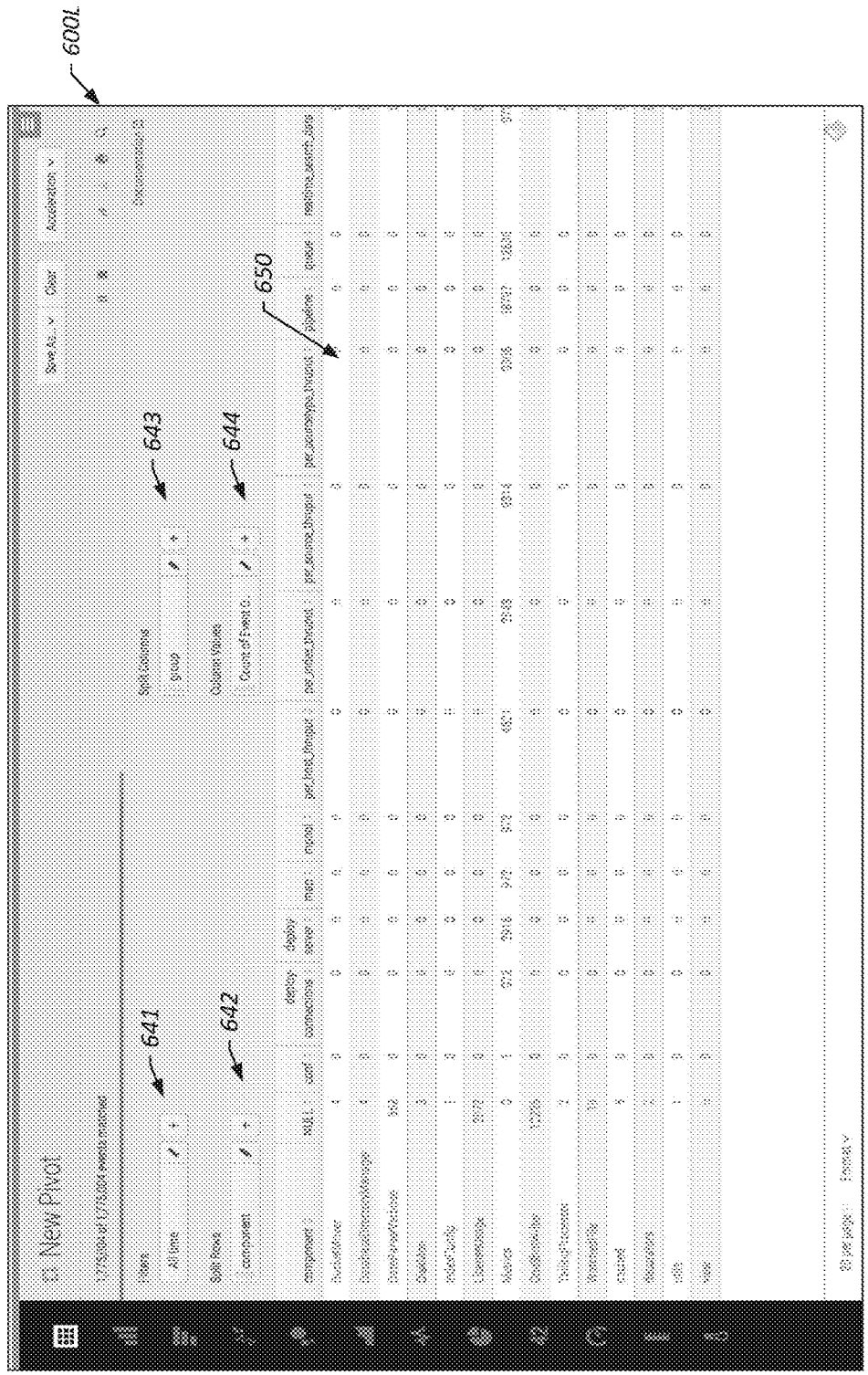
Figure 6M:
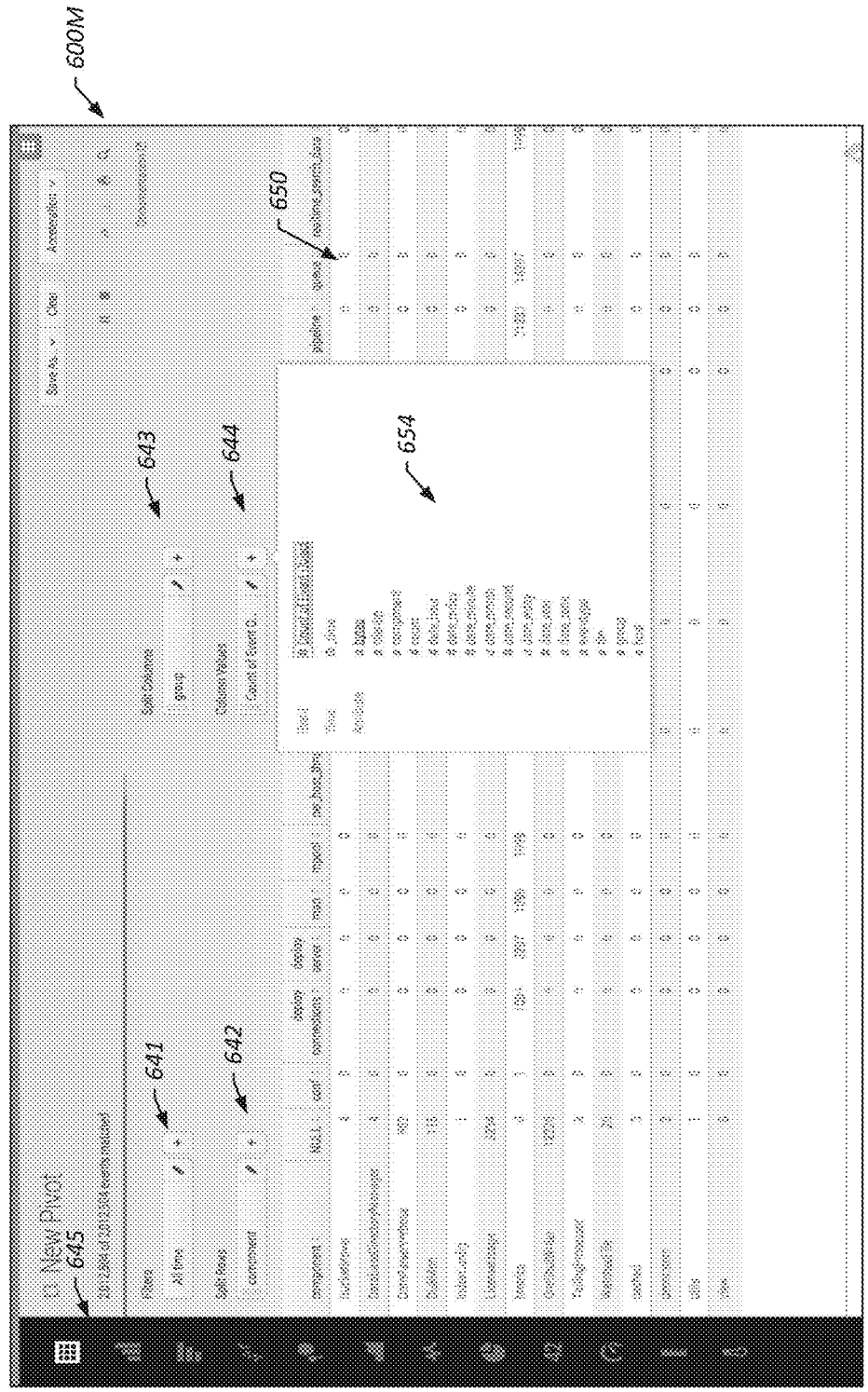
Figure 6N:
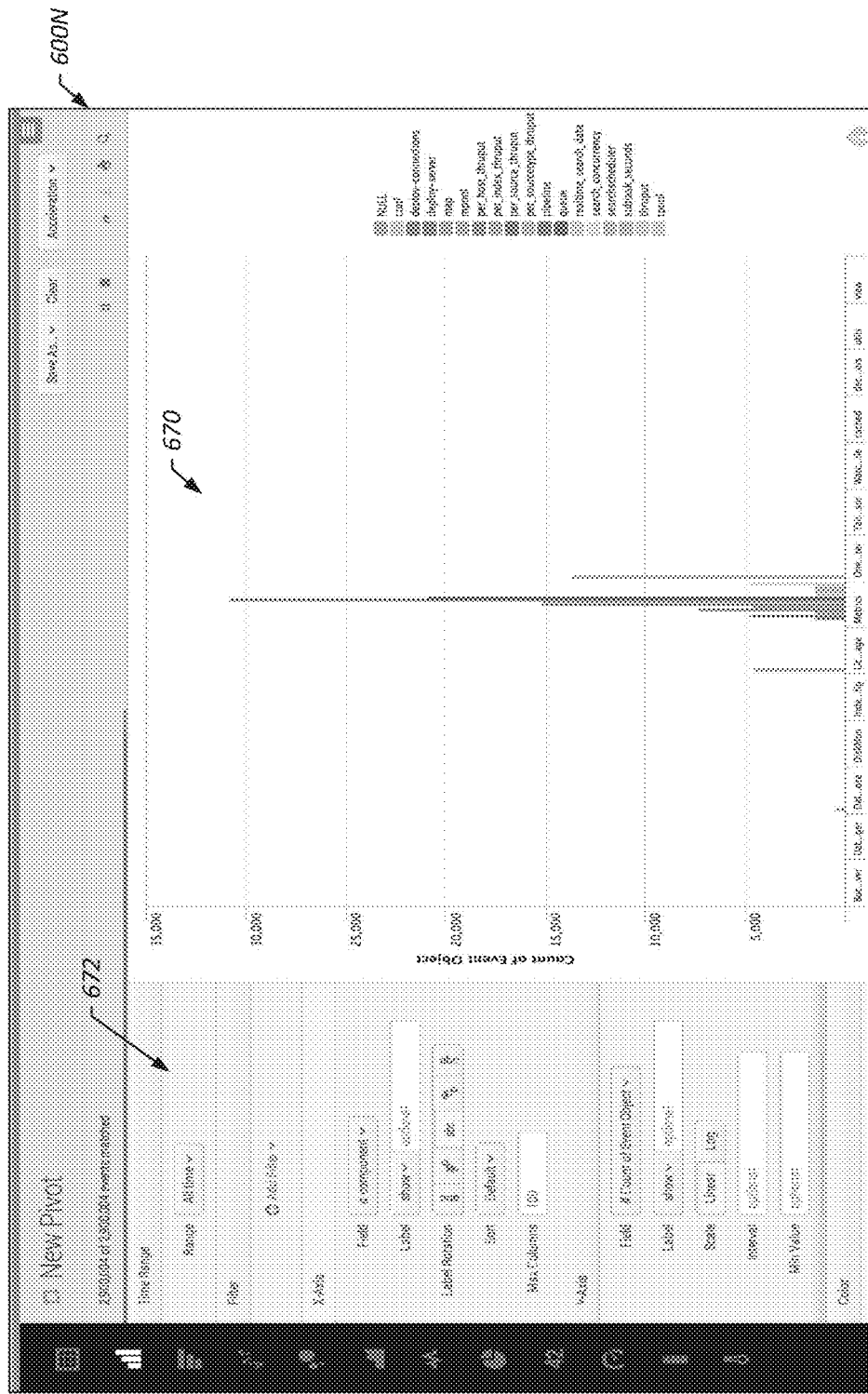
Figure 6O:
Figure 6P:
Figure 6Q:
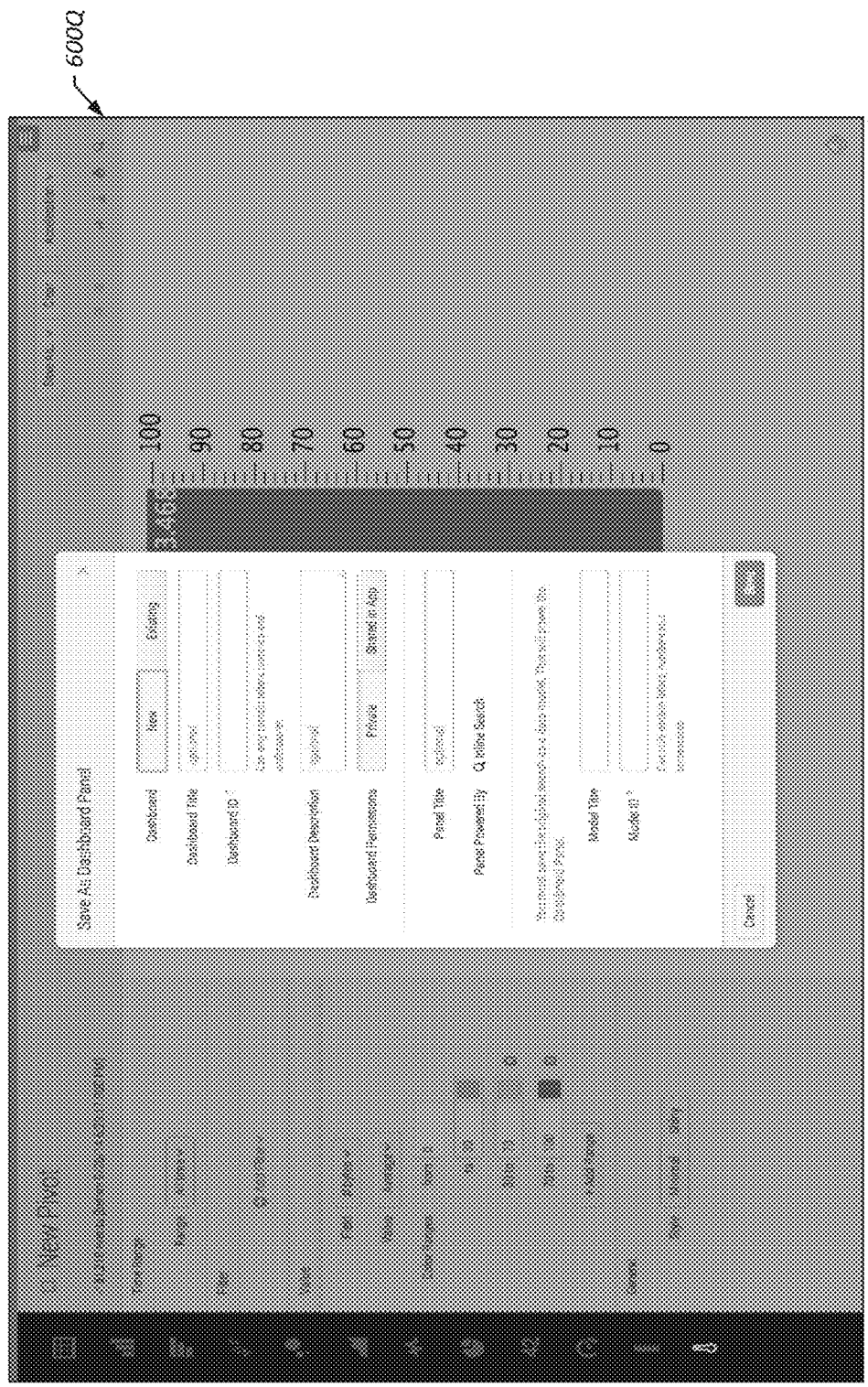
Figure 6R:
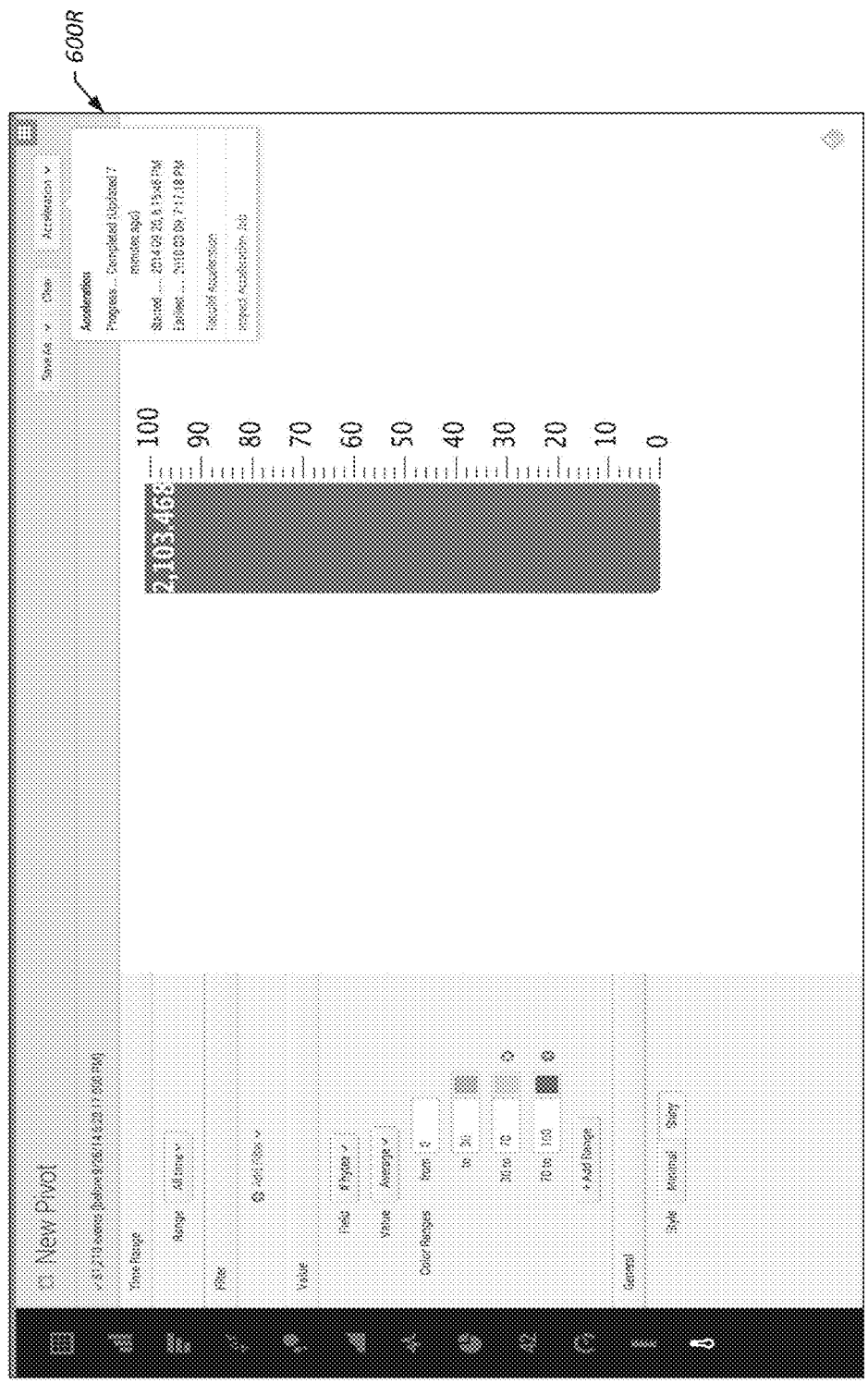
Figure 6S:
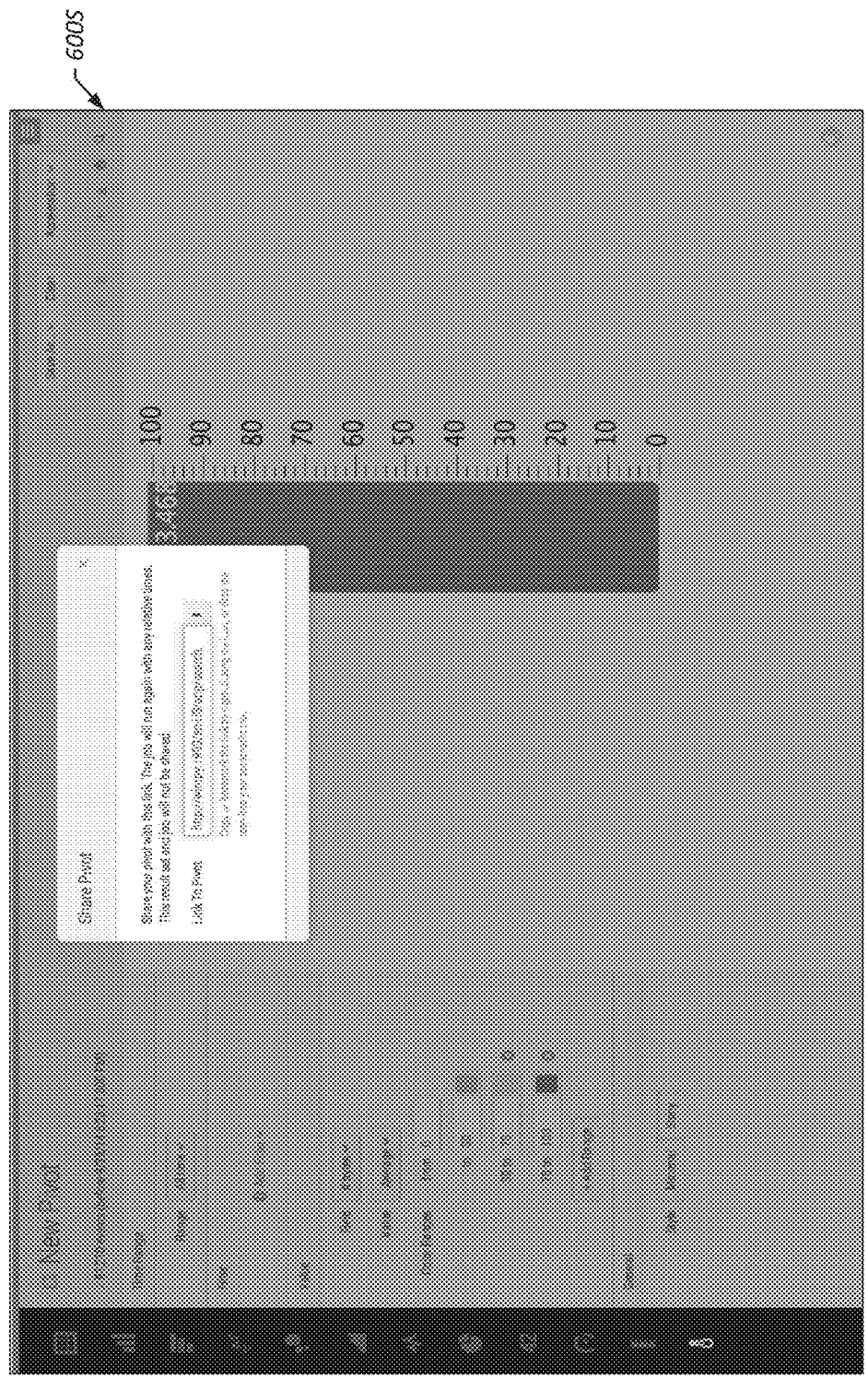
Figure 6T:
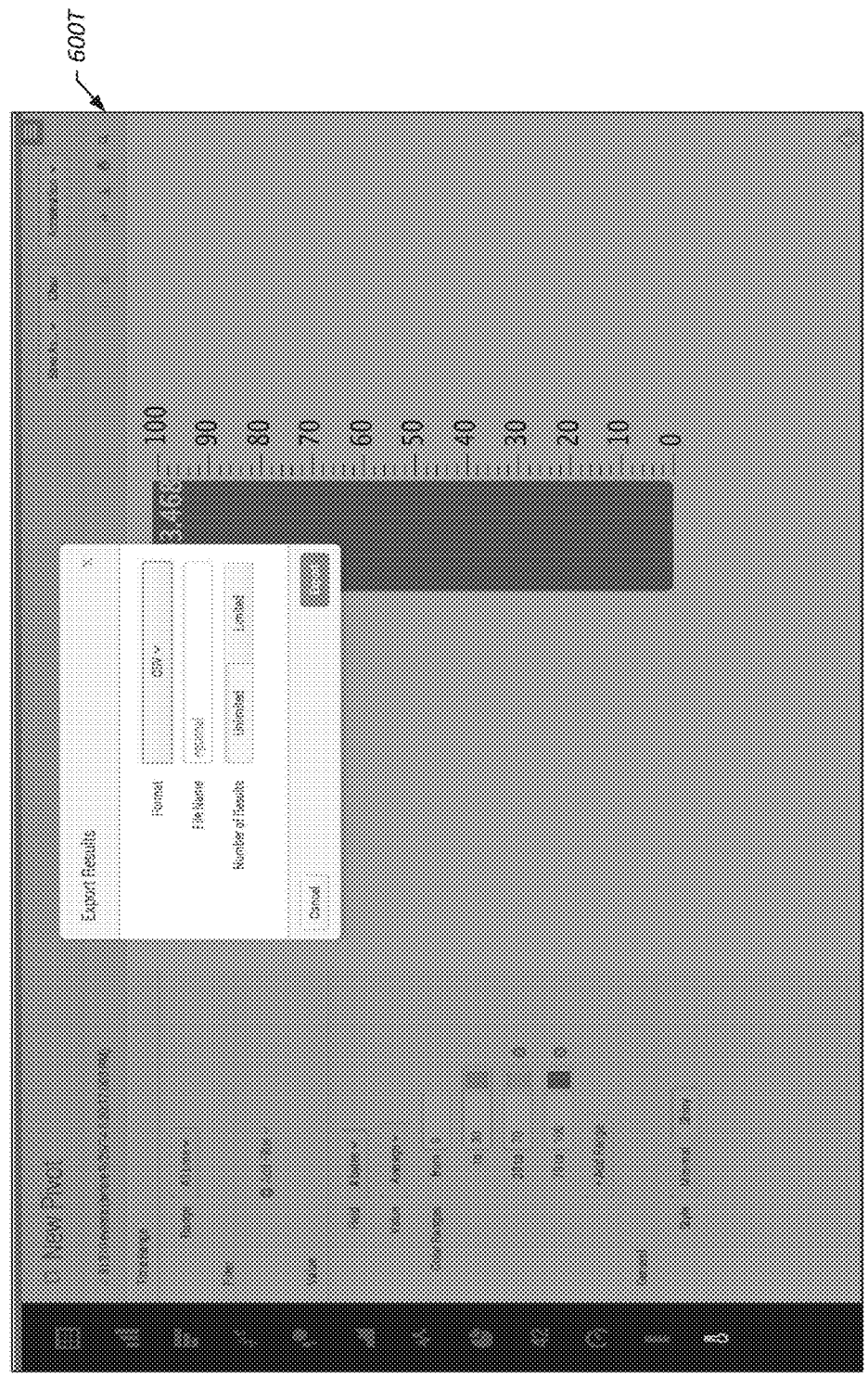

The following provide illustrations and descriptions of interactive GUIs of a reporting application that can be used to define an initial search query (see, e.g., FIG. 6A), to display events responsive to the initial search query and fields the exists in, or otherwise associated with, the events responsive to the initial search query (see, e.g., FIGS. 6A and 6B), to enable automatic and/or manual selection of fields (see, e.g., FIGS. 6B and 6D), to enable a user to define a report and to display corresponding reports that are generated based on the report definitions (see, e.g., FIGS. 6E-N and 7A-7J), and to enable a user to save a report, its underlying data model object and/or the like (see, e.g., FIGS. 6O and 6T). Each of the illustrations are accompanied by description of how the graphical user interfaces operate, definitions available using the graphical user interfaces, and how a user can use the graphical user interface to define the respective elements of a report definition.

FIG. 6A illustrates an example graphical user interface 600A displaying events returned in response to a search query according to one or more embodiments of the disclosure. In general, the graphical user interface 600A may correspond to a graphical user interface that is provided by a field module 300 of FIG. 3.

As shown in FIG. 6A, the graphical user interface 600A may display a reporting application's "Search Page." The page may include an "Events Section" (e.g., as indicated by the selected tab). The Search Page may include a search query box 601, a search results section 602, and a fields section 603. In some embodiments, an initial search query (e.g., "index=_internal") may be input into the search query box 601 by a user and the user may submit the initial search query to perform a search of source data. In response to the searching of the source data based on the initial search query, a subset of the events (e.g., an object dataset) may be returned and displayed. For example, a listing of a portion or all of the events of the source data that satisfy criteria of the initial search query may be displayed in the search results section 602. Furthermore, in some embodiments, the fields section 603 may display certain fields (e.g., the identified fields (attributes)) that are included in the events that satisfy the criteria of the initial search query. For example, the fields section 603 may display fields that have relatively high relevance scores (as described herein). Each field can be displayed in association with the number of events that include this field and/or the number of unique or different values the events have for this field. In some embodiments, the fields section 603 may display the relevance score that has been calculated for each of the fields displayed in the fields section 603. Upon selection of the "All Fields" link 604, the reporting application's "Select Fields" page (or dialogue) may be displayed. Upon selection of the "Statistics" tab 605 the reporting application's "Statistics Section" may be displayed.

FIG. 6B illustrates an example graphical user interface 600B displaying a reporting application's "Select Fields" page (or dialogue) according to one or more embodiments of the disclosure. The page may include a listing of fields identified from the events that were returned in response to an initial search query. The graphical user interface 600B may correspond to a graphical user interface that is provided by a field module 300 of FIG. 3. The graphical user interface 600B may be displayed after a user has performed an initial search of source data based on the initial search query (e.g., from the graphical user interface 600A).

As shown in FIG. 6B, the graphical user interface 600B may display an interactive listing of multiple fields (e.g., object attribute (fields)) that have been identified after an initial search of source data and/or corresponding aggregates or statistics. For example, the graphical user interface 600B may display an interactive listing 610 that includes a field identifier column 611, field values column 612, event (or field) coverage column 613 and a type column 614. In some embodiments, the field identifier column 611 may display the names fields that were identified after the initial search of data. The field values column 612 may display a number of different or unique values for the respective field in the field identifier column 611. For example, as shown, field "source" includes 15 different values for source addresses. Furthermore, the field coverage column 613 may display a percentage of events returned in response to the initial search that include a particular field. For example, the event coverage value of 100% for the field "source" indicates that all (100% of) events returned in response to the initial search query include the field "source". In some embodiments, check boxes 615 are displayed for each of the fields. A user may manually select or filter some or all of the fields (e.g., by selecting check boxes 615 for each field to be selected). As described herein, a user may be provided with an opportunity to provide additional filtering criteria (e.g., selected criteria) for selected fields and that criteria can be used to further filter the subset of the events (e.g., the object dataset) returned by the initial search query. In some embodiments, at least a portion of the check boxes 615 may be automatically (by default, without user input) checked or selected based on the type of field and/or relevance scores that are calculated for the fields. For example, "host", "source", and "sourcetype" may be initially selected based on the fields being default fields and/or each of them having relatively high relevance scores. Upon closing the "Selected Fields" page, the "Events Section" of the "Search Page" may again be displayed.

FIG. 6C illustrates an example graphical user interface 600C displaying the reporting application's "Statistics Section" (e.g., as indicated by the selected tab) according to one or more embodiments of the disclosure. The section may include a "Pivot" link 620, a "Quick Reports" link 621, and a "Search Commands" link 622. The graphical user interface 600C may correspond to a graphical user interface that is provided by a field module 300 of FIG. 3. The reporting application's "Pivot Editor" or "Report Editor" interface may be displayed in response to selection of the "Pivot" link 621. The reporting application's "Quick Reports" interface may be displayed in response to selection of the "Quick Reports" link 621. The reporting application's "Search Commands" interface may be displayed in response to selection of the "Search Commands" link 622.

FIG. 6D illustrates an example graphical user interface 600D displaying a "Report Editor—Select Fields" page (or dialogue) according to one or more embodiments of the disclosure. The page may be displayed in response to selecting the "Pivot" link 620 of the "Statistics Section" of FIG. 6C. The graphical user interface 600D may correspond to a graphical user interface that is provided by a field module 300 of FIG. 3.

The "Report Editor—Select Fields" page (or dialogue) may display an interactive listing of automatic field identification options 630. For example, a user may select one of the three illustrated options (e.g., the "All Fields" option, the "Selected Fields" option, or the "Coverage" option fields with at least a specified % of coverage)). If the user selects the "AN Fields" option, all of the fields identified from the events that were returned in response to an initial search query may be selected. That is, for example, all of the fields of the objects fields (attributes) (e.g., all of the fields of the objects fields listed at the "Select Fields" page of FIG. 6B) may be selected. If the user selects the "Selected Fields" Option, only the fields selected by the user (e.g., via the "Select Fields" page of FIG. 6B) may be selected. If the user selects the "Coverage" option, only the fields meeting the specified coverage criteria may be selected. The percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. Examples of calculated coverages for events are illustrated in the field coverage column 613 of the "Select Fields" page 600B of FIG. 6B. If, for example, the user selects the "Coverage" option and specifies a coverage value of 2% (as depicted), only fields having a coverage value equal to or greater than 2% may be selected. The number of fields corresponding to each option may be displayed in association with each option. For example, in the illustrated embodiment, "97" indicates that 97 fields will be selected if the "All Fields" option is selected, "3" indicates that 3 of the 97 fields (e.g., host, source and source type selected in FIG. 6B) will be selected if the "Selected Fields" option is selected, and "49" indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage. For example, if a user changes the coverage value from 2% to 5%, "97" may be changed to a new value (e.g., "75") representing the number of fields having a coverage of 5% or greater. In some embodiments, the selection option selected by default (e.g., the "All Fields" option, the "Selected Fields" option or the "Coverage" option) is determined based on number of fields extracted. For example, if there are less than 50 extracted fields, then the "All Fields" option is selected by default; if the number of selected fields is between 10 and 50, then the "Selected Fields" option is selected by default; otherwise, the "Coverage" option is selected by default with the default percent coverage being a percentage that would result in selection of less than 50 fields. The default option may be selected (e.g., have its radio button selected.) when the "Select Fields" dialogue box is opened. Upon selecting the "OK" button, a "Report Editor" page of the reporting application's "Report Editor" interface may be displayed.

FIG. 6E illustrates an exemplary graphical user interface 600E displaying the reporting application's "Report Editor" page. The page may be displayed in response to selecting the "OK" button of the "Select Fields" page (or dialogue) of FIG. 6D. The graphical user interface 600E may correspond to a graphical user interface that is provided by a field module 300 of FIG. 3.

The page may display interactive elements for defining various elements of a report (e.g., a "Application Report"). For example, the page includes a "Filters" element 641, a "Split Rows" element 642, a "Split Columns" element 643, a "Column Values" element 644, and a visualization selection menu 645. The page may include a table of results 650, including a default display of a count of event objects 645 (e.g., that match the initial search criteria). FIG. 6F illustrates an exemplary graphical user interface 600E displaying the Split Rows element 642 is expanded, revealing a listing of fields 646 that can be used to define additional criteria (e.g., reporting criteria). The listing of fields 646 may correspond to the selected fields (attributes). That is, the listing of fields 646 may list only the fields previously selected, either automatically and/or manually by a user via the "Select Fields" page 600B of FIG. 6B and or the "Select Fields" page (or dialogue) 600D of FIG. 6D. FIG. 6G illustrates an exemplary graphical user interface 600G displaying a formatting dialogue 647 that may be displayed upon selecting a field from the listing of fields 646. The dialogue can be used to format the display of the results of the selection (e.g., label the column to be displayed as "component").

These elements may represent four basic application element categories: filters, split rows, split columns, and column values. Initially, only two elements may be defined: a Filter element 641 (e.g., set to All time); and a Column Values element 644 (e.g., set to the Count_of_<object_name>attribute). This may provide the total count of results returned by the corresponding object dataset (also referred to herein as the "object") over all time. Multiple elements may be added from each element category to define a report results (or report) table.

The Filter element 641 may be used to cut down the result count for the object. This element can facilitate further restrictions in addition to those that might be applied via constraints or other means in the object's definition. In some embodiments, all report results may be filtered by time range. A user may optionally add one or more filters by attribute. The Filter element 641 may enable a user to select a field of the selected set of fields for use in further filtering the matching events based on values for the field. For example, if a user is viewing a "Page Views" object that contained page view events for a website, he/she could set up a filter that would cause the results table to display only those page view events from the past week that were successful (they have an http_statusvalue of 2*).

The Split Rows element 642 may be used to split-out the report results by row. The Split Rows element 642 may enable a user to select a field of the selected set of fields for use in grouping events by values for the field. For example, a user may use this element to configure a Page View object to display a row for each month of the past year, thus breaking out the page view count by month. Column and bar charts may use the first split row element in results table definitions to provide their x-axis values. Area and line charts may use the first results table split row element for their x-axis values, but may only use this when it also uses the time attribute. When a user switches to an area or line chart, the interface may populate the x-axis with time, whether the time is being used in a split row element or not. Scatter charts may use the first two split row elements in a results table definition. The first split row element may be required for scatter charts as it may create a "mark" on the scatter chart for each unique value of the chosen attribute. The second split row element may be optional for scatter charts as it may ensure that each mark with the same value of its attribute has the same color. Pie charts may use the values from the first split row element to determine the number and colors of their slices. Single value visualizations may not use split row elements.

The Split Columns element 643 may be used to break-out field values by column. The Split Columns element 643 may enable a user to select a field of the selected set of fields for use in grouping events by values for the field. For example, a user could design a results table for a Page View event-based object that breaks out its returned events by the page_category of the pages viewed (e.g., product info, bldg, store, support, etc.). Column, bar, line, and area charts may use the values from the first split column element in results table definitions to provide their colors (or series). In other words, when a user sees a line chart in the application with three lines, each a different color, it may mean that the corresponding results table definition includes a split column element that breaks the results out into a results table with three field value columns. Scatter charts, pie charts, and single value visualizations may not use split column elements.

The Column Values element 644 may often be numeric in nature and can represent aggregates or statistics like result counts, sums, and averages (in the case of non-numeric attributes a user may be able to do things like list distinct attribute values). The Column Values element 644 may enable a user to select an aggregate to be determined for a field of the selected set of fields. When a user first enters a results table, a default column value element may be the "Count of <name of object>" attribute. It may represent the count of events, results, or transactions, depending on the type of object currently being worked with. A user could use this element type to configure a results table for a Page View object to show the average number of page views for a given row/column combination. Column, bar, line, and area charts may use the first column value element in results table definitions to provide their y-axis values. Scatter charts may use the first two column value elements in a results table definition, when both are defined. The first column value element may provide the scatter chart's x-axis values. The second column value element may provide the scatter chart's y-axis values. Pie charts may use the first column value element to determine the relative sizes of their slices. Single value visualizations may use the first column value element to get their single value, while ignoring any existing split row and split column elements.

FIG. 6H illustrates an example graphical user interface 600H displaying the reporting application's "Report Editor" page according to one or more embodiments of the disclosure. The page may include a table of results 650 based on the selected criteria including splitting the rows by the "component" field. The graphical user interface 600H may correspond to a graphical user interface that is provided by a field module 300 of FIG. 3. The graphical user interface 600H may be displayed after a user has performed an initial search of source data based on the initial search query (e.g., from the graphical user interface 600H) and has selected the "component" field for the "Split rows" element 642.

As shown in FIG. 6H, the graphical user interface 600H may display a listing breaking down the various values for the "component" field of the object dataset for the report. In the illustrated embodiment, 10 different values for the "component" field are displayed. The page also includes a selection of "Count of Events" for the "Column Values" element 644. Accordingly, the table of results 650 may also include an aggregate including a count of the number of times that the particular field-value pair (e.g., the value in a row) occurs. These 10 values may correspond to 10 different values for the field "component" (e.g., selected in the split-row field) found in the set of events responsive to the initial search query (e.g., the object dataset), and the "Count of Event Object" may count the total number of events in the set of events responsive to the initial search query (e.g., the object dataset) that include the respective value (e.g., 4 events in the set of events responsive to the initial search query include the field "component" with a value of "BucketMover"). An illustration of an example results tables, including count values and other aggregates, is depicted and described with regard to at least FIGS. 6H, 6K and 6L.

FIG. 6I illustrates an exemplary graphical user interface 600I displaying the Split Columns element 643 expanded, revealing a listing of fields 652 that can be used to define additional criteria (e.g., reporting criteria). The listing of fields 652 may correspond to the selected fields (attributes). That is, the listing of fields 652 may list only the fields previously selected, either automatically and/or manually by a user via the "Select Fields" page 600B of FIG. 6B and or the "Select Fields" page (or dialogue) 600D of FIG. 6D. Selection of a field in the Split Column element 643 may further group or split the results into corresponding subgroups. For example, if a user selects the "host" field, a host column will be added and the rows will be further split, or grouped, by the values of their host" fields. This may create a 2-dimensional matrix of the selected fields. For example, a first row may be created representing events with a "component" field having a value of "Bucket Mover" and a host value of "machine1" (e.g., a first host represented in the events responsive to the initial search query), and a second row may be created representing events with a "component" field having a value of "Bucket Mover" and a host value of "machine2" (e.g., a first host represented in the events responsive to the initial search query). A similar breakdown may be provided for each of the "component" vales displayed in FIG. 6H. FIG. 6J illustrates an exemplary graphical user interface 600J displaying a formatting dialogue 653 that may be displayed upon selecting a field from the listing of fields 652. The dialogue can be used to format the display of the results of the selection (e.g., limit a maximum number of columns).

To add a reporting element a user may click the + icon for the element. This may open the element dialog, where a user can choose an attribute and then define how the element uses that attribute. To inspect or edit an element a user may click the "pencil" icon for the element. This may open the element dialog. To reorder report elements within a report element category, a user may drag and drop an element within its element category to reorder it. For example, if there is page_category and department elements in the Split Rows element category, but the user wants to reorder them so that department comes before page_category, the user can simply drag and drop them to the correct order. To transfer report elements between report element categories, a user can drag and drop them. For example, if a user adds a page_category as a Column Value element but realizes it would work better as a split column element, she/he can drag it over to Split Columns and drop it there. To remove a report element, a user can open its element dialog and click the Remove button, or can drag the element up or down until it turns red, and drop it.

With regard to configuring report elements, when a user adds or edits a report element she/he can use the element dialog to define it. The element dialog may be broken up into two operations. In one operation, the user can choose (or change) the element attribute. In the other operation, the user can define (or update) the element configuration. When a user adds an element, she/he can choose the element attribute first, then move on to configure the element. When a user edits an existing element, she/he can start at the element configuration operation. The user can click a back arrow within the dialog to go to the element attribute operation, where she/he can change the attribute.

With regard to configuring a filter element, a user can define at least three types of filter elements for a result: a time filter, a match filter, or limit filters. The time filter may always be present when a user builds a report, and a user may not be able to remove it. It may define the time range for the returned results. Match filters may enable a user to set up matching for strings, numbers, timestamps, booleans, and IPv4 addresses. For example, a user may find all online store purchase events where the price is greater than or equal to $19.99, or find all website hits where the IPv4 value for the site visitor starts with 192.168. Match filters may be used to set up "AND" boolean operations, such as set up a pair of filters that when combined include customer_country=Spain AND France. Limit filters may enable a user to restrict in some manner the number of results returned by the report. For example, if a user has an online store that offers hundreds of products, and she/he wants to know more about the items that were purchased over the past week, she/he can create a report table that breaks down the total number of purchase events by product name, and see which of the products were the top sellers for that period. If the user wants to see which 10 products were top earners for that same period, she/he may add a limit filter element that ensures that the report only displays the 10 products with the highest price sums for their purchase events. In this manner, a product with just 10 purchase events in the past week but a price of $100 (for a total sum of $1000) might be at the top of the list, while a product with 500 purchase events but a price of $1 ($500) could be much lower on the list, and potentially not within the top 10 results returned. To make the results table easier to read, the user can add a split row column that shows the price and a Column Value column that shows the sum of the price (the total amount of revenue returned for the listed products for the given time range). FIG. 6K illustrates an example graphical user interface 600K displaying the reporting application's Report Editor page including a report results table 650 sorted by "sum of price" according to one or more embodiments of the disclosure. Notably, in the illustrated embodiment, the products with the most successful purchases are not at the top of the list. FIG. 6L illustrates an example graphical user interface 600G displaying the reporting application's Report Editor page including a report results table 650 in accordance with another embodiment. FIG. 6M illustrates an exemplary graphical user interface 600M displaying the Column Values element 644 expanded, revealing a listing of fields 654 that can be used to define additional criteria (e.g., reporting criteria). The listing of fields 654 may correspond to the selected fields (attributes). That is, the listing of fields 654 may list only the fields previously selected, either automatically and/or manually by a user via the "Select Fields" page 600B of FIG. 6B and or the "Select Fields" page (or dialogue) 600D of FIG. 6D.

With regard to the match filter, the configuration options for a match filter element may depend on the type of attribute chosen for the element. If a user is basing the filter on a string type attribute, she/he may specify a filter rule (e.g., with options are is, contains, is not, does not contain, starts with, ends with, is null, and is not null) and the attribute value that the filter rule should be applied to (e.g., this may not be not applicable to the null rules). If a user is basing the filter on an IPv4 type attribute, she/he may specify the same choices as for string attributes, with the exception of the ends with filter rule. If the user is basing the filter on a number type attribute, she/he may specify a filter rule (e.g., with options of =, !=, <, <=, >=, >, is null, and is not null) and the attribute value that the filter rule should be applied to (e.g., this may not be not applicable to the null rules). If a user is basing the filter on a Boolean type attribute, she/he may specify whether the filter should select events where the attribute value is true, false, null, or not null. If a user is basing the filter on a timestamp type attribute, she/he can use the time range menu to choose an earliest and latest time.

With regard to the limit filter, a user may be able to base a limit filter element on string and number type attributes. For example, a user may specify: (1) the attribute to limit by (/e.g., any string, number, or Count_of_<object_name>attribute available in the current object, including the attribute that the filter element is filtering); (2) how to limit (e.g., highest and lowest); (3) the maximum number of results to return (e.g., any number); and/or (4) the stats function to apply for limiting. The stats functions available may depend on the type of the attribute to limit by. For string counts, distinct counts may be available. For number attributes counts, distinct counts, sums, and averages may be available. For Count_of_<object_name>attributes, counts may be the only choice.

With regard to configuring a split row or split column element, the configuration options available for split row and split column elements may depend on the type of attribute chosen for them. Some configuration options may be specific to either split row or split column elements, while other options may be available to either element type regardless of what attribute type is chosen.

Configuration options common to both split row and split column elements regardless of attribute type may include Max Rows or Max Columns and Totals. Max Rows or Max Columns may define the maximum number of rows or columns that can appear in the results table. It may be required to be a non-negative (e.g., a value of 0 means no maximum is set). A Max Rows/Max Columns option may be unavailable if there is only one split and it is based on a timestamp or Boolean attribute type, and/or if there is only one split and it is based on a numeric attribute type and is configured to use numeric ranges. The Totals may indicate whether to include a row or column that represents the total of all others in an attribute, e.g., called ALL. The Totals may be set to No by default and/or the ALL row/column may not count toward the Max Rows/Max Columns limit.

Configuration options specific to split row elements regardless of attribute type may include Label and Sort. Label may be used to override the attribute name with a different text string for reporting purposes. For example, it can be used it to ensure that an attribute titled "product name" displays as "Product" in the report. Sort may define how the split rows that the element creates should be sorted. Available values for Sort may include default, descending, and ascending. The default may be a default value. When the Sort value is set at default the rows may be sorted naturally by the attribute type of the first split. In other words, if the first split is on uri (a string attribute), the rows may be sorted alphabetically by the value of uri. If it is on time (a timestamp attribute) the rows may be sorted in ascending chronological order. When the Sort value is descending or ascending, the rows may be sorted by the value of the first column values element that outputs a metric value (e.g., via an aggregation operation like count, sum, average, and so on).

Configuration options specific to split column elements regardless of attribute type may include Group Others. Group Others may indicate whether to group any results excluded by the Max Columns limit into a separate OTHER column. Available values may include Group Others and hide others. The default may be Group Others. The OTHER column may not count towards the Max Columns limit. If a string attribute is chosen for split row or split column element, there may be no configuration options specific to string attributes that are common to both split row and split column elements. If a numeric attribute is chosen for split row or split column element Create ranges may be used to indicates whether numeric values should be represented as ranges (Yes) or listed separately (No). It may be Set to Yes by default, but if the other value range fields are left blank, it may behave as if set to No. When Yes is selected a user may optionally identify: (2) the maximum number of ranges to sort results into; (2) the maximum size each range should be; and (3) the range start and end values.

If a Boolean attribute is chosen for a split row or split column element, alternate labels for true and false values may be provided. If a timestamp attribute is chosen for a split row or split column element, a period may be used to bucket or group the timestamp results by year, month, day, hour, minute, or second.

With regard to configuring a column value element, when a user first enters the Report Editor, a column value element that provides the count of results returned by the object over all times may be displayed. In some instances, the only aspect of the "Count of <name of object>" element that may be editable change is its Label (e.g., to change its name in the results table). A user may be able to opt to keep this element, or remove it in favor of a different column value element. New column value elements may be based on string, numeric, and timestamp attribute types. The Label for the element may be updated. Adds a string, numeric, or timestamp event, may indicate the calculation that should be used to calculate the Value that is displayed in the column cells. For string attributes the options may include List Distinct Values, First Value, Last Value, Count, and Distinct Count, For numeric attributes, the options may include Sum, Count, Average, Max, Min, Standard Deviation, and List Distinct Values. For timestamp attributes, the options may include Duration, Earliest, and Latest.

With regard to managing the results (e.g., the result table) display and format a user may be able to control the pagination of the table results via a dropdown (e.g., select to display 10, 20, and 50 results per page (20 is the default)). A Format dropdown may enable a user to control other functionality and/or features of table appearance and behavior. For example, a user may determine whether the table wraps results and displays row numbers.

A user may also specify drilldown (e.g., Row or Cell) and/or data overlay behavior, but the table drilldown may be set to cell mode by default. Selecting the Row drilldown mode may cause the drilldown action to select an entire row of the pivot table. Clicking on a specific row may launch a search that focuses on the split row element values that belong to the row. If there is not a split row element in the report definition, the drilldown search may show all events in the results table. For each split row element in the definition, a field-value constraint may be added to the resulting drilldown search. For example, if a results table of web intelligence data has the rows have been split by URI and then again by HTTP_status, and a user clicks on a row where the URI value is index.php and the HTTP_status is 200, then a search can bring back only those events where URI=index.php AND HTTP_status=200. An exception to this mechanic may be triggered when the first split row element is time. Instead of adding constraints to the drilldown search, the search may be restricted with the earliest and latest time of the row. For example, if a results table has the rows are split by time with an hour between each row, clicking on the row at 9:00 am may generate a search that returns events between 9:00 am and 10:00 am.

Selecting the Cell drilldown mode may cause the drilldown action to select a specific cell of the results table. Clicking on a specific cell may launch a search that takes into account the values of the split row and split column elements that affect the cell. If no split row or split column elements have been chosen for the results table definition, the search may encompass all of the events returned for the table. If split row elements have been defined but there are no split column elements, the search may operate like a Row drilldown search. For each split row and split column element in the results table definition, a field/value constraint may be added to the resulting drilldown search. For example, if a results table of web intelligence data has the rows have been split by URI and the columns split by HTTP_status, then clicking on a cell where the row URI value is index.html and the column header value is 404 may generate a search that brings back events where URI=index.html and HTTP_status=404. When time is the first split row element, the behavior may be the same as for row drilldowns.

In the case of multivalue fields, each individual field value may be selectable. A field/value constant may be added to the resulting drilldown search with the field name of the corresponding cell element equal to that of the clicked value. For example, in a results table of web intelligence data having a cell is displaying all of the distinct values of HTTP_status, clicking on the 303 value may generate a search that returns events where HTTP_status=303.

The Report Editor page may be used, in some embodiments, to define reporting charts and visualizations for displaying the results. For example, to define a data visualization with the Report Editor, a user may similar select a visualization type from the visualization menu 645 (e.g., the black sidebar that runs down the left-hand side of the Report Editor page). The available charts and data visualizations are represented in the following order: Table, Column chart, Bar chart, Scatter chart, Area chart, Line chart, Pie chart, Single value visualization, Radial gauge, Marker gauge, and Filler gauge.

The Time Range and Filter controls may be common to all of the chart types and single value visualizations (including gauges) offered by the Report Editor. The Time Range control panel may correspond to the time range filter element in report tables. The Filter control panel may allow a user to set up multiple filters on different object attributes, to narrow down the dataset reported on by the chart or visualization. The filter controls may operate the same as they do for filter elements of a pivot table.

FIG. 6N illustrates an example graphical user interface 600N displaying fields that may be selected to provide a visualization of the data according to one or more embodiments of the disclosure. In general, the graphical user interface 600N may correspond to a graphical user interface that is provided by a field module 300 of FIG. 3. The graphical user interface 600N may be displayed after a user has performed an initial search of the source data, after fields of the events returned in response to the initial search query have been identified, a subset of the fields has been selected (e.g., automatically and/or manually as described with regard to at least the graphical user interfaces 600D and 600B), and the user has selected the "Column chart" icon of the visualization menu 645 (e.g., the black sidebar that runs down the left-hand side of the Editor Page).

Figure 7A:
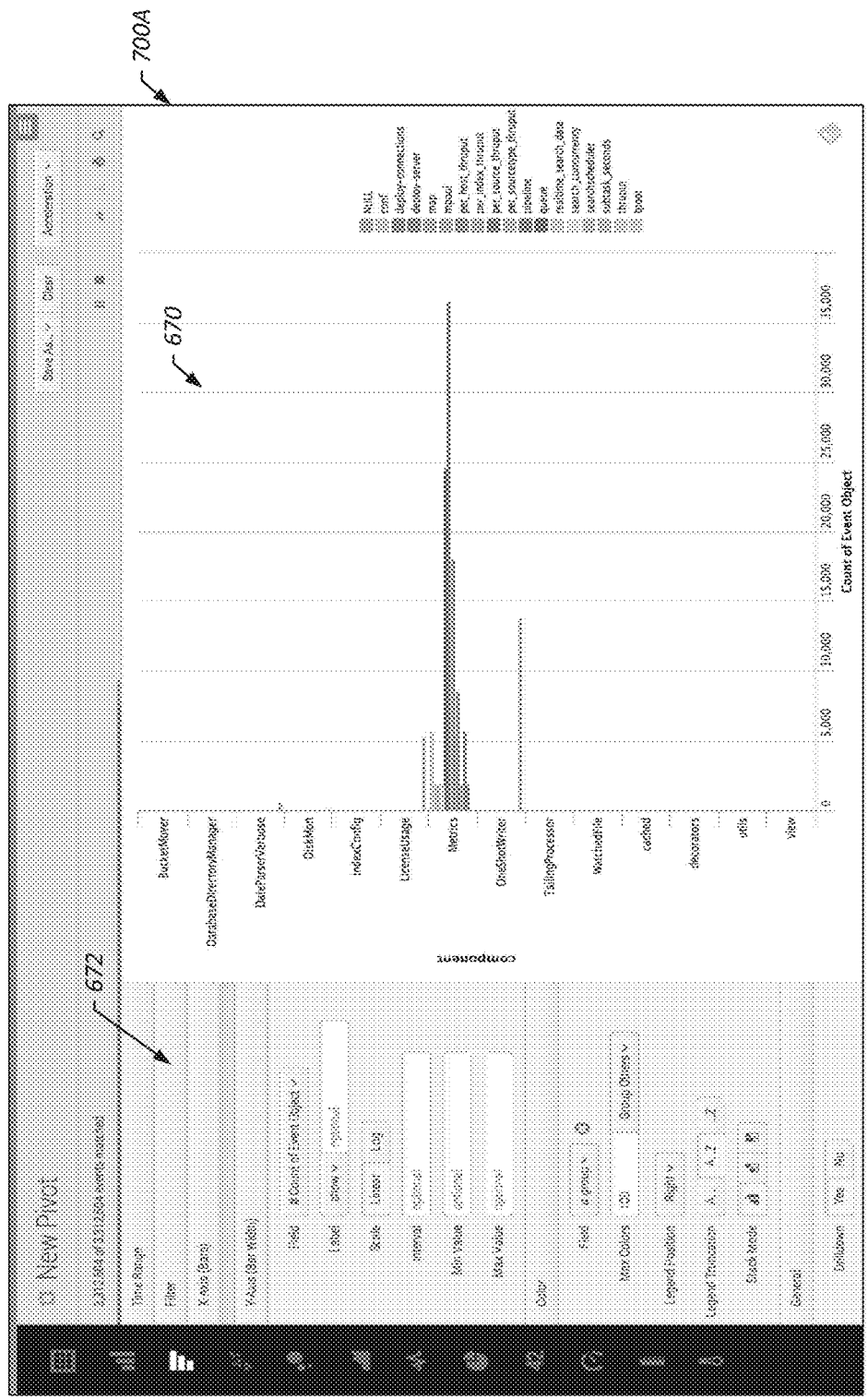
FIGS. 7A-7J illustrates example visualizations of a reporting application in accordance with one or more embodiments.
Figure 7B:
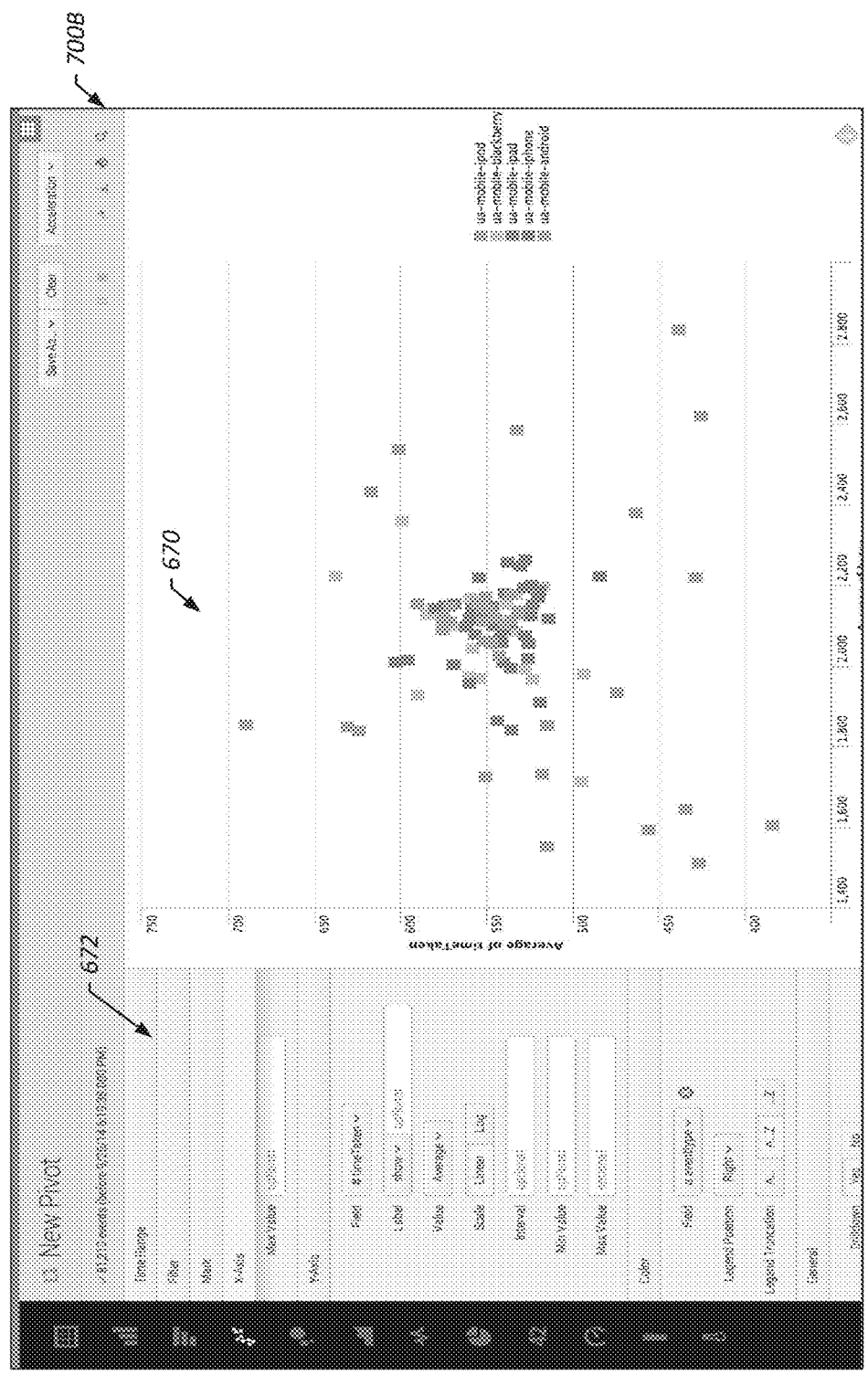
Figure 7C:
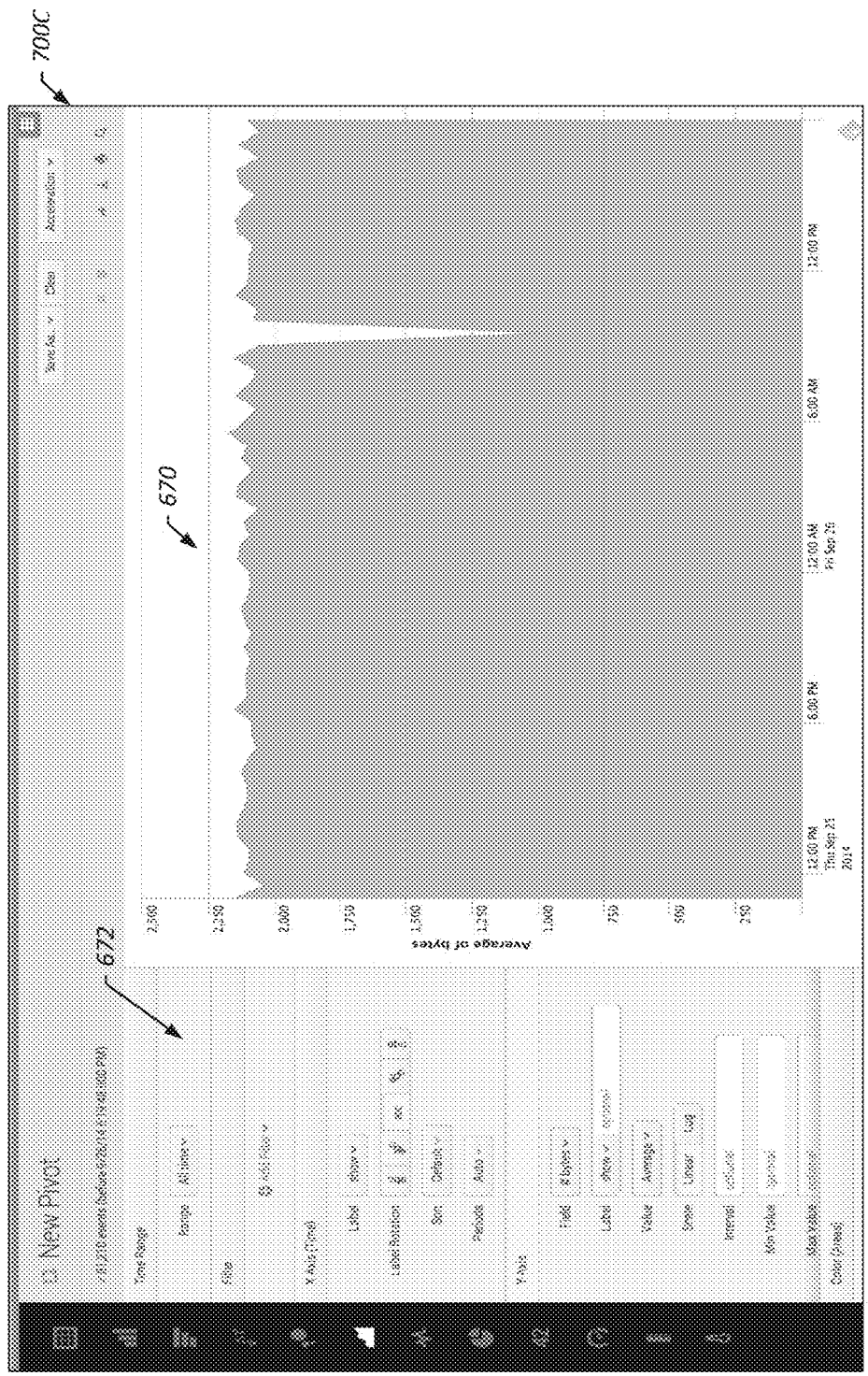
Figure 7D:
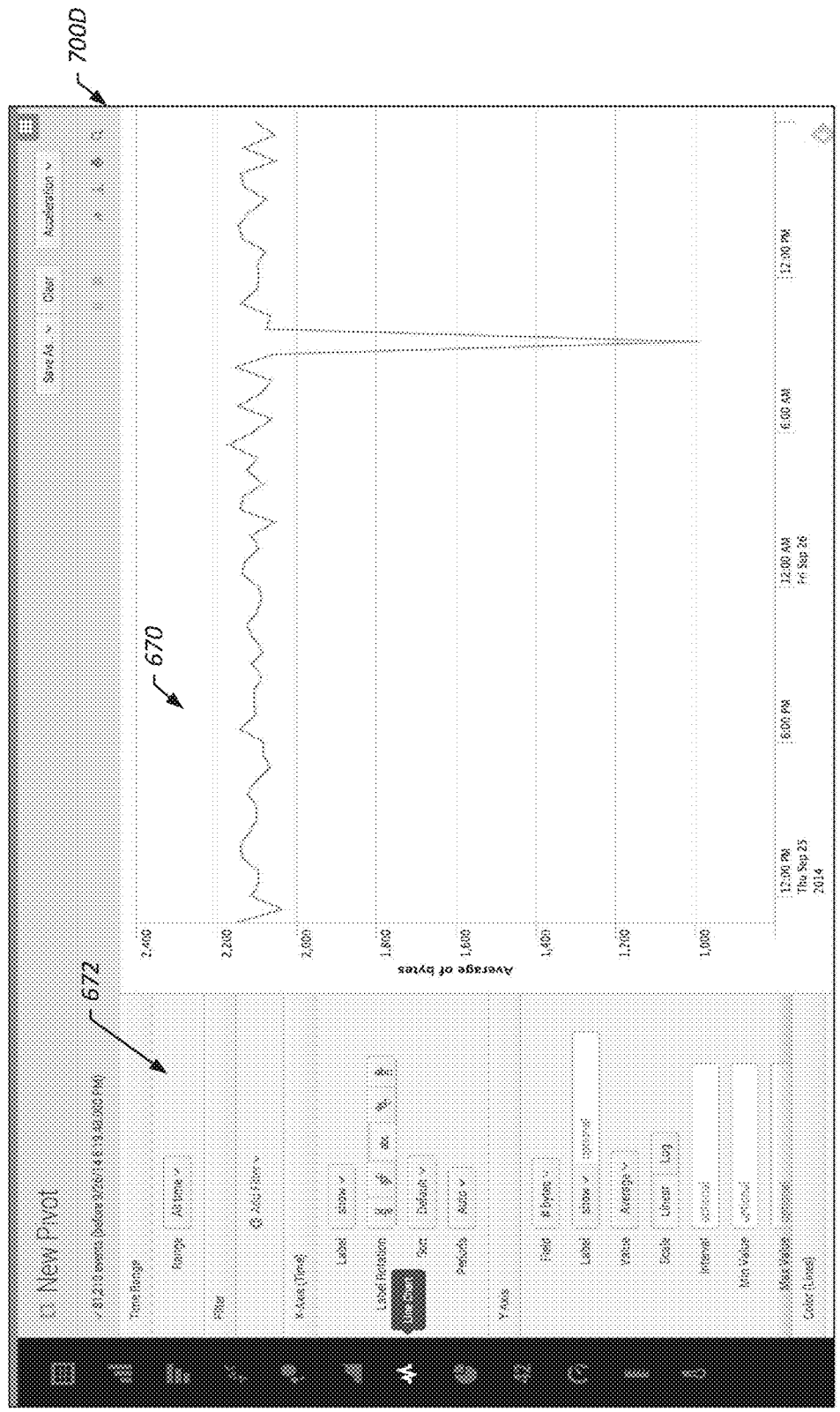
Figure 7E:
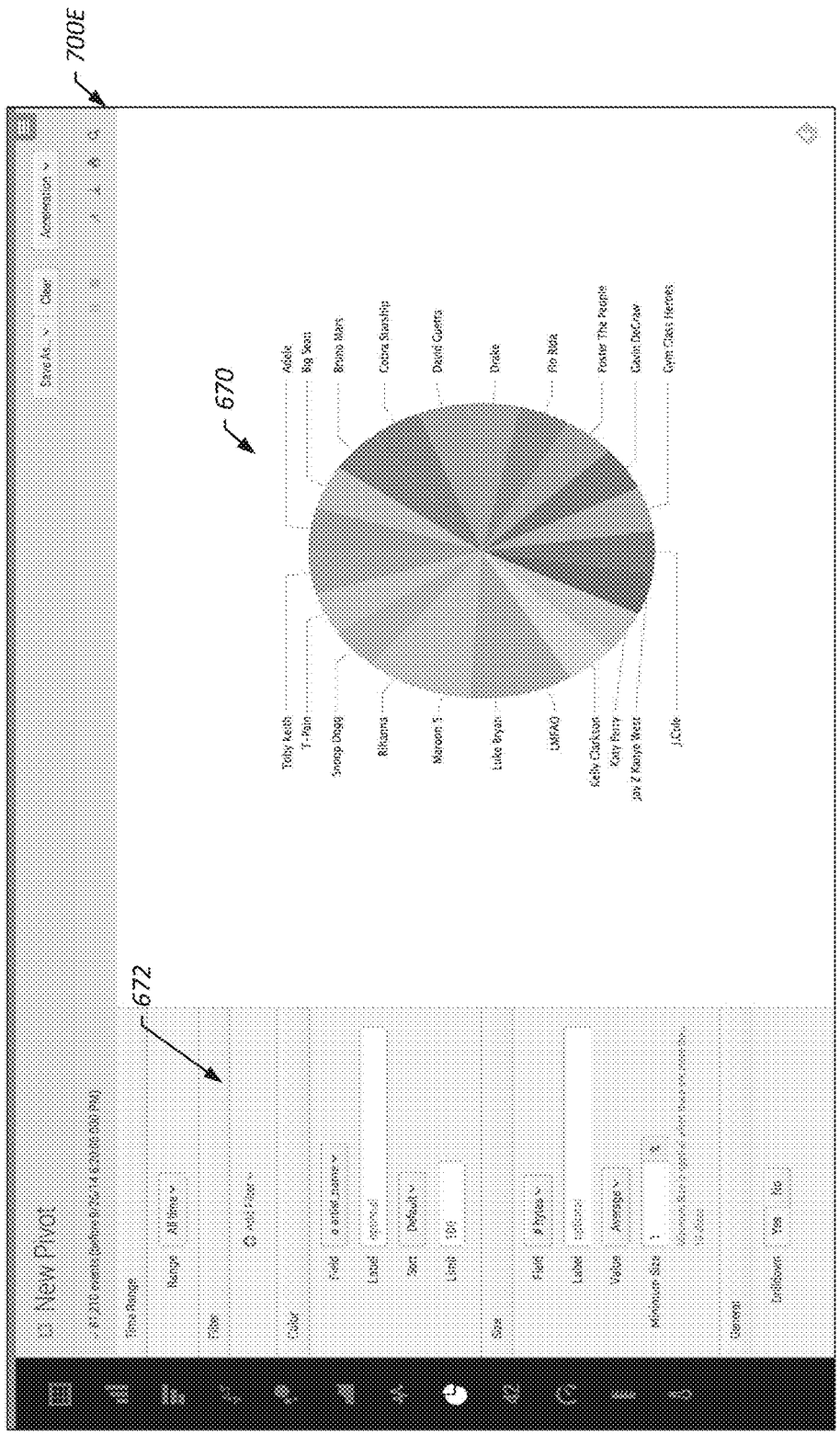
Figure 7F:
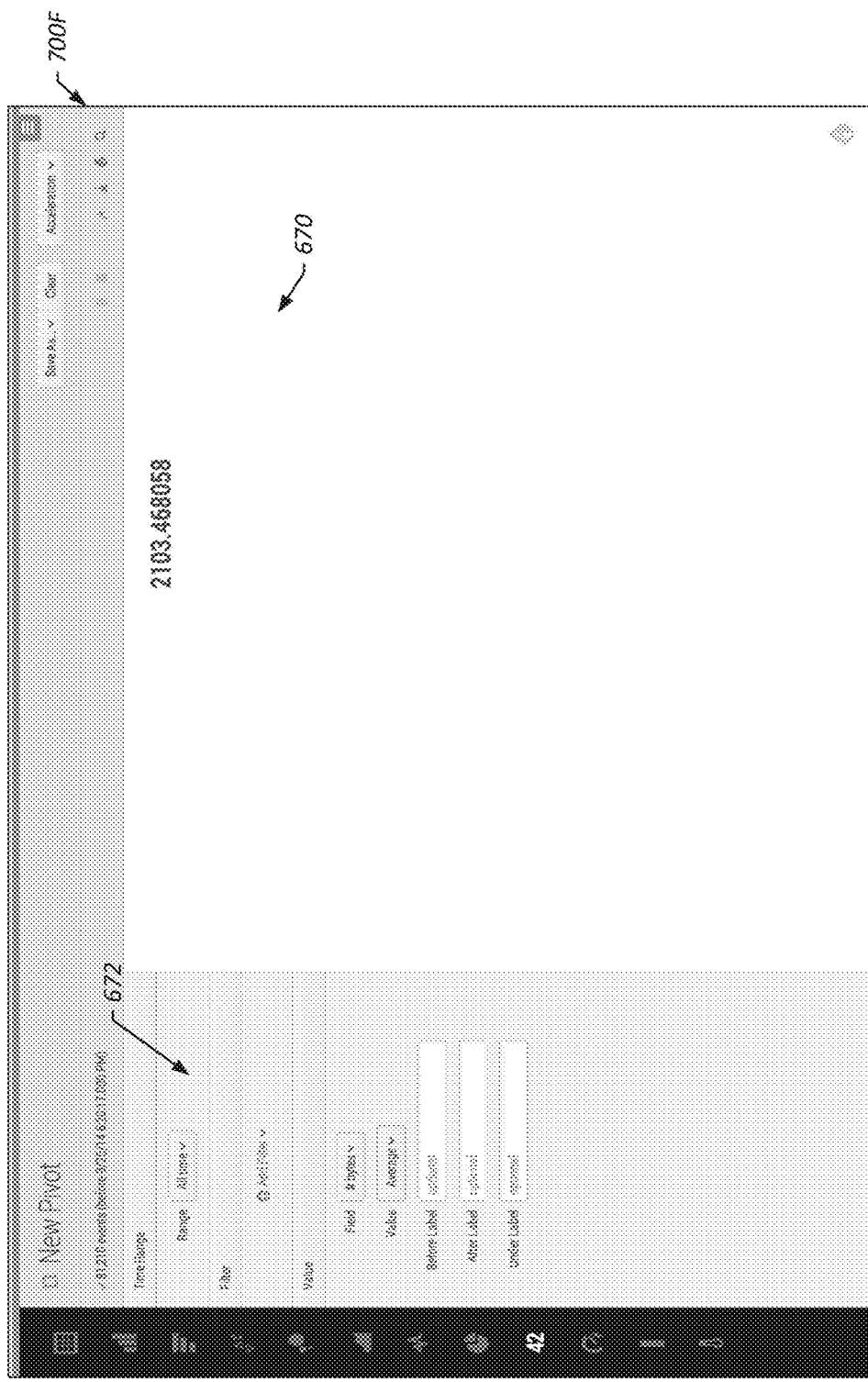
Figure 7G:
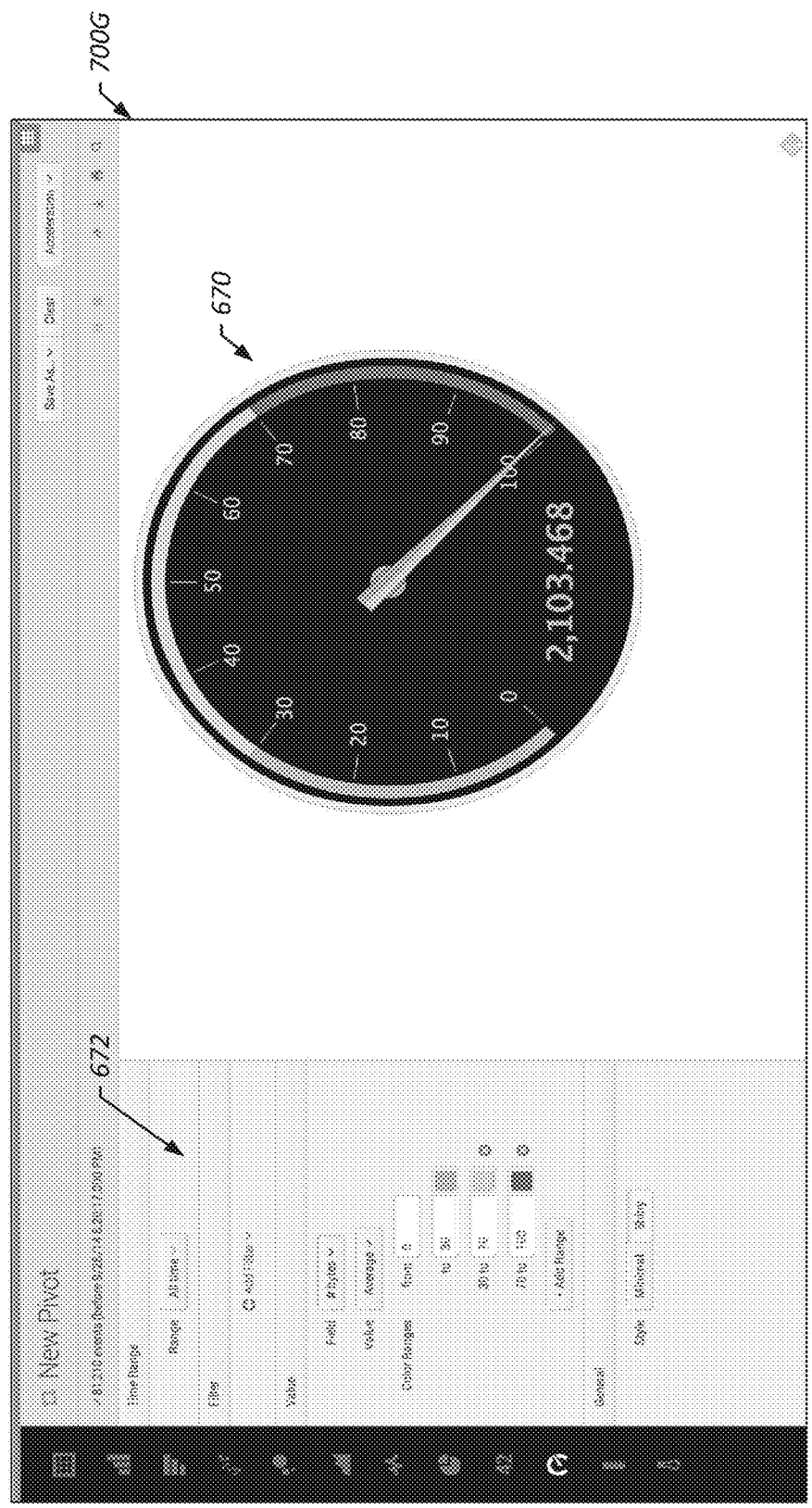
Figure 7H:
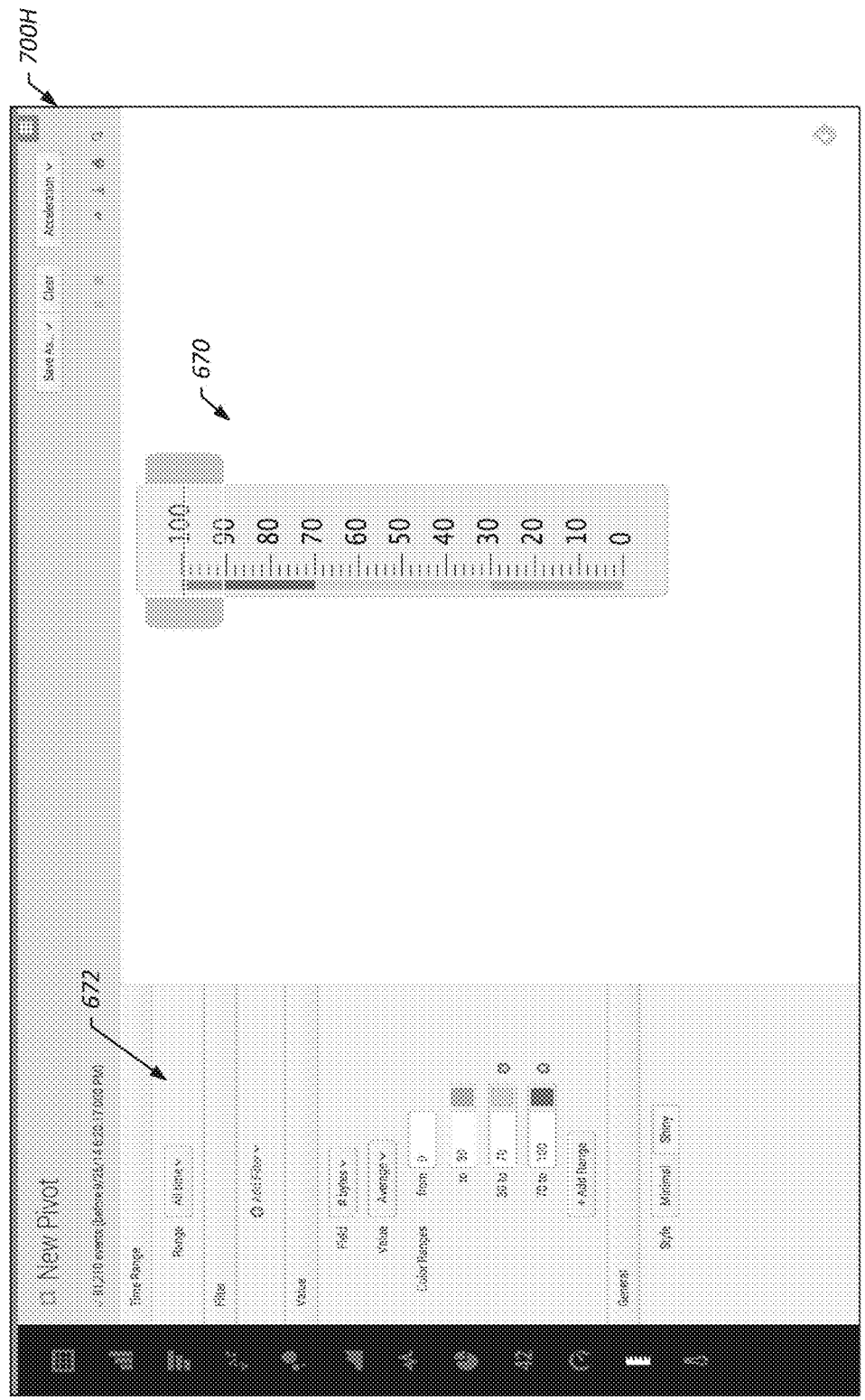
Figure 7I:
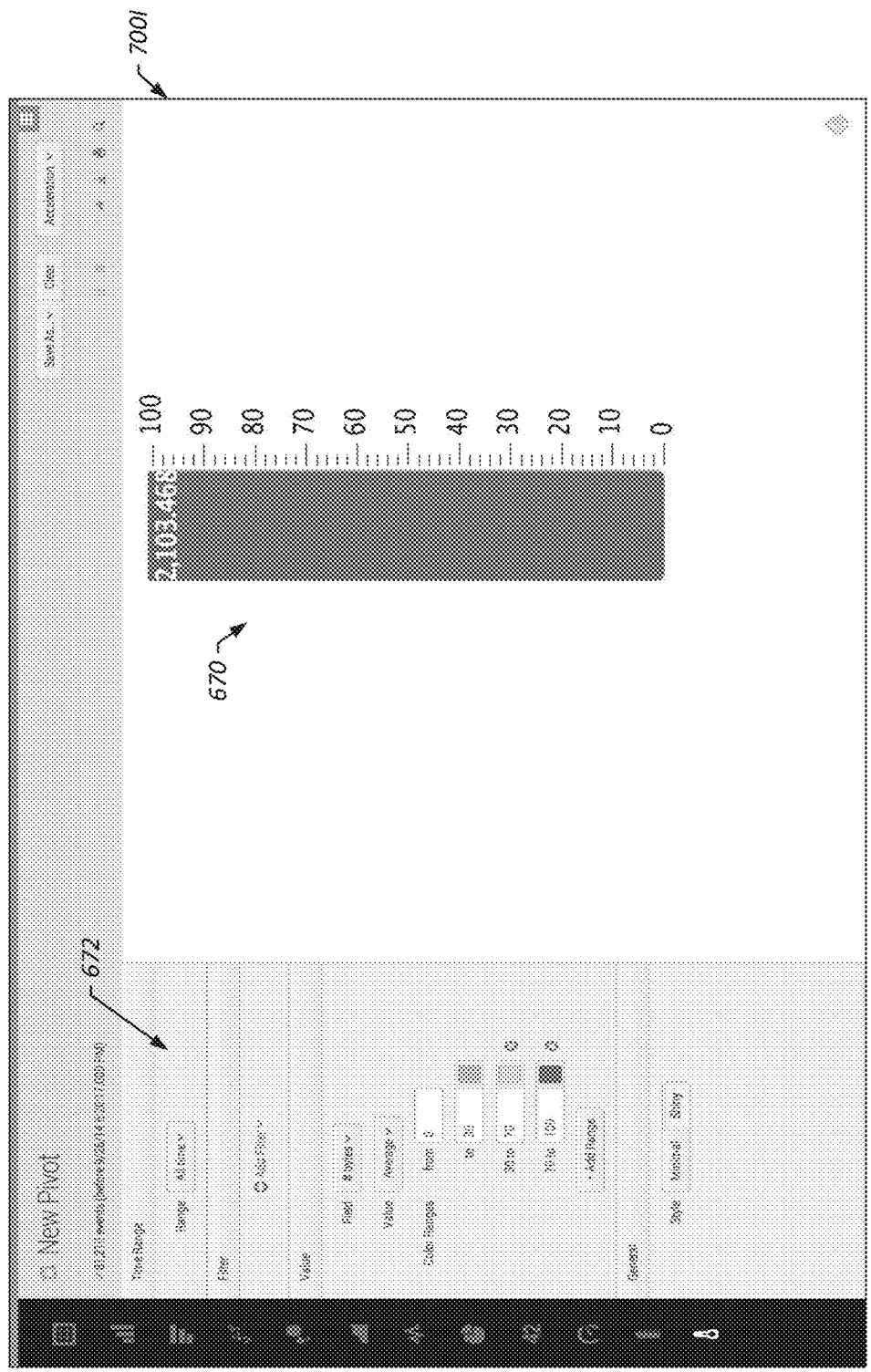
Figure 7J:
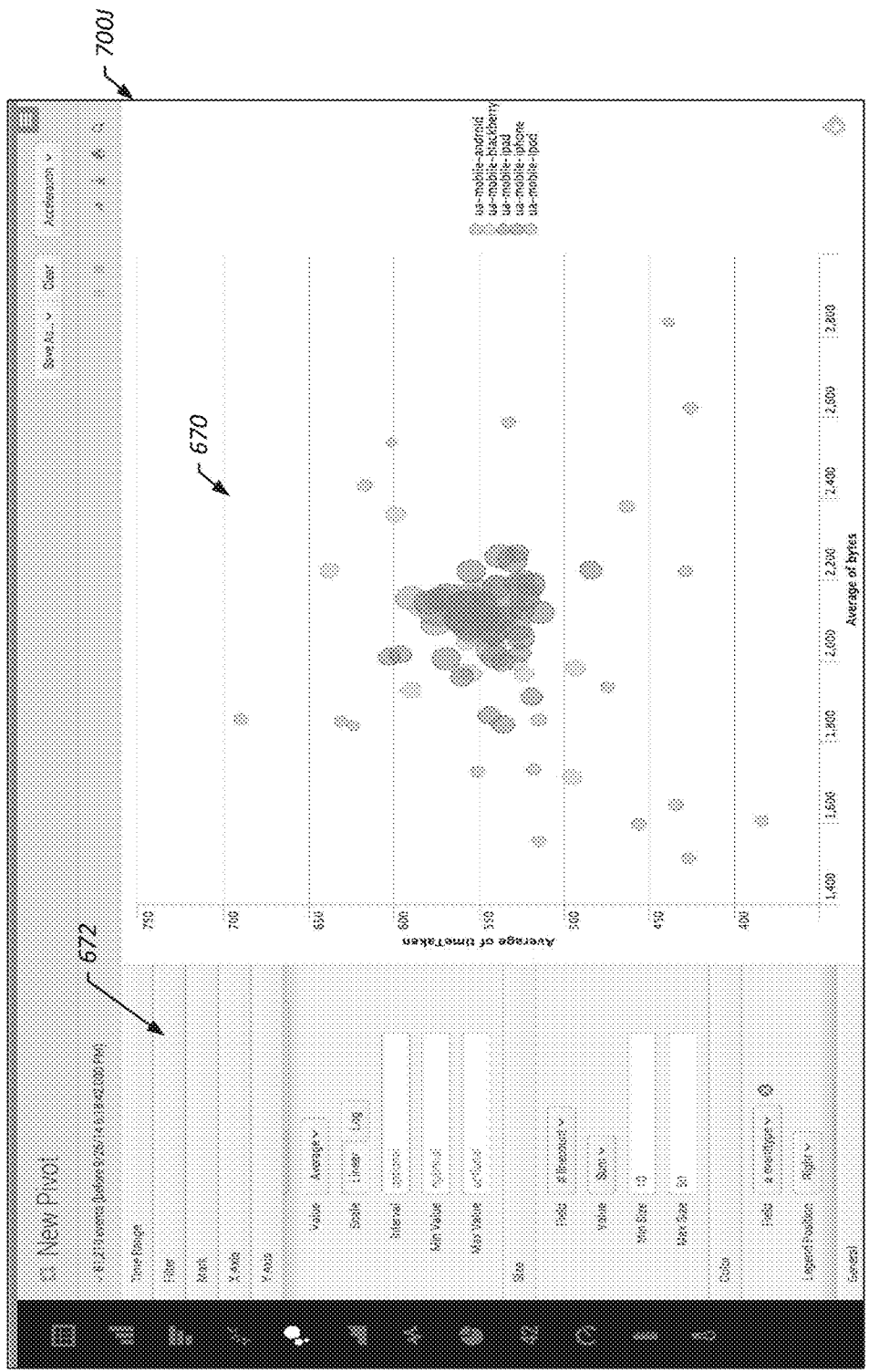

As shown in FIG. 6N, the graphical user interface 600N may provide a visualization of data 670 and a visualization menu 672. The visualization of the data 670 may include, for example, a column chart that provides a summary of the data of the event datasets filtered based on the report criteria. A user may modify the visualization of the data using the options and definitions of the visualization menu 672. Additional examples of visualizations are shown in FIGs, 7A-7J. FIG. 7A is a example visualization 700A of a bar chart according to one or more embodiments of the disclosure. FIG. 7B is an example visualization. 700B of a scatter chart according to one or more embodiments of the disclosure. FIG. 7C is an example visualization 700C of an area chart according to one or more embodiments of the disclosure. FIG. 7D is an example visualization 700D of a line chart according to one or more embodiments of the disclosure. FIG. 7E is an example visualization 700E of a pie chart according to one or more embodiments of the disclosure. FIG. 7F is an example visualization 700F of a single value visualization according to one or more embodiments of the disclosure. FIG. 7G is an example visualization 700G of a radial gauge according to one or more embodiments of the disclosure. FIG. 7H is an example visualization 700H of a marker gauge according to one or more embodiments of the disclosure. FIG. 7I is an example visualization 7001 of a filler gauge according to one or more embodiments of the disclosure. FIG. 7J is an example visualization 700J of another form of a scatter chart according to one or more embodiments of the disclosure.

With regard to column and bar chart controls, column charts and bar charts may use nearly the same controls. For bar charts, the x-axis may be the vertical axis while the y-axis may be the horizontal axis. In other words, the x-axis and y-axis can be reversed from the way they are set up for column charts. Column charts may enable rotation of column labels. Label Rotation may allow a user to select how to display column labels. Column and bar charts may require the definition of x-axis and y-axis elements. Column charts built in the Report Editor may have zoom and pan functionality. A user may use their mouse select a section of the chart to "zoom" in on it. Once zoomed in, a user may use left and right arrows to pan along the x-axis, and click Reset zoom to return to the original chart.

With regard to the X-Axis, to render a column or bar chart, the X-Axis may be defined with an attribute. The X-Axis control panel may correspond to the split row element type, and may share its configuration options. The X-Axis control panel may also include these chart-specific controls: Label—lets a user provide an alternate label for the x-axis, or hide the x-axis label altogether; Label Rotation— lets a user determine how x-axis column labels display along the x-axis; Truncation may be available when x-axis column labels have a Label Rotation value that is not 0°, it may be set to Yes to truncate overlong labels. In some embodiments, for bar charts, the X-Axis and Y-Axis swap places relative to the column charts.

With regard to the Y-Axis, to render a column chart, Y-Axis may be defined with an attribute that uses an aggregation operation (count, distinct count, average, sum, etc.) to output a number. The Y-Axis control panel may correspond to the column value pivot element type, and shares its configuration options. The Y-Axis control panel may also include these chart-specific controls: Scale—may toggle the axis scale between linear and logarithmic (the logarithmic scale can be useful for charts where there is a wide range separating the y-axis values in the chart, e.g., where some values are extremely high while others are extremely low); Interval—can let a user enter a numerical value to control the tick interval on the y-axis; Min Value and Max Value—may allow a user to enter numerical values to focus the y-axis range (e.g., if all of the column chart's y-axis values are above 100 and below 150, a user might want to constrain the range to those min and max values); Label field—may enable a user to provide an alternate label for the y-axis, or hide the y-axis label altogether.

With regard to Color, a user may optionally use the Color control panel to break chart results out into series. Series may be sets of colored columns or bars that represent different values of an attribute. For example, a user could set up a column chart that shows webstore purchase attempts (a count, on the y-axis) over the past week (time, on the x-axis), broken out by successful and failed attempts. In this case, the two attempt types—"successful" and "failed"—would be the "color." If the x-axis is broken out by day, displayed may be two columns per day—blue columns for purchase successes, and yellow columns for purchase failures (colors may vary). The Color control panel may correspond to the split column element type, and may shares its configuration options. The Color control panel may also include these color/series-specific controls: Position—may control the position of the legend; Truncation—may control how legend labels should be truncated when they are too long. Stack Mode—may allow stacking colors (e.g., a user can choose Stacked and Stacked 100%) which may enhances chart readability when several colors (series) are involved, because it can make it easy to quickly asses the relative weight (importance) of the different types of data that make up a specific dataset. The Stacked 100% option enables comparison of data distributions within a column or bar by making it fit to 100% of the length or width of the chart and then presenting its segments in terms of their proportion of that total "100%". Stacked 100% can help a user to better see data distributions between segments in a column or bar chart that contains a mix of very small and very large stacks when Stack Mode is just set to Stacked. With regard to General settings, in the General control panel a user can enable or disable chart drilldown functionality.

With regard to area and line chart controls, area charts and line charts may use most of the same controls as column and bar charts; the primary difference may be that in the reports, line and area charts may only have time as their x-axis attribute. If time is unavailable, the line and area chart types may be unavailable. The time attribute may be unavailable when a user is working with an object from a search object hierarchy because search-based objects are designed to work with transforming searches, which return table rows without timestamps. Like column and row charts, area and line charts also may not be rendered until a y-axis attribute has been defined for them. For area and line charts, the Color and General control panels may be configured the same way that they are for column and bar charts (see above). Area and line charts built in the Report Editor may have zoom and pan functionality. A user may be able to use their mouse to select a section of the chart to "zoom" in on it. Once zoomed in, the user may use left and right arrows to pan along the x-axis. The user may click Reset zoom to return to the original chart.

With regard to the X-Axis, similar to that mentioned above, for line and area charts, the X-Axis control panel may only accept the _time timestamp attribute, because line and area charts may be timecharts, showing change in a numeric value over time. The control panel may be configured in the same way that split row pivot elements are, otherwise. The X-Axis control panel may also include these chart-specific controls: Label—lets a user hide the x-axis label (may not be able to rename the _time attribute); Label Rotation—lets a user determine how x-axis tick interval labels display along the x-axis. Truncation—may only be available when x-axis tick interval labels have a Label Rotation value that is not 0°, and it can be set to Yes to truncate overlong labels.

With regard to the Y-Axis, line and area charts may configure their y-axis information in the same or similar way as column and bar charts. The line and area charts may include an extra y-axis control, Null Value Mode. It may help a user determine how null values should be handled in the chart. They can be omitted, treated as zeros, or connected across them.

With regard to scatter chart controls, although scatter charts have similarities in appearance to column, bar, line, and area charts, they can be set up differently. The General control panel for scatter charts may be configured the same way as column and bar charts.

With regard to a "Mark", scatter charts may require an attribute for the Mark control panel, which creates a "mark" on the scatter chart for each unique value of the supplied attribute. The Mark control panel may corresponds to the split row pivot element type and may share its configuration options, with the exception that it may not allow a user to override the attribute label. In a report table the Mark attribute may correspond to the first split row element while the Color attribute may correspond to the second split row element, if one is defined. The Report Editor may not allow a user to define the same attribute for both Mark and Color. That is, if an attribute in chosen for one it may not be available when the other is defined.

With regard to the X-Axis and the Y-Axis, scatter charts may require attributes for the X-Axis and Y-Axis control panels, which the Report Editor can use to plot the location of the scatter chart marks. Both controls may correspond to the column value report element type and share its configuration options. In a report table, the scatter chart X-Axis controls may use the first column value element, while the Y-Axis controls may use the second column value element, if one is defined. The X-Axis and Y-Axis control panels may include these chart-specific controls: Scale may toggle the axis scale between linear and logarithmic; Logarithmic scale—can be useful for charts where there is a wide range separating the axis values in the chart (e.g., where some values are extremely high while others are extremely low); Interval—may allow a user to enter numerical values to control the tick intervals on the axis; Min Value and Max Value—may allow a user to enter numerical values to focus the axis range (this can make the differences between a number of values that are close together easier to see, e.g., if all of scatter chart marks are located above 100 and below 110 on the y-axis, a user might want to constrain the range to those min and max values to make the differences between their locations more apparent). The X-Axis control panel may have the following additional controls for x-axis labels: Label Rotation—may allow a user to determine how x-axis tick interval labels display along the x-axis; and Truncation—may only be available when x-axis tick interval labels have a Label Rotation value that is not 0°, and it may be set to Yes to truncate overlong labels.

With regard to color, for scatter charts, definition of an attribute for the Color panel can be optional. The Color control panel may correspond to the split row report element type and share its configuration options. The Color panel may be used to ensure that all of the scatter chart marks that share a specific value with its attribute have the same color. The Color attribute may correspond to the second split row element in the report table definition, if one is defined. As such, it can provide a second level of row splitting beyond the row split performed by the Mark attribute. The Color controls for scatter charts can additionally enable a user to hide the attribute label or override it with a new label. It can also include the following fields that are specific to the chart legend: Position—may control the position of the legend; and Truncation—may control how legend labels should be truncated when they are too long.

With regard to Pie charts, Pie charts can be relatively simple as they make use of the first row split element and the first column value element in a report definition. The row split element can determine the number of slices in the pie, their labels, and their colors. The column value element can determine the size of each pie slice relative to the others, in the report chart editing interface for the pie chart these elements may translate to the Color and Size controls, respectively. Pie charts can also make use of the Time Range, Filter, and General controls. The General controls may be configured the same as or similar to column and bar charts. With regard to color, all of the fields for the pie chart Color control panel may correspond directly to the split row pivot element type. The Color controls may determine the number of slices in the pie, their labels, and their colors. With regard to size, all of the fields for the pie chart Size control panel may correspond directly to the column value report element type. The Size controls may determine the size of each pie slice relative to the others.

With regard to Single value visualization controls, they may return just one number that optionally can be bracketed with label text. Single value visualization controls may make use of a single column value report element. The Time Range and Filter controls to filter the results returned by the single column value report element, can be used as appropriate. The Value controls may make use of a single column value report element. The events it returns can be filtered by the time range and whatever filters a user sets up in the Filter control panel. For single value visualizations, a user may not be able to specify an alternate label for the selected attribute. For single value visualizations, the Value controls may include the following three additional fields (which may be optional) on top of those typical to the column value element type: Before Label—may supply the label text to display before the value; After Label—may supply the label text to display after the value; and Under Label—may supply the label to display under the value.

With regards to Gauge visualization controls, the various gauge visualizations (e.g., radial, marker, and filler) may use the value returned by a single-row table with just one column value report element to determine where the gauge indicator is at any given moment. A user may set the gauge ranges and colors. The Time Range and Filter controls to can be used filter the results returned by the single column value report element, as appropriate. The Value controls may make use of a single column value report element. The events it returns can be filtered by the time range and whatever filters a user sets up in the Filter control panel. For single value visualizations, a user may not be able to specify an alternate label for the selected attribute.

For gauge visualizations, the Value controls may also include a Color Ranges field set that enables a user to define the ranges and colors represented on the gauge. The default setting may include three ranges that cover the span from 1 to 100 and are colored green, yellow and red, respectively. A user may change the numeric ranges, add ranges, and update the colors displayed for each range as appropriate for the values returned by the column value element that powers the visualization. Style may enable a user to toggle the appearance of the gauge between a minimalist and "shiny" appearance.

Regarding switching between visualization types, if a user switches between visualizations the reporting application can find the elements it needs to create the visualization, discard the elements it does not need, and notify the user when elements need to be defined. This may apply, for example, when a user switching between tables and charts as well as between chart types. For example, if a user switches from table mode to column chart mode but has not defined a split row element while in table mode, the Y-Axis control panel for the column chart may be yellow and can be marked "Required". The reporting application may not create the column chart until the user chooses an attribute for the chart's x-axis. If there are no available fields in the selected object for a chart or single data visualization control panel segment, that panel segment may not be displayed. For example, if a user is working with a data model object that does not have a time attribute, the Time Range control panel may be unavailable with a switch from the pivot table view to the column chart visualization type. When a user selects a visualization type that can only use a specific attribute to populate a required control panel, that control panel may be pre-populated when the visualization type is selected. For example, if a user switches to a line or area chart from a column chart, the X-Axis control may be pre-populated with time even if a different attribute was selected for the x-axis in the column chart view. When switching from one visualization type to another, the resulting visualization may display the elements that were used by the previous chart or visualization, with the exception of those that it cannot use. If a user does not want to lose a pivot visualization configuration when she/he switches to another visualization type, she/he can first save it as a report.

FIG. 6O illustrates an example graphical user interface 600O displaying the reporting application's "Save As Report" page (or dialogue) according to one or more embodiments of the disclosure. The page may include a report save portion 680 for specifying characteristics of the report to be saved and a data model save portion 682 for specifying characteristics of the data model to be saved. The graphical user interface 600O may correspond to a graphical user interface that is provided by a field module 300 of FIG. 3. The graphical user interface 600O may be displayed after a user has selected the "Save As"→"Report" button of the "Report Editor" page.

As shown in FIG. 6O, the graphical user interface 600O, the report save portion 680 for specifying characteristics of the report to be saved may include a "Title" field for specifying a title or name for the Report (e.g., "Components")Components"), and a "Time Range Picker" selection. The "Time Range Picker" may specify whether a subsequent user must use the same time range for the report, or can specify a different time range. For example, if the report is designed specifically for looking at the "refers" in June 2014, the "Time Range Picker" may be set to "NO", thereby limiting the report results to the specified time frame. If, however, the report is designed for looking at refers over any given month, the "Time Range Picker" may be set to "YES", thereby allowing subsequent users to use the report to generate similar results for other time frames. Thus, subsequent users can retrieve and use the report to recreate the same or a similar report from the same or different source data.

The data model save portion 682 for specifying characteristics of the data model to be saved may include a "Model Title" field for specifying a title or name for the Data Model (e.g., "Refers"), and a "Model ID" field for specifying a unique ID that can be used to identify the specific data model in subsequent queries. The data model object that is saved may define (or otherwise include) the initial search query (e.g., "index=_internal.") and the selected fields (e.g., the field of listing 646), thereby allowing subsequent users to retrieve and use the data model to recreate the same or a similar object dataset from the same or different source data. Although some of the above embodiments describe saving a data model after generation of a report, the option to save a data model may be available at any point after a search query and a corresponding set of fields are defined. That, is for example, the data model may be saved after the initial search query is defined and a corresponding set of the identified fields are selected by a user. For example, the user may initiate a save operation when she/he first enters the Report Editor interface (e.g., as depicted with regard to the interactive GUI 600E of FIG. 6E). In some embodiments, a data model may be saved automatically in response to user selection of corresponding set of the identified fields. For example, a data model save process may be automatically conducted and/or a user may be prompted to save their data model when they first enter the Report Editor interface (e.g., as depicted with regard to GUI 600E of FIG. 6E).

FIG. 6P illustrates an example graphical user interface 600P displaying the reporting application's "Save Confirmation" page (or dialogue) according to one or more embodiments of the disclosure. The page may include a confirmation that the report has been created, and inform the user that they can provide additional report settings (e.g., permissions, schedule, and embed) and additional data model settings (e.g., edit objects, acceleration and permissions).

FIG. 6Q illustrates an example graphical user interface 600Q displaying the reporting application's "Save As Dashboard" page (or dialogue) according to one or more embodiments of the disclosure. The page may enable a user to save the report (e.g., a visualization) that can be added to a dashboard for viewing other reports (e.g., other visualizations) saved to the dashboard. The graphical user interface 600Q may correspond to a graphical user interface that is provided by a field module 300 of FIG. 3. The graphical user interface 600Q may be displayed after a user has selected the "Save As" →"Dashboard Panel" buttons of the "Report Editor" page.

FIG. 6R illustrates an example graphical user interface 600R displaying the reporting application's "Acceleration" page (or dialogue) according to one or more embodiments of the disclosure. The page may enable a user to view the status of an acceleration applied to the report, rebuild or redefine an acceleration for the report, or view or inspect the current acceleration job for the report. The graphical user interface 600R may correspond to a graphical user interface that is provided by a field module 300 of FIG. 3. The graphical user interface 600R may be displayed after a user has selected the "Acceleration" button of the "Report Editor" page.

FIG. 6S illustrates an example graphical user interface 600S displaying the reporting application's "Share Pivot" page (or dialogue) according to one or more embodiments of the disclosure. The page may enable a user to copy a link to the report that can be provided to other users to share the report. Other users can run the same report using the shared link. The graphical user interface 600S may correspond to a graphical user interface that is provided by a field module 300 of FIG. 3.

FIG. 6T illustrates an example graphical user interface 600T displaying the reporting application's "Export Results" page (or dialogue) according to one or more embodiments of the disclosure. The page may enable a user to export results of the report to a files (e.g., a *.csv file). The graphical user interface 600T may correspond to a graphical user interface that is provided by a field module 300 of FIG. 3.

Accordingly, provided in some embodiments is a system and method for identifying events matching criteria of an initial search query (e.g., each of the events including a portion of raw machine data that is associated with a time), identifying a set of fields, each field defined for one or more of the identified events, causing display of an interactive graphical user interface (GUI) that includes one or more interactive elements enabling a user to define a report for providing information relating to the matching events (e.g., each interactive element enabling processing or presentation of information in the matching events using one or more fields in the identified set of fields), receiving, via the GUI, a report definition indicating how to report information relating to the matching events, and generating, based on the report definition, a report including information relating to the matching events.

Example Uses and Related Systems and Processes

Certain embodiments of the systems and methods described herein and above may be employed by various data processing systems (e.g., data aggregation and analysis systems). In various illustrative examples, the data processing system may be represented by the SPLUNK® ENTERPRISE system produced by Splunk Inc. of San Francisco, Calif., to store and process performance data. The present disclosure may facilitate the analysis and search of the performance data.

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time.

Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule." In some embodiments, an extraction rule may be identified automatically (e.g., auto-discovery) or by being specified within a particular file (e.g., a configuration file). In the same or alternative embodiments, an extraction rule may also be defined by a search query. For example, the search query may define a field and may further perform computations that may be named as fields.

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to discover equivalent fields from different types of events generated by different data sources, the system facilitates use of a "common information model" (CIM) across the different data sources.

Figure 8:
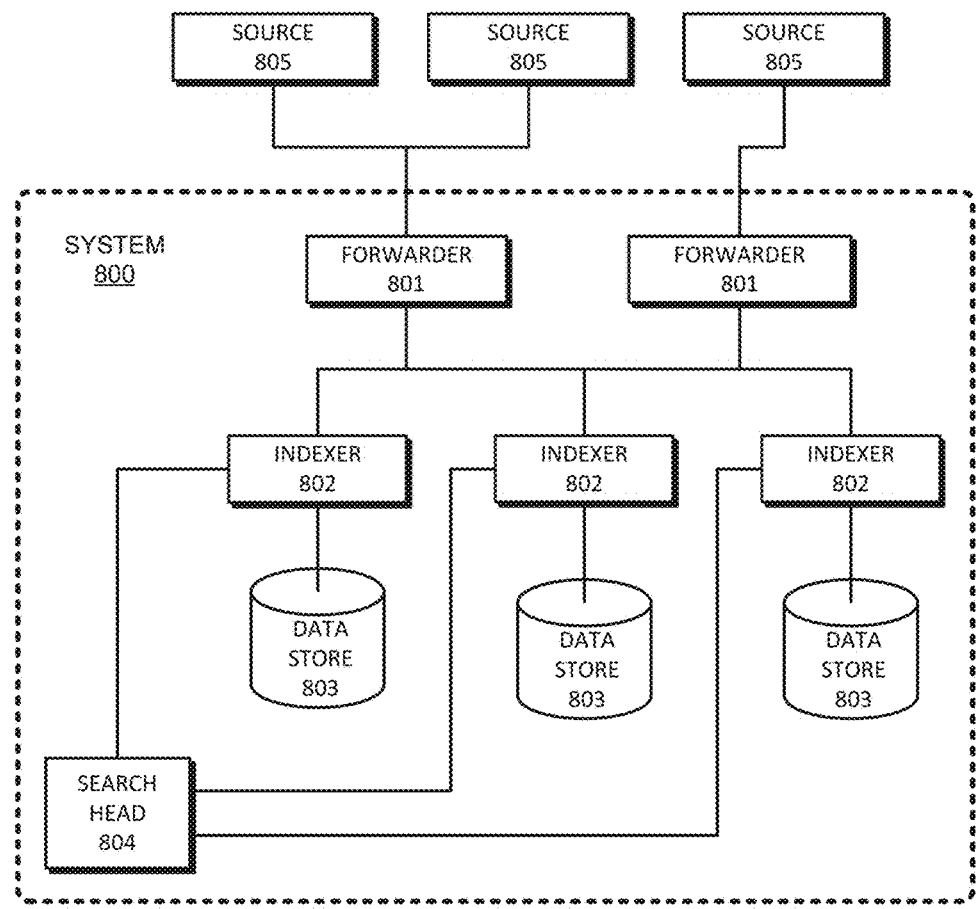
FIG. 8 presents a block diagram of an example event-processing system in accordance with one or more embodiments.

FIG. 8 presents a block diagram of an example event-processing system 800, similar to the SPLUNK® ENTERPRISE system, according to one or more embodiments of the disclosure. System 800 can include one or more forwarders 801 that collect data obtained from a variety of different data sources 805, and one or more indexers 802 that store, process, and/or perform operations on this data, wherein each indexer operates on data contained in a specific data store 803. These forwarders and indexers can include separate computer systems in a data center, or may alternatively comprise separate processes executing on various computer systems in a data center.

During operation, the forwarders 801 identify which indexers 802 can receive the collected data and then forward the data to the identified indexers. Forwarders 801 can also perform operations to strip out extraneous data and detect timestamps in the data. The forwarders can next determine which indexers 802 will receive each data item and then forward the data items to the determined indexers 802.

Note that distributing data across different indexers can facilitate parallel processing. This parallel processing can take place at data ingestion time, because multiple indexers can process the incoming data in parallel. The parallel processing can also take place at search time, because multiple indexers can search through the data in parallel.

System 800 and the processes described below with respect to FIGS. 8-14D are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

Figure 9:
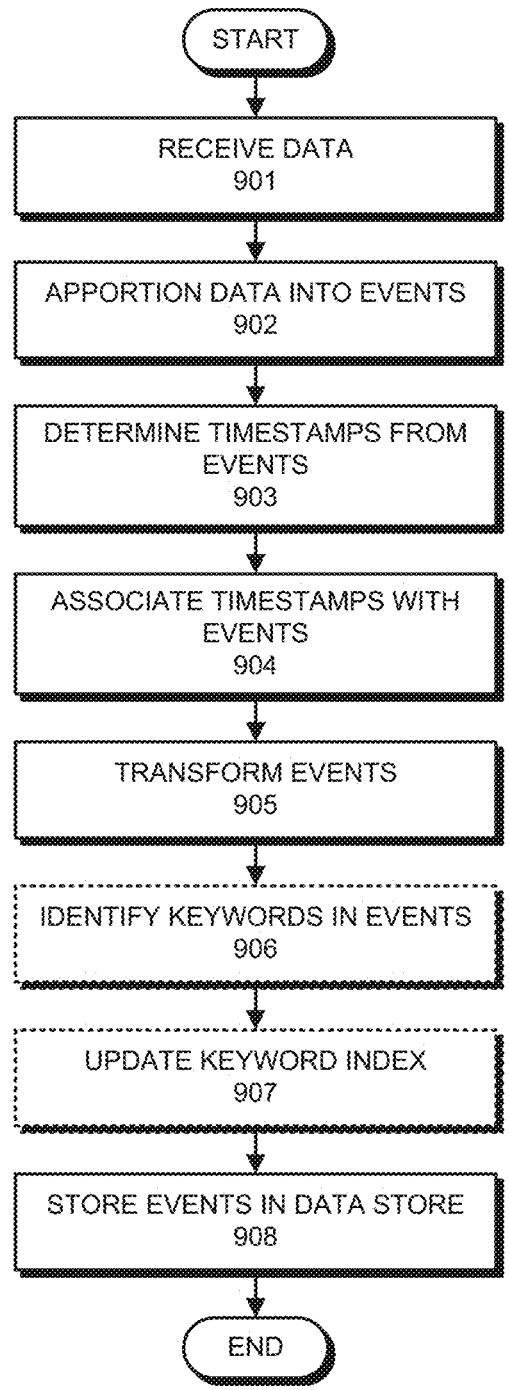
FIG. 9 presents a flowchart illustrating an example of how indexers process, index, and store data received from forwarders in accordance with one or more embodiments.

FIG. 9 presents a flowchart illustrating an example of how an indexer processes, indexes, and stores data received from forwarders in accordance with one or more embodiments of the disclosure. At block 901, the indexer can receive the data from the forwarder. Next, at block 902, the indexer can apportion the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer can determine a timestamp for each event at block 903. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 904, for example by storing the timestamp as metadata for each event.

Then, the system can apply transformations to data to be included in events at block 905. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 906. Then, at block 907 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "lest" may be created for the event, and assigned a value of "10.0.1.2."

Finally, the indexer can store the events in a data store at block 908, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 802 is responsible for storing and searching a subset of the events contained in a corresponding data store 803. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

Figure 10:
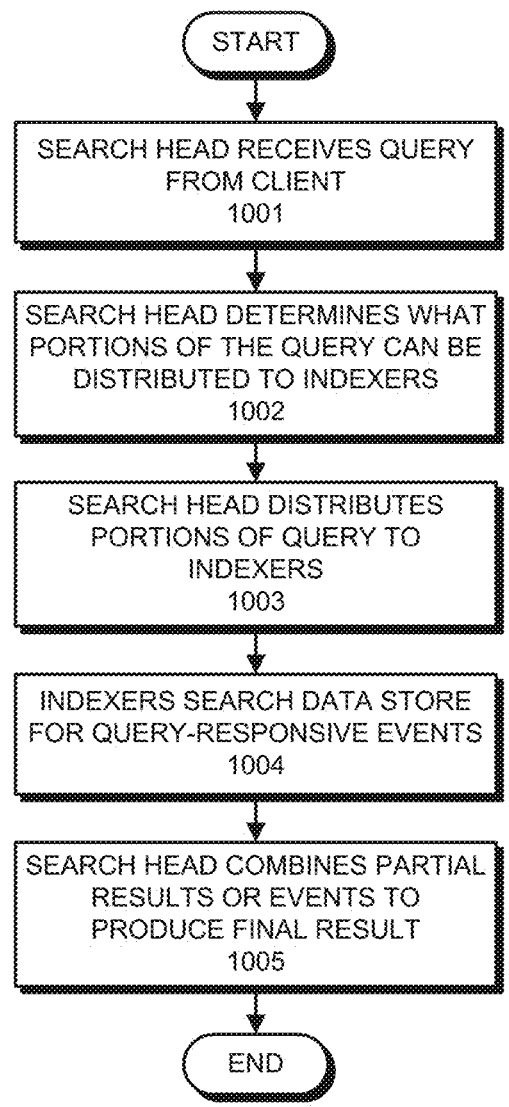
FIG. 10 presents a flowchart illustrating an example of how a search head and indexers perform a search query in accordance with one or more embodiments.

FIG. 10 presents a flowchart illustrating an example of how a search head and indexers perform a search query in accordance with one or more embodiments of the disclosure. At the start of this process, a search head can receive a search query from a client at block 1001. Next, at block 1002, the search head can analyze the search query to determine what portions can be delegated to indexers and what portions need to be executed locally by the search head. At block 1003, the search head can distribute the determined portions of the query to the indexers. Note that commands that operate on single events can be trivially delegated to the indexers, while commands that involve events from multiple indexers are harder to delegate.

Then, at block 1004, the indexers to which the query was distributed can search their data stores for events that are responsive to the query. To determine which events are responsive to the query, the indexer can search for events that match the criteria specified in the query. This criteria can include matching keywords or specific values for certain fields. In a query that uses a late-binding schema, the searching operations in block 1004 may involve using the late-binding scheme to extract values for specified fields from events at the time the query is processed. Next, the indexers can either send the relevant events back to the search head, or use the events to calculate a partial result, and send the partial result back to the search head.

Finally, at block 1005, the search head can combine the partial results and/or events received from the indexers to produce a final result for the query. This final result can include different types of data depending upon what the query is asking for. For example, the final results can include a listing of matching events returned by the query, or some type of visualization of data from the returned events. In another example, the final result can include one or more calculated values derived from the matching events.

Moreover, the results generated by system 800 can be returned to a client using different techniques. For example, one technique can stream results back to a client in real-time as they are identified. Another technique can wait to report results to the client until a complete set of results is ready to return to the client. Yet another technique can stream interim results back to the client in real-time until a complete set of results is ready, and then returns the complete set of results to the client. In another technique, certain results can be stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

Figure 11:
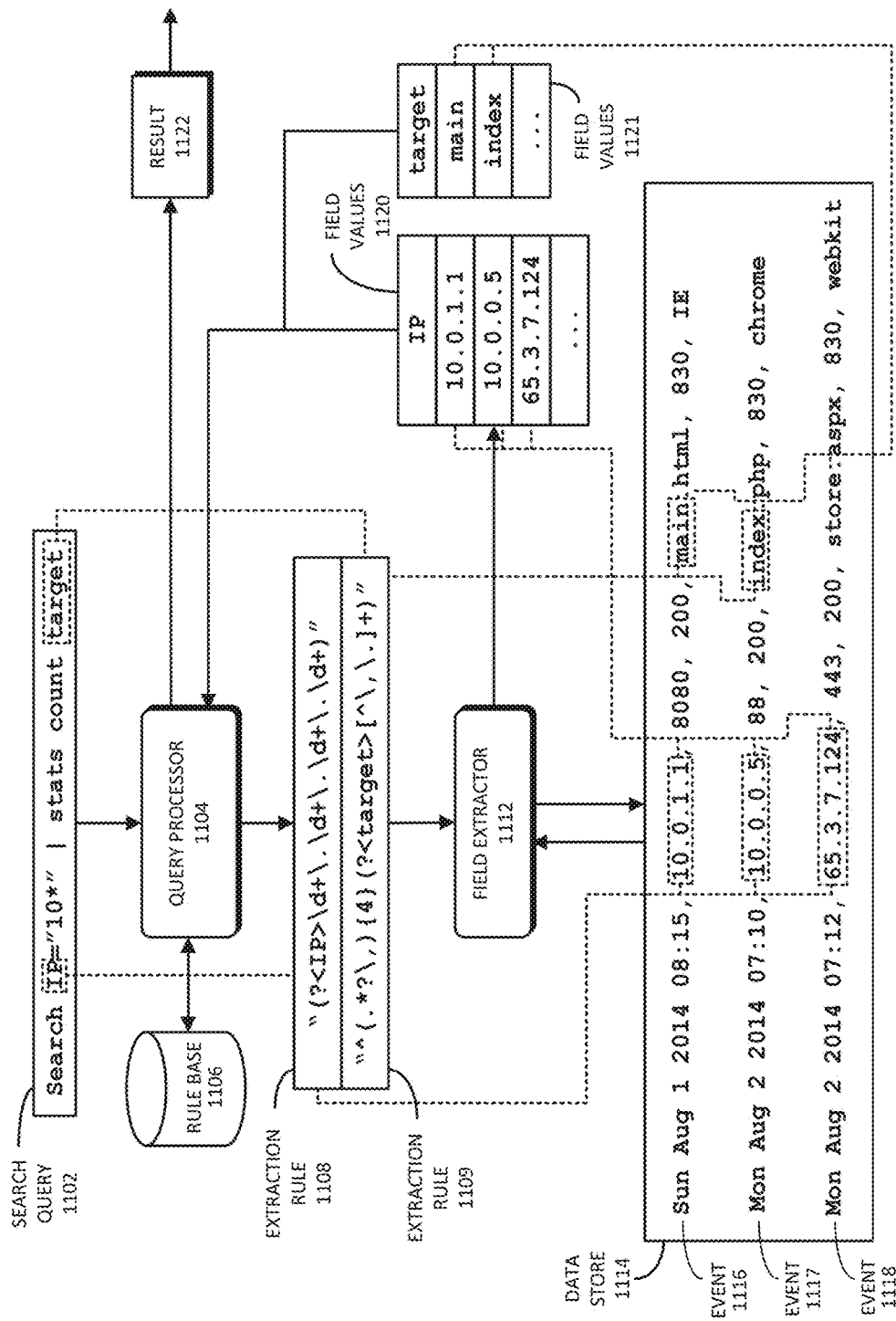
FIG. 11 presents a block diagram of an example system for processing search requests that uses extraction rules for field values in accordance with one or more embodiments.

FIG. 11 presents a block diagram illustrating an example of how fields can be extracted during query processing in accordance with one or more embodiments of the disclosure. At the start of this process, a search query 11.02 can be received at a query processor 1104. Query processor 1104 can include various mechanisms for processing a query, wherein these mechanisms can reside in a search head 804 and/or an indexer 802. Note that the example search query 1102 illustrated in FIG. 11 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1102 can also be expressed in other query languages, such as the Structured Query Language ("SQL") or any suitable query language.

Upon receiving search query 1102, query processor 1104 can see that search query 111102 includes two fields "IP" and "target." Query processor 1104 can also determine that the values for the "IP" and "target" fields have not already been extracted from events in data store 1114, and consequently can determine that query processor 1104 needs to use extraction rules to extract values for the fields. Hence, query processor 1104 can perform a lookup for the extraction rules in a rule base 1106, wherein rule base 1106 can map field names to corresponding extraction rules and obtains extraction rules 1108-1109, wherein extraction rule 1108 can specify how to extract a value for the "IP" field from an event, and extraction rule 1109 can specify how to extract a value for the "target" field from an event. As is illustrated in FIG. 11, extraction rules 1108-1109 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 1104 can send extraction rules 1108-1109 to a field extractor 1112, which applies extraction rules 1108-1109 to events 1116-1118 in a data store 1114. Note that data store 1114 can include one or more data stores, and extraction rules 1108-1109 can be applied to large numbers of events in data store 1114, and are not meant to be limited to the three events 1116-1118 illustrated in FIG. 11. Moreover, the query processor 1104 can instruct field extractor 1112 to apply the extraction rules to all the events in a data store 1114, or to a subset of the events that have been filtered based on some criteria.

Next, field extractor 1112 can apply extraction rule 1108 for the first command "Search IP="10*" to events in data store 1114 including events 1116-1118. Extraction rule 1108 can be used to extract values for the IP address field from events in data store 1114 by looking for a pattern of one or more digits, followed by a period, followed again by one or more digits, followed by another period, followed again by one or more digits, followed by another period, and followed again by one or more digits. Next, field extractor 1112 can return field values 1120 to query processor 1104, which uses the criterion IP="10*" to look for IP addresses that start with "10". Note that events 1116 and 1117 can match this criterion, but event 1118 does not, so the result set for the first command is events 1116-1117.

Query processor 1104 can then send events 1116-1117 to the next command "stats count target." To process this command, query processor 1104 can cause field extractor 1112 to apply extraction rule 1109 to events 1116-1117. Extraction rule 1109 can be used to extract values for the target field for events 1116-1117 by skipping the first four commas in events 1116-1117, and then extracting all of the following characters until a comma or period is reached. Next, field extractor 1112 can return field values 1121 to query processor 1104, which executes the command "stats count target" to count the number of unique values contained in the target fields, which in this example produces the value "2" that is returned as a final result 1122 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

Figure 13A:
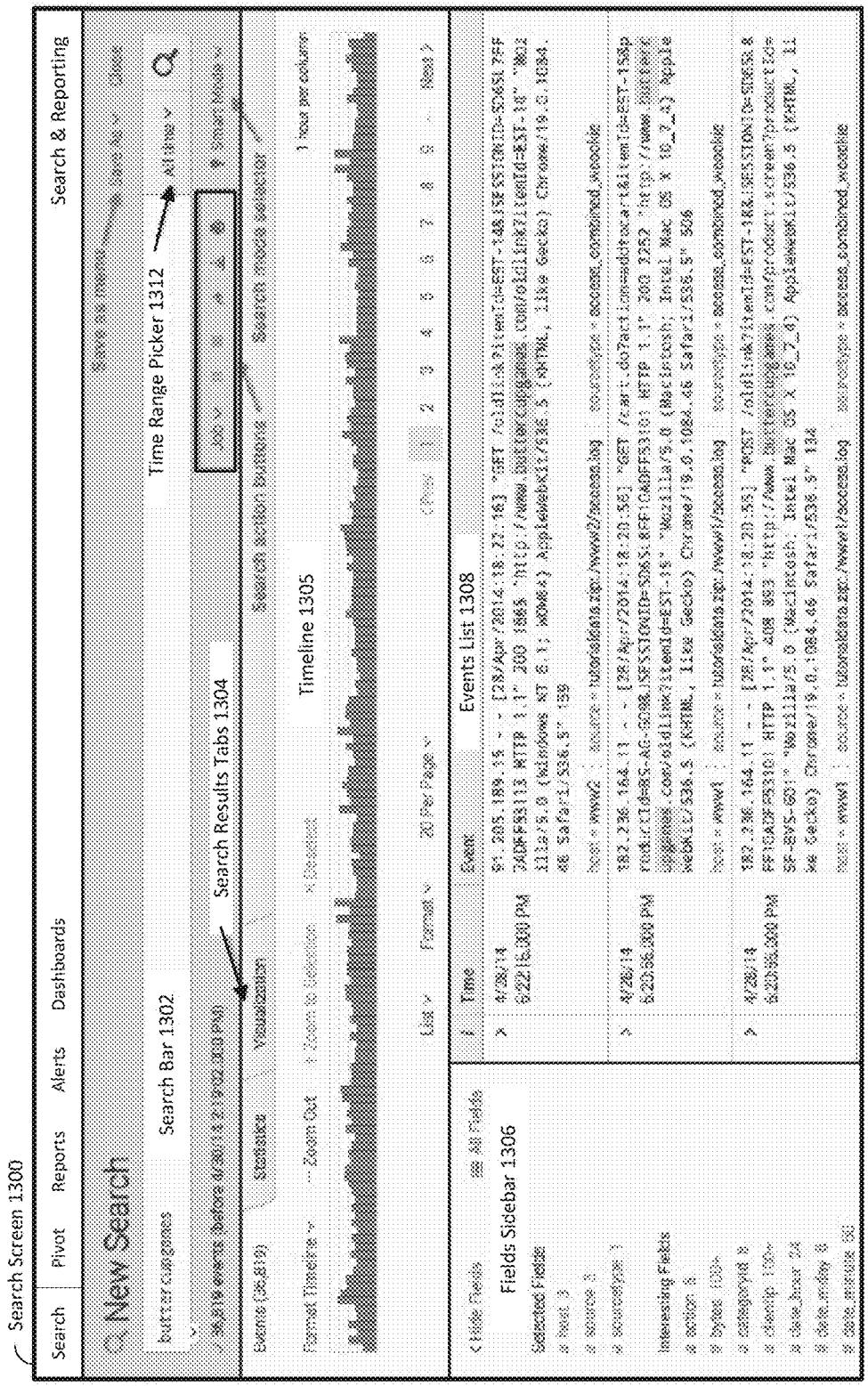
FIG. 13A illustrates an example search screen in accordance with one or more embodiments.
Figure 13B:
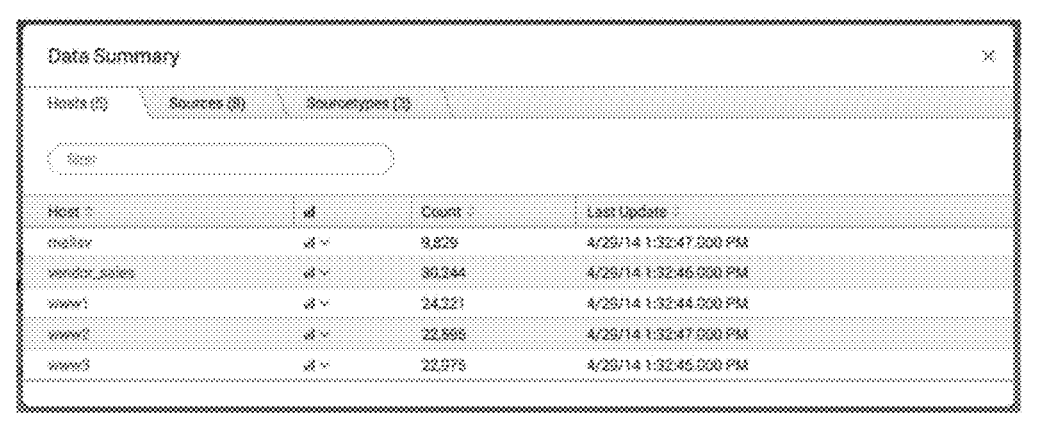

FIG. 13A illustrates an example search screen 1300 in accordance with one or more embodiments of the disclosure. Search screen 1300 can include a search bar 1302 that accepts user input in the form of a search string. It can also include a time range picker 1312 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 1300 can also initially display a "data summary" dialog as is illustrated in FIG. 13B that can enable the user to select different sources for the event data, for example by selecting specific hosts and log files.

After the search is executed, the search screen 1300 can display the results through search results tabs 1304, wherein search results tabs 1304 can include: an "events tab" that displays various information about events returned, by the search; a "statistics tab" that displays statistics about the search results; and a "visualization tab" that displays various visualizations of the search results. The events tab illustrated in FIG. 13A can display a timeline graph 1305 that graphically illustrates the number of events that occurred in one-hour intervals over the selected time range. It also can display an events list 1308 that enables a user to view the raw data in each of the returned events. It additionally can display a fields sidebar 1306 that includes statistics about occurrences of specific fields in the returned events, including "selected fields" that are pre-selected by the user, and "interesting fields" that are automatically selected by the system based on pre-specified criteria.

The above-described system can provide significant flexibility by enabling a user to analyze massive quantities of minimally processed performance data. "on the fly" at search time instead of storing pre-specified portions of the performance data in a database at ingestion time. This flexibility can enable a user to see correlations in the performance data and perform subsequent queries to examine interesting aspects of the performance data that may not have been apparent at ingestion time.

However, performing extraction and analysis operations at search time can involve a relatively large amount of data and require a large number of computational operations, which can cause considerable delays while processing the queries. Fortunately, a number of acceleration techniques have been developed to speed up analysis operations performed at search time. These techniques can include: (1) performing search operations in parallel by formulating a search as a map-reduce computation; (2) using a keyword index; (3) using a high performance analytics store; and (4) accelerating the process of generating reports. These techniques are described in more detail below.

To facilitate faster query processing, a query can be structured as a map-reduce computation, wherein the "map" operations are delegated to the indexers, while the corresponding "reduce" operations are performed locally at the search head. For example, FIG. 12 illustrates how a search query 501 received from a client at search head 804 can split into two phases, including: (1) a "map phase" comprising subtasks 502 (e.g., data retrieval or simple filtering) that may be performed in parallel and are "mapped" to indexers 802 for execution, and (2) a "reduce phase" including a merging operation 503 to be executed by the search head when the results are ultimately collected from the indexers.

During operation, upon receiving search query 501, search head 804 can modify search query 501 by substituting "stats" with "prestats" to produce search query 502, and can then distribute search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 10, or may alternatively distribute a modified version (e.g., a more restricted version) of the search query to the search peers. In this example, the indexers can be responsible for producing the results and sending them to the search head. After the indexers return the results to the search head, the search head can perform the merging operations 503 on the results. Note that by executing the computation in this way, the system can effectively distribute the computational operations while minimizing data transfers.

As described above with reference to the flow charts in FIGS. 9 and 10, event-processing system 800 can construct and maintain one or more keyword indices to facilitate rapidly identifying events containing specific keywords. This can greatly speed up the processing of queries involving specific keywords. As mentioned above, to build a keyword index, an indexer can first identify a set of keywords. Then, the indexer can include the identified keywords in an index, which associates each stored keyword with references to events containing that keyword, or to locations within events where that keyword is located. When an indexer subsequently receives a keyword-based query, the indexer can access the keyword index to quickly identify events containing the keyword.

To speed up certain types of queries, some embodiments of system 800 can make use of a high performance analytics store, which is referred to as a "summarization table," that contains entries for specific field-value pairs. Each of these entries can keep track of instances of a specific value in a specific field in the event data and includes references to events containing the specific value in the specific field. For example, an example entry in a summarization table can keep track of occurrences of the value "94107" in a "ZIP code" field of a set of events, wherein the entry can include references to all of the events that contain the value "94107" in the ZIP code field. This can enable the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system can maintain a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

In some embodiments, a data server system such as the SPLUNK® ENTERPRISE system can accelerate the process of periodically generating updated reports based on query results. To accelerate this process, a summarization engine can automatically examine the query to determine whether generation of updated reports can be accelerated by creating intermediate summaries. (This is possible if results from preceding time periods can be computed separately and combined to generate an updated report some cases, it is not possible to combine such incremental results, for example where a value in the report depends on relationships between events from different time periods.) If reports can be accelerated, the summarization engine can periodically generate a summary covering data obtained during a latest non-overlapping time period. For example, where the query seeks events meeting a specified criteria, a summary for the time period can include only events within the time period that meet the specified criteria. Similarly, if the query seeks statistics calculated from the events, such as the number of events that match the specified criteria, then the summary for the time period can include the number of events in the period that match the specified criteria.

In parallel with the creation of the summaries, the summarization engine can schedule the periodic updating of the report associated with the query. During each scheduled report update, the query engine can determine whether intermediate summaries have been generated covering portions of the time period covered by the report update. If so, then the report can be generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process can be repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No, 8,412,696, issued on Apr. 2, 2011.

The SPLUNK® ENTERPRISE platform can provide various schemas, dashboards and visualizations that make it easy for developers to create applications to provide additional capabilities. One such application is the SPUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time can inevitably hamper future incident investigations, when all of the original data may be needed to determine the root cause of a security issue, or to detect the tiny fingerprints of an impending security threat.

In contrast, the SPLUNK® APP FOR ENTERPRISE SECURITY system can store large volumes of minimally processed security-related data at ingestion time for later retrieval and analysis at search time when a live security threat is being investigated. To facilitate this data retrieval process, the SPLUNK® APP FOR ENTERPRISE SECURITY can provide pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY can facilitate detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 14A:
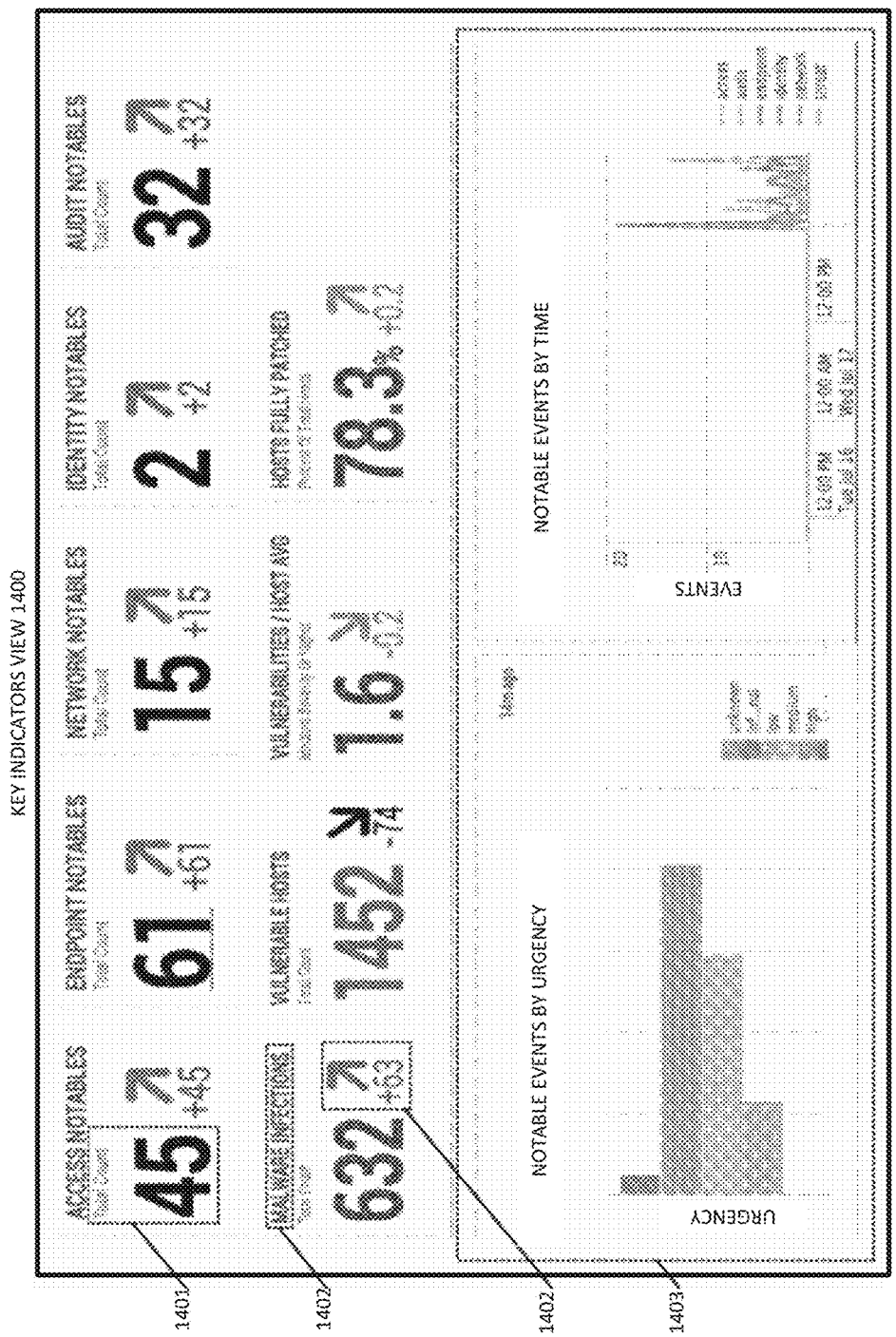
FIG. 14A illustrates an example key indicators view in accordance with one or more embodiments.

The SPLUNK® APP FOR ENTERPRISE SECURITY can provide various visualizations to aid in discovering security threats, such as a "key indicators view" that enables a user to view security metrics of interest, such as counts of different types of notable events. For example, FIG. 14A illustrates an example key indicators view 700 that can include a dashboard, which can display a value 1401, for various security-related metrics, such as malware infections 1402, according to one or more embodiments of the disclosure. It can also display a change in a metric value 1403, which indicates that the number of malware infections increased by 63 during the preceding interval. Key indicators view 700 can additionally display a histogram panel 704 that displays a histogram of notable events organized by urgency values, and a histogram of notable events organized by time intervals. This key indicators view is described in further detail in pending U.S. patent application Ser. No. 13/956,338, filed Jul. 31, 2013.

Figure 14B:
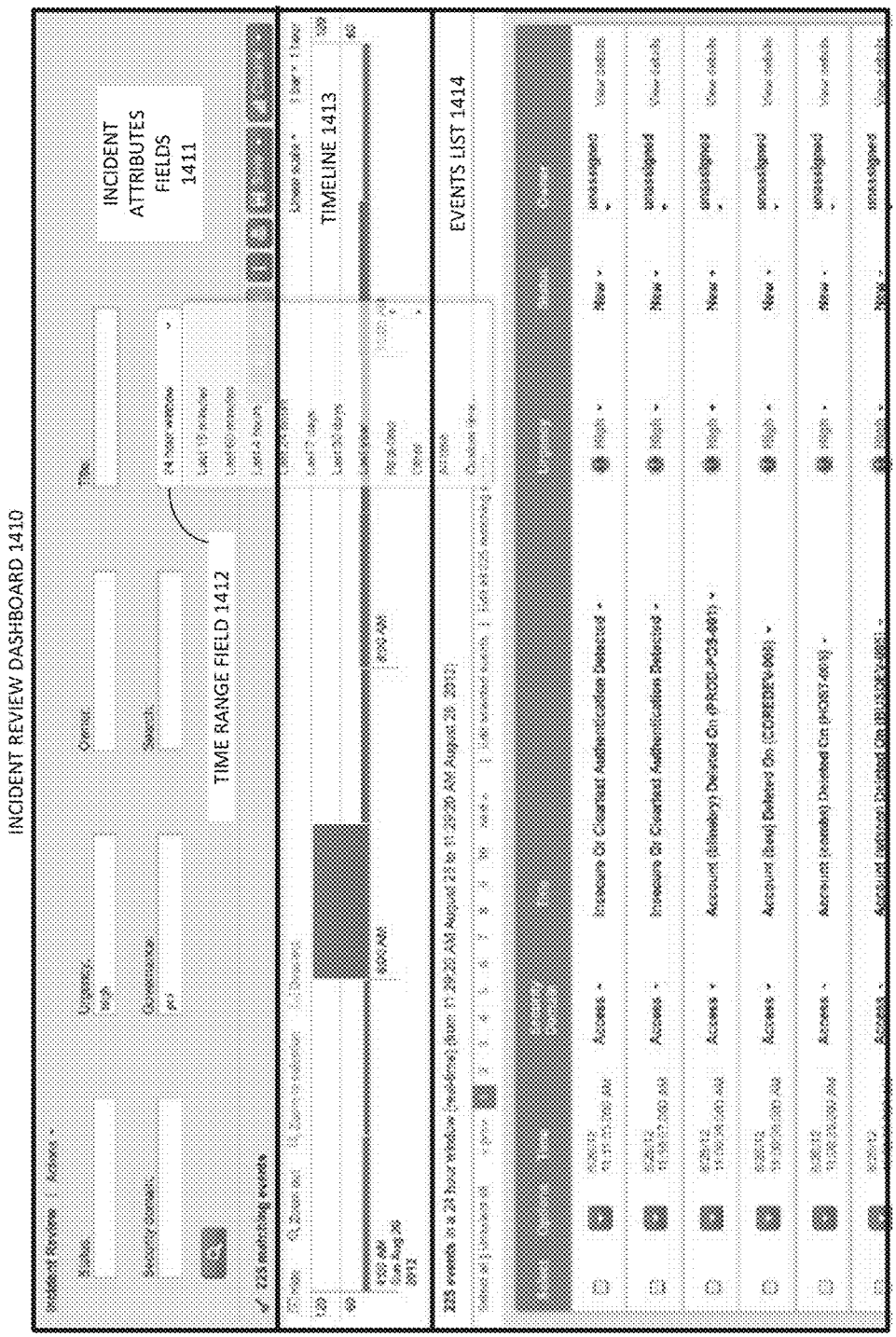
FIG. 14B illustrates an example incident review dashboard in accordance with one or more embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 14B illustrates an example incident review dashboard 1410 that includes a set of incident attribute fields 1411 that, for example, enables a user to specify a time range field 1412 for the displayed events, according to one or more embodiments of the disclosure. It can also include a timeline 1413 that graphically illustrates the number of incidents that occurred in one-hour time intervals over the selected time range. It can additionally display an events list 1414 that enables a user to view a list of all of the notable events that match the criteria in the incident attributes fields 1411. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

As mentioned above, the SPLUNK® ENTERPRISE platform can provide various features that make it easy for developers to create various applications. One such application is the SPLUNK® APP FOR VMWARE®, which can perform monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent application Ser. No. 14/167,316 filed 29 Jan. 2014, which is hereby incorporated herein by reference in its entirety for all possible purposes. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® can provide pre-specified schemas for extracting relevant values from different types of performance-related event data, and also enables a user to define such schemas.

Figure 14C:
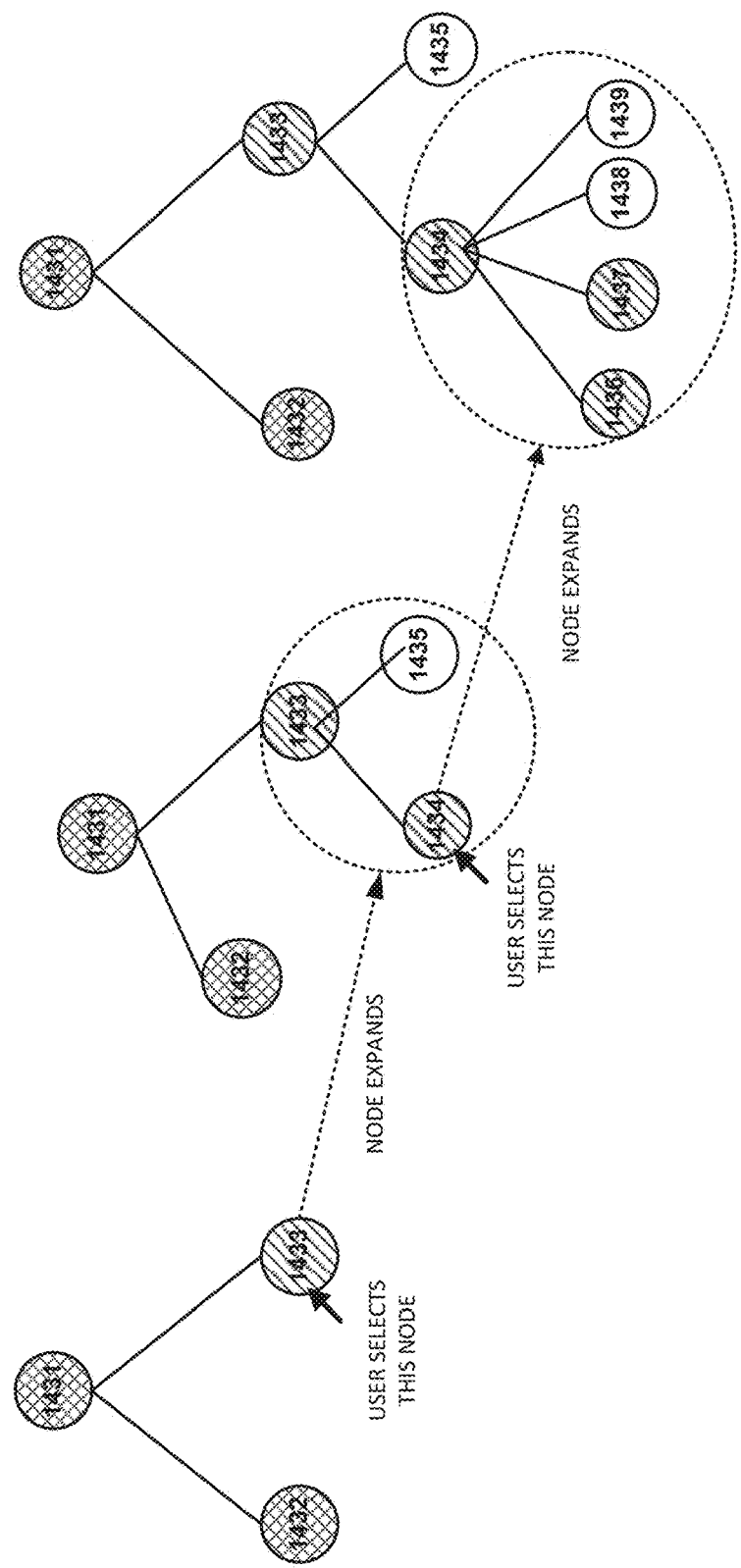
FIG. 14C illustrates an example proactive monitoring tree in accordance with one or more embodiments.
Figure 14D:
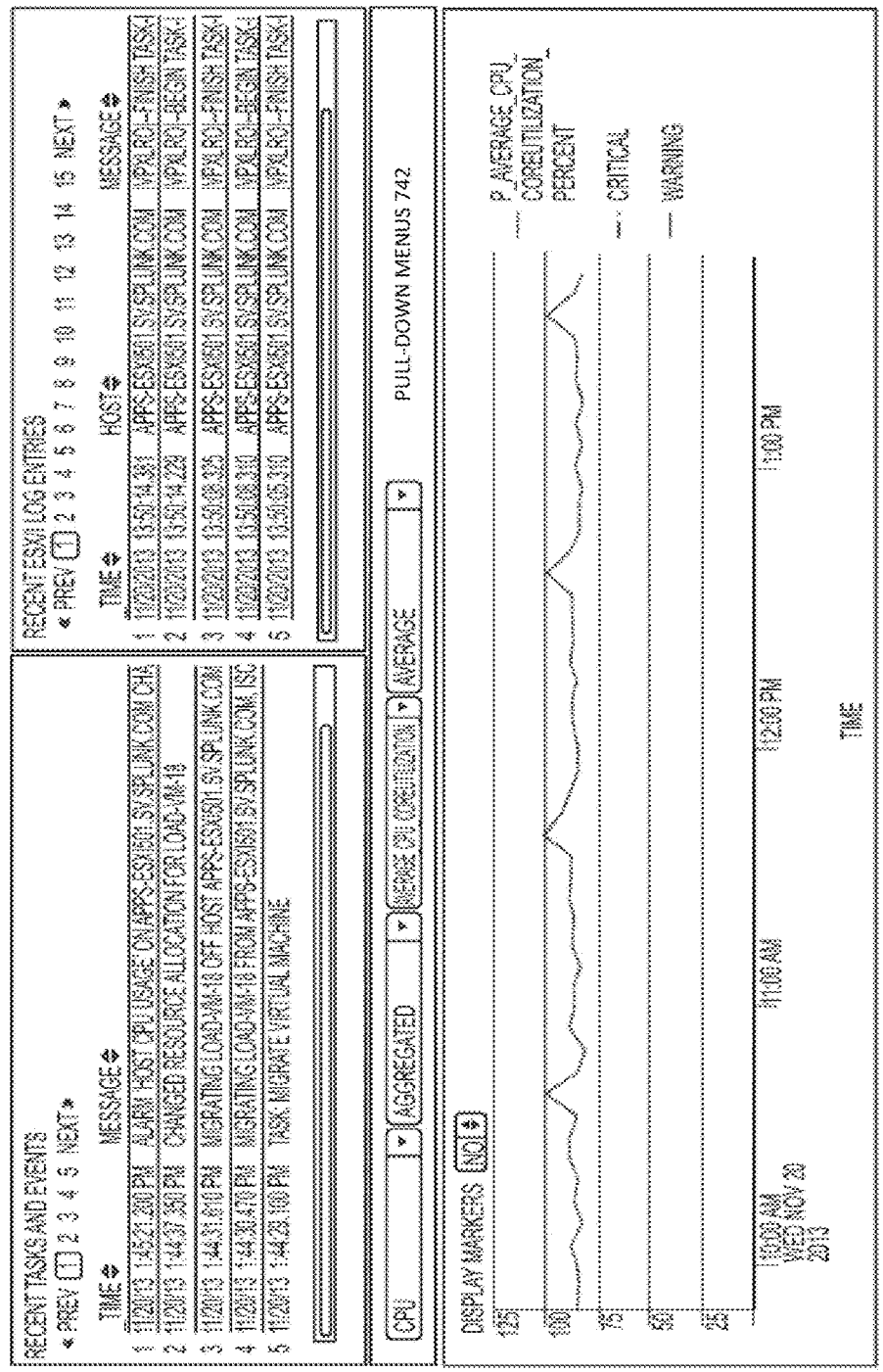
FIG. 14D illustrates an example screen displaying both log data and performance data in accordance with one or more embodiments.

The SPLUNK® APP FOR VMWARE® can additionally provide various visualizations to facilitate detecting and diagnosing the root cause of performance problems. For example, one such visualization is a "proactive monitoring tree" that can enable a user to easily view and understand relationships among various factors that affect the performance of a hierarchically structured computing system. This proactive monitoring tree can enable a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 14C, wherein nodes 1433 and 1434 are selectively expanded. Note that nodes 1431-1439 can be displayed using different patterns or colors to represent different performance states, such as a critical state, a warning state, a normal state or an unknown/offline state. The ease of navigation provided by selective expansion in combination with the associated performance-state information can enable a user to quickly diagnose the root cause of a performance problem. The proactive monitoring tree is described in further detail in U.S. patent application Ser. No. 14/235,490 filed on 15 Apr. 2014, which is hereby incorporated herein by reference in its entirety for all possible purposes.

The SPLUNK® APP FOR VMWARE® can also provide a user interface that enables a user to select a specific time range and then view heterogeneous data, comprising events, log data and associated performance metrics, for the selected time range. For example, the screen illustrated in FIG. 14D can display a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This can enable the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference in its entirety for all possible purposes.

Figure 15:
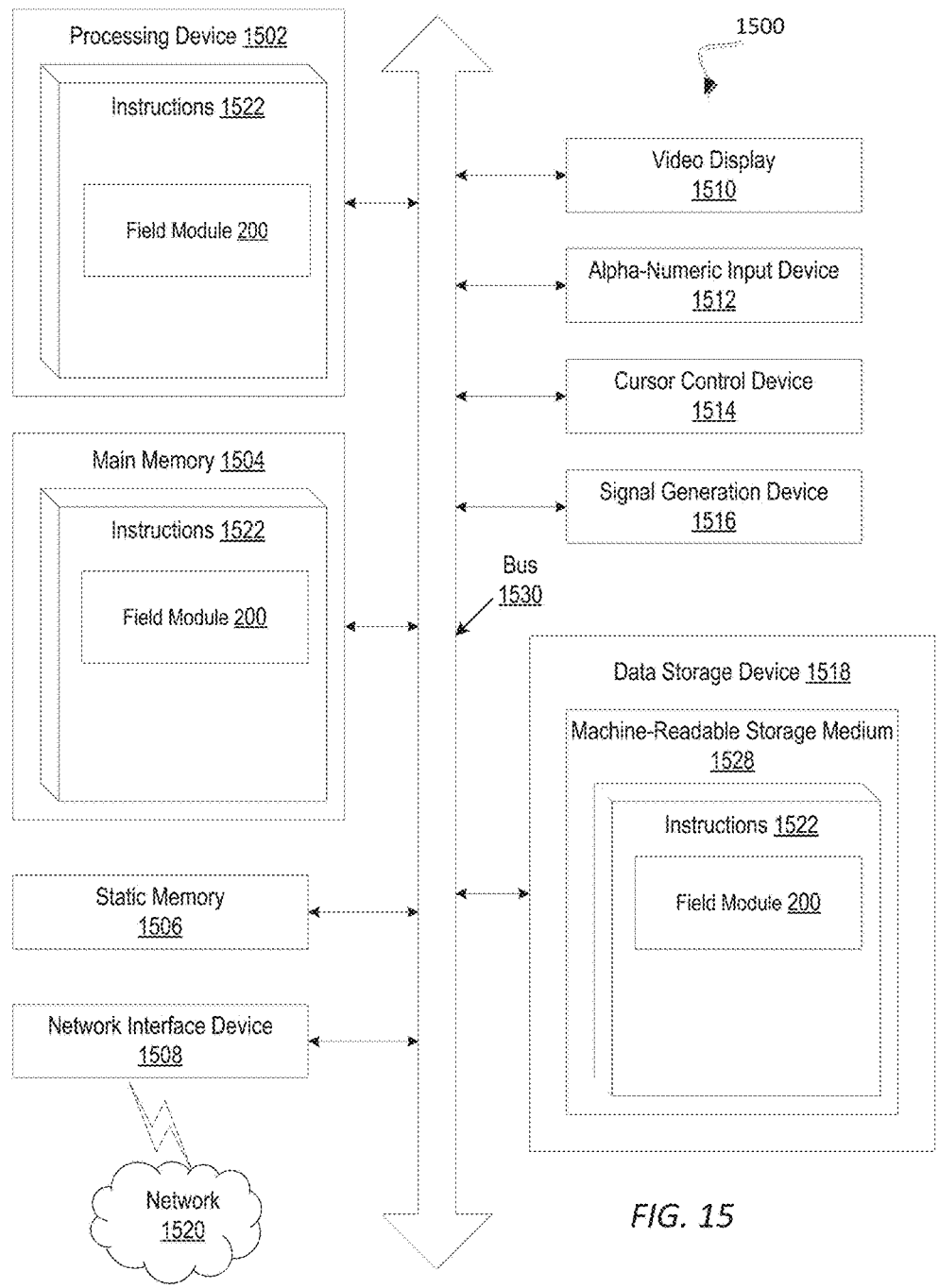
FIG. 15 illustrates a block diagram of an example computer system in which one or more embodiments of the disclosure may operate.

FIG. 15 illustrates an example machine of a computer system within which a set of instructions, for causing the machine to perform any one or more of the methodologies discussed herein, may be executed, according to one or more embodiments of the disclosure. In alternative implementations, the machine may be connected (e.g., networked) to other machines in a LAN, an intranet, an extranet, and/or the Internet via a network 1520. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system can include a processing device 1502, a main memory 1504 (e.g., read-only memory (ROM), flash memory, dynamic random access memory (DRAM) such as synchronous DRAM (SDRAM) or DRAM (RDRAM), etc.), a static memory 1506 (e.g., flash memory, static random access memory (SRAM), etc.), and a data storage device 1518, which communicate with each other via a bus 1530.

Processing device 1502 can represent one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 can be configured to execute instructions 1526 for performing the operations and steps discussed herein.

The computer system may further include a network interface device 1508. The computer system also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a video processing unit 1528, an audio processing unit 1532, and a signal generation device 1516 (e.g., a speaker).

The data storage device 1518 may include a machine-readable storage medium 1524 (also known as a non-transitory computer-readable storage medium) on which is stored one or more sets of instructions or software 1526 embodying any one or more of the methodologies or functions described herein. The instructions 1526 may also reside, completely or at least partially, within the main memory 1504 and/or within the processing device 1502 during execution thereof by the computer system, the main memory 1504 and the processing device 1502 also constituting machine-readable storage media.

In one implementation, the instructions 1526 can include instructions to implement functionality corresponding to a field module (e.g., field module 200 of FIG. 2). While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

As used throughout this application, the word "may" is used in a permissive sense meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed:

1. A computer-implemented method comprising:
   receiving a search query entered by a user in textual form into a query box;
   creating a set of events by applying the search query across a data store of field-searchable events to find matching events, including unstructured raw data produced by one or more components in an information technology environment and reflecting activity within the information technology environment;
   determining a set of fields that have each been defined for one or more events in the set of events, each field included in the set of fields associated with a different extraction rule that is used to identify occurrences of the field in the unstructured raw data in each of the one or more events and extract values from the occurrences of the field;
   calculating a relevance score for each field in the set of fields;
   selecting one or more fields included in the set of fields based on the relevance scores; and
   causing display of one or more graphical controls, each graphical control corresponding to a field in the one or more fields, the graphical controls enabling the user to process the set of events using the corresponding one or more fields.

2. The computer-implemented method of claim 1, further comprising:
   causing display of a graphical control for selecting the one or more fields from the set of fields, to be used in a report definition.

3. The computer-implemented method of claim 1, wherein the relevance score is calculated based on a calculated number of events in the set of events that contain unstructured raw data that includes that field, and further comprising causing display of a graphical control for selecting the one or more fields from the set of fields, wherein a field name associated with each of the one or more fields is selected to be displayed by the graphical control based on the calculated relevance score.

4. The computer-implemented method of claim 1, wherein the relevance score is calculated based on a calculated number of different values for that field found in unstructured raw data contained in the set of events, and further comprising causing display of a graphical control for selecting the one or more fields from the set of fields, wherein a field name associated with each of the one or more fields is selected to be displayed by the graphical control based on the calculated relevance score.

5. The computer-implemented method of claim 1, wherein the relevance score is calculated based on a calculated number of unique values for that field found in unstructured raw data contained in the set of events, and further comprising causing display of a graphical control for selecting the one or more fields from the set of fields, wherein a field name associated with each of the one or more fields is selected to be displayed by the graphical control based on the calculated relevance score.

6. The computer-implemented method of claim 1, wherein the one or more graphical controls includes one or more filter criteria for filtering the set of events.

7. The computer-implemented method of claim 1, wherein a graphical control of the one or more graphical controls includes one or more filter criteria for filtering the set of events by applying the filter criteria to the field.

8. The computer-implemented method of claim 1, wherein the one or more graphical controls includes criteria for generating one or more aggregate values for the one or more events.

9. The computer-implemented method of claim 1, wherein the one or more graphical controls includes criteria for generating one or more aggregate values for a field in the set of fields.

10. The computer-implemented method of claim 1, wherein a graphical control of the one or more graphical controls indicates a graphical visualization.

11. The computer-implemented method of claim 1, wherein a graphical control of the one or more graphical controls indicates a graphical visualization, and wherein the set of fields are used to map data from the set of events to the graphical visualization.

12. The computer-implemented method of claim 1, further comprising:
    causing display of a text box for entering at least a portion of at least one criterion for at least one field from the set of fields;
    receiving the at least one criterion for the at least one field;
    causing the set of events to be filtered based on the received at least one criterion for the at least one field.

13. The computer-implemented method of claim 1, further comprising:
    generating a data model based on the set of fields and the initial search query.

14. The computer-implemented method of claim 1, further comprising:
    generating a data model based on the set of fields; and
    modifying a search defining events to which a data model is applicable based on the set of fields.

15. The computer-implemented method of claim 1, wherein each event in the data store of field-searchable events is assigned a time stamp.

16. The computer-implemented method of claim 1, wherein the each of the fields in the set of fields is included in a late-binding schema.

17. The computer-implemented method of claim 1, further comprising:
    generating a data model based on the set of fields and the initial search query;
    saving the data model; and
    applying the data model to a second set of events different than the set of events.

18. The computer-implemented method of claim 1, wherein the set of fields are pre-defined fields.

19. The computer-implemented method of claim 1, wherein the set of fields are discovered as the set of events are created.

20. One or more non-transitory computer readable storage media storing instructions which, when executed by one or more computing devices, cause:
- receiving a search query entered by a user in textual form into a query box;
- creating a set of events by applying the search query across a data store of field-searchable events to find matching events, including unstructured raw data produced by one or more components in an information technology environment and reflecting activity within the information technology environment;
- determining a set of fields that have each been defined for one or more events in the set of events, each field included in the set of fields associated with a different extraction rule that is used to identify occurrences of the field in the unstructured raw data in each of the one or more events and extract values from the occurrences of the field;
- calculating a relevance score for each field in the set of fields;
- selecting one or more fields included in the set of fields based on the relevance scores; and
- causing display of one or more graphical controls, each graphical control corresponding to a field in the one or more fields, the graphical controls enabling the user to process the set of events using the corresponding one or more fields.

21. The computer-implemented method of claim 1, wherein each extraction rule is used to identify a pattern in the unstructured raw data that indicates one or more occurrences of the field associated with the extraction rule.

* * * * *

UNITED STATES PATENT AND TRADEMARK OFFICE
CERTIFICATE OF CORRECTION

PATENT NO. : 10,331,720 B2
APPLICATION NO. : 15/421425
DATED : June 25, 2019
INVENTOR(S) : Alice Emily Neels et al.

It is certified that error appears in the above-identified patent and that said Letters Patent is hereby corrected as shown below:

On the Title Page

(56) References Cited:

Page 3, Column 2, Line 57 under "Other Publications", Please delete "Final Office Action for U.S. Appl. No. 151143,579 dated May 18, 2017, 21 pages" and insert --Final Office Action for U.S. Appl. No. 15/143,579 dated May 18, 2017, 21 pages--.

Signed and Sealed this
Twentieth Day of August, 2019

Andrei Iancu
*Director of the United States Patent and Trademark Office*